(12) United States Patent
Cohen et al.

(10) Patent No.: US 7,672,512 B2
(45) Date of Patent: Mar. 2, 2010

(54) FORMS FOR COMPLETION WITH AN ELECTRONIC WRITING DEVICE

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Searete LLC, Bellvue, WA (US)

( * ) Notice: Subject to any disclaimer, the term of this patent is extended or adjusted under 35 U.S.C. 154(b) by 1250 days.

(21) Appl. No.: 11/167,058

(22) Filed: Jun. 24, 2005

(65) Prior Publication Data

US 2006/0209044 A1 Sep. 21, 2006

Related U.S. Application Data

(63) Continuation-in-part of application No. 11/083,567, filed on Mar. 18, 2005, and a continuation-in-part of application No. 11/097,977, filed on Mar. 31, 2005, and a continuation-in-part of application No. 11/097,980, filed on Mar. 31, 2005, and a continuation-in-part of application No. 11/114,245, filed on Apr. 25, 2005, and a continuation-in-part of application No. 11/137,716, filed on May 25, 2005, and a continuation-in-part of application No. 11/137,694, filed on May 25, 2005, and a continuation-in-part of application No. 11/137,687, filed on May 25, 2005, and a continuation-in-part of application No. 11/166,780, filed on Jun. 24, 2005, and a continuation-in-part of application No. 11/166,035, filed on Jun. 24, 2005, and a continuation-in-part of application No. 11/167,072, filed on Jun. 24, 2005.

(51) Int. Cl.
*G06K 9/00* (2006.01)

(52) U.S. Cl. ............... 382/187; 382/188; 382/314; 345/173

(58) Field of Classification Search ............... 382/187, 382/313–314, 119, 182, 184, 188, 112, 100, 382/189; 347/111, 171, 177; 283/75, 77, 283/85; 345/173
See application file for complete search history.

(56) References Cited

U.S. PATENT DOCUMENTS

| 4,053,024 A | 10/1977 | Hoyt |
| 4,384,196 A | 5/1983 | McCumber et al. |
| 4,475,240 A | 10/1984 | Brogardh et al. |
| 4,523,235 A | 6/1985 | Rajchman |

(Continued)

OTHER PUBLICATIONS

"Pen-One, Inc. Announces Biometric Pen Developer's Kit at Cartes Worldwide Card and Security Conference"; Breaking News Nov. 2, 2004 Paris, France; Nov. 2, 2004; pp. 1-2; printed on Dec. 13, 2006; bearing dates of 2001-2004; located at http://pen-one.com/html/Informatica_SDK_110204.htm; Pen One.

(Continued)

*Primary Examiner*—Sheela C Chawan
(74) *Attorney, Agent, or Firm*—Lee & Hayes, PLLC

(57) ABSTRACT

Embodiments include an article of manufacture, apparatus, device, system, computer-program product, and method. In an embodiment, an article of manufacture includes a display surface that includes a machine-distinguishable form identifier keyed to an electronic version of the form and at least two fields. Each field of the at least two fields respectively includes a unique machine-distinguishable field identifier keyed to a field of the electronic version of a form, a content area that accepts a hand-formed entry, and a unique user-understandable field identifier.

16 Claims, 53 Drawing Sheets

U.S. PATENT DOCUMENTS

| | | | |
|---|---|---|---|
| 4,685,142 A | 8/1987 | Ooi et al. | |
| 4,703,511 A * | 10/1987 | Conoval | 382/182 |
| 4,728,784 A | 3/1988 | Stewart | |
| 4,746,937 A | 5/1988 | Realis et al. | |
| 4,799,560 A | 1/1989 | Kobayashi | |
| 4,829,431 A | 5/1989 | Ott et al. | |
| 4,839,634 A | 6/1989 | More et al. | |
| 4,864,618 A | 9/1989 | Wright et al. | |
| 4,927,766 A | 5/1990 | Auerbach et al. | |
| 5,064,280 A | 11/1991 | Ringens et al. | |
| 5,109,439 A | 4/1992 | Froessl | |
| 5,129,320 A | 7/1992 | Fadner | |
| 5,227,985 A | 7/1993 | DeMenthon | |
| 5,250,804 A | 10/1993 | Chin | |
| 5,303,312 A | 4/1994 | Comerford et al. | |
| 5,311,207 A | 5/1994 | Kusumoto et al. | |
| 5,331,137 A | 7/1994 | Swartz | |
| 5,339,412 A | 8/1994 | Fueki | |
| 5,339,734 A | 8/1994 | Mustafa et al. | |
| 5,434,371 A | 7/1995 | Brooks | |
| 5,501,535 A | 3/1996 | Hastings et al. | |
| 5,509,966 A | 4/1996 | Sykes | |
| 5,513,278 A | 4/1996 | Hashizume et al. | |
| 5,521,722 A | 5/1996 | Colvill et al. | |
| 5,687,259 A | 11/1997 | Linford | |
| 5,729,618 A | 3/1998 | Fujisawa et al. | |
| 5,740,271 A | 4/1998 | Kunkler et al. | |
| 5,754,434 A | 5/1998 | Delfer et al. | |
| 5,758,574 A | 6/1998 | Bernardo et al. | |
| 5,779,482 A | 7/1998 | Fukumoto | |
| 5,793,397 A | 8/1998 | Barker et al. | |
| 5,823,691 A | 10/1998 | Langner | |
| 5,828,783 A | 10/1998 | Ishigaki | |
| 5,864,635 A | 1/1999 | Zetts et al. | |
| 5,970,455 A | 10/1999 | Wilcox et al. | |
| 5,974,204 A | 10/1999 | Lin et al. | |
| 5,978,523 A | 11/1999 | Linford et al. | |
| 5,999,666 A | 12/1999 | Gobeli et al. | |
| 6,004,048 A | 12/1999 | Moh et al. | |
| 6,005,945 A | 12/1999 | Whitehouse | |
| 6,031,936 A | 2/2000 | Nakamura | |
| 6,044,165 A * | 3/2000 | Perona et al. | 382/103 |
| 6,050,490 A | 4/2000 | Leichner et al. | |
| 6,070,805 A | 6/2000 | Kaufman et al. | |
| 6,181,836 B1 | 1/2001 | Delean | |
| 6,246,382 B1 | 6/2001 | Maguire, Jr. | |
| 6,262,804 B1 | 7/2001 | Friend et al. | |
| 6,310,615 B1 | 10/2001 | Davis et al. | |
| 6,330,057 B1 | 12/2001 | Lederer et al. | |
| 6,348,914 B1 | 2/2002 | Tuli | |
| 6,376,783 B1 | 4/2002 | Vaghi | |
| 6,377,249 B1 | 4/2002 | Mumford | |
| 6,395,234 B1 | 5/2002 | Hunnell et al. | |
| 6,408,092 B1 | 6/2002 | Sites | |
| 6,446,208 B1 | 9/2002 | Gujar et al. | |
| 6,452,683 B1 | 9/2002 | Kinrot et al. | |
| 6,454,482 B1 | 9/2002 | Silverbrook et al. | |
| 6,456,740 B1 * | 9/2002 | Carini et al. | 382/187 |
| 6,502,912 B1 | 1/2003 | Bernard et al. | |
| 6,509,893 B1 | 1/2003 | Akhlagi et al. | |
| 6,525,716 B1 | 2/2003 | Makino | |
| 6,594,406 B1 | 7/2003 | Hecht | |
| 6,603,464 B1 * | 8/2003 | Rabin | 345/179 |
| 6,649,849 B2 | 11/2003 | Bass et al. | |
| 6,686,579 B2 | 2/2004 | Fagin et al. | |
| 6,686,910 B2 | 2/2004 | O'Donnell, Jr. | |
| 6,703,570 B1 | 3/2004 | Russell et al. | |
| 6,715,687 B2 | 4/2004 | Berson | |
| 6,741,335 B2 | 5/2004 | Kinrot et al. | |
| 6,788,815 B2 | 9/2004 | Lui et al. | |
| 6,791,537 B1 | 9/2004 | Shim et al. | |
| 6,808,330 B1 | 10/2004 | Lapstun et al. | |
| 6,816,615 B2 | 11/2004 | Lui et al. | |
| 6,826,551 B1 | 11/2004 | Clary et al. | |
| 6,836,555 B2 | 12/2004 | Ericson et al. | |
| 6,839,453 B1 * | 1/2005 | McWilliam et al. | 382/119 |
| 6,864,880 B2 | 3/2005 | Hugosson et al. | |
| 6,885,759 B2 | 4/2005 | Cox et al. | |
| 6,897,853 B2 | 5/2005 | Keely et al. | |
| 6,917,722 B1 | 7/2005 | Bloomfield | |
| 6,925,565 B2 | 8/2005 | Black | |
| 6,931,153 B2 | 8/2005 | Nakao et al. | |
| RE38,884 E | 11/2005 | Kakii | |
| 6,980,704 B2 | 12/2005 | Kia et al. | |
| 6,982,808 B1 | 1/2006 | Ogg et al. | |
| 6,991,164 B2 | 1/2006 | Lemelson et al. | |
| 6,992,655 B2 | 1/2006 | Ericson et al. | |
| 7,002,712 B2 | 2/2006 | Barker et al. | |
| 7,015,950 B1 | 3/2006 | Pryor | |
| 7,043,056 B2 | 5/2006 | Edwards et al. | |
| 7,047,419 B2 | 5/2006 | Black | |
| 7,082,213 B2 | 7/2006 | Black | |
| 7,092,934 B1 | 8/2006 | Mahan et al. | |
| 7,094,977 B2 | 8/2006 | Ericson et al. | |
| 7,098,898 B2 | 8/2006 | Hattori et al. | |
| 7,120,320 B2 | 10/2006 | Petterson et al. | |
| 7,158,678 B2 | 1/2007 | Nagel et al. | |
| 7,167,164 B2 | 1/2007 | Ericson et al. | |
| 7,176,896 B1 | 2/2007 | Fahraeus et al. | |
| 7,197,174 B1 | 3/2007 | Koizumi | |
| 7,203,384 B2 | 4/2007 | Carl | |
| 7,239,747 B2 | 7/2007 | Bresler et al. | |
| 7,262,764 B2 | 8/2007 | Wang et al. | |
| 7,289,105 B2 | 10/2007 | Dort | |
| 7,289,110 B2 | 10/2007 | Hansson | |
| 7,295,193 B2 | 11/2007 | Fahraeus | |
| D558,166 S | 12/2007 | Black | |
| 7,328,995 B2 | 2/2008 | Campagna et al. | |
| 7,345,673 B2 | 3/2008 | Ericson et al. | |
| 7,353,453 B1 | 4/2008 | Simmons | |
| 7,363,505 B2 | 4/2008 | Black | |
| 7,376,630 B2 | 5/2008 | Blair et al. | |
| 7,408,536 B2 | 8/2008 | Hugosson et al. | |
| 7,433,499 B2 | 10/2008 | Kim | |
| 7,447,537 B1 | 11/2008 | Funda et al. | |
| 7,456,820 B1 | 11/2008 | Lapstun et al. | |
| 2002/0012134 A1 | 1/2002 | Calaway | |
| 2002/0040817 A1 | 4/2002 | LeKuch et al. | |
| 2002/0064308 A1 | 5/2002 | Altman et al. | |
| 2002/0079371 A1 | 6/2002 | Bobrow et al. | |
| 2002/0085843 A1 | 7/2002 | Mann | |
| 2002/0105484 A1 | 8/2002 | Navab et al. | |
| 2002/0143994 A1 | 10/2002 | Sun et al. | |
| 2002/0183890 A1 | 12/2002 | Bass et al. | |
| 2002/0196978 A1 | 12/2002 | Hawkins et al. | |
| 2003/0001020 A1 | 1/2003 | Kardach | |
| 2003/0001950 A1 | 1/2003 | Eriksson | |
| 2003/0043266 A1 | 3/2003 | Yoshikawa et al. | |
| 2003/0051362 A1 | 3/2003 | Buckman et al. | |
| 2003/0066691 A1 | 4/2003 | Jelinek et al. | |
| 2003/0081038 A1 | 5/2003 | Valero | |
| 2003/0115470 A1 | 6/2003 | Cousins et al. | |
| 2003/0146286 A1 | 8/2003 | Berson | |
| 2003/0148539 A1 | 8/2003 | van Dam et al. | |
| 2003/0151596 A1 | 8/2003 | Moyne et al. | |
| 2003/0173121 A1 | 9/2003 | Zloter et al. | |
| 2003/0184649 A1 | 10/2003 | Mann | |
| 2003/0187458 A1 | 10/2003 | Carlson, II | |
| 2003/0193544 A1 | 10/2003 | Eguchi | |
| 2003/0218070 A1 | 11/2003 | Tsikos et al. | |
| 2004/0002926 A1 | 1/2004 | Coffy et al. | |
| 2004/0005915 A1 | 1/2004 | Hunter | |
| 2004/0013454 A1 | 1/2004 | Manduley | |
| 2004/0023024 A1 | 2/2004 | Landberg et al. | |

| | | | |
|---|---|---|---|
| 2004/0035936 | A1 | 2/2004 | Hoson et al. |
| 2004/0085301 | A1* | 5/2004 | Furukawa et al. ........... 345/179 |
| 2004/0085358 | A1 | 5/2004 | Tolmer et al. |
| 2004/0093330 | A1 | 5/2004 | Westphal |
| 2004/0101178 | A1 | 5/2004 | Fedorovskaya et al. |
| 2004/0103111 | A1 | 5/2004 | Miller et al. |
| 2004/0108381 | A1 | 6/2004 | Elliott et al. |
| 2004/0120404 | A1 | 6/2004 | Sugahara et al. |
| 2004/0130614 | A1 | 7/2004 | Valliath et al. |
| 2004/0131252 | A1 | 7/2004 | Seto |
| 2004/0133189 | A1 | 7/2004 | Sakurai |
| 2004/0135776 | A1 | 7/2004 | Brouhon et al. |
| 2004/0140965 | A1 | 7/2004 | Wang et al. |
| 2004/0144575 | A1 | 7/2004 | Zloter et al. |
| 2004/0179000 | A1 | 9/2004 | Fermgard et al. |
| 2004/0182925 | A1 | 9/2004 | Anderson et al. |
| 2004/0210444 | A1 | 10/2004 | Arenburg et al. |
| 2004/0236315 | A1 | 11/2004 | Hered |
| 2004/0241424 | A1 | 12/2004 | Barbera-Guillem |
| 2004/0260507 | A1 | 12/2004 | Chang et al. |
| 2005/0013104 | A1 | 1/2005 | Feague et al. |
| 2005/0024346 | A1 | 2/2005 | Dupraz et al. |
| 2005/0024690 | A1 | 2/2005 | Picciotto et al. |
| 2005/0030297 | A1 | 2/2005 | Burstrom et al. |
| 2005/0033724 | A1 | 2/2005 | Antognini et al. |
| 2005/0041100 | A1 | 2/2005 | Maguire, Jr. |
| 2005/0052434 | A1 | 3/2005 | Kolmykov-Zotov et al. |
| 2005/0060644 | A1 | 3/2005 | Patterson |
| 2005/0064503 | A1 | 3/2005 | Lapstun et al. |
| 2005/0083516 | A1 | 4/2005 | Baker |
| 2005/0138541 | A1 | 6/2005 | Euchner et al. |
| 2005/0148828 | A1 | 7/2005 | Lindsay |
| 2005/0194444 | A1 | 9/2005 | Gieske |
| 2005/0199724 | A1 | 9/2005 | Lubow |
| 2005/0202844 | A1 | 9/2005 | Jabri et al. |
| 2005/0246337 | A1 | 11/2005 | Forman et al. |
| 2005/0251397 | A1 | 11/2005 | Zanovitch et al. |
| 2006/0036557 | A1 | 2/2006 | Mattern |
| 2006/0078866 | A1 | 4/2006 | Marggraff et al. |
| 2006/0109237 | A1 | 5/2006 | Morita et al. |
| 2006/0109238 | A1 | 5/2006 | Lau et al. |
| 2006/0138211 | A1 | 6/2006 | Lubow |
| 2006/0149296 | A1 | 7/2006 | Stanners |
| 2006/0159345 | A1 | 7/2006 | Clary et al. |
| 2006/0208085 | A1 | 9/2006 | Cohen et al. |
| 2006/0209051 | A1 | 9/2006 | Cohen et al. |
| 2006/0210172 | A1 | 9/2006 | Sutanto et al. |
| 2006/0219776 | A1 | 10/2006 | Finn |
| 2006/0238877 | A1 | 10/2006 | Ashkenazi et al. |
| 2006/0267965 | A1 | 11/2006 | Clary |
| 2006/0275068 | A1 | 12/2006 | Breton |
| 2006/0283962 | A1 | 12/2006 | Silverstein |
| 2006/0285147 | A1 | 12/2006 | Wolfman et al. |
| 2007/0046649 | A1 | 3/2007 | Reiner |
| 2007/0184422 | A1 | 8/2007 | Takahashi |
| 2007/0220494 | A1 | 9/2007 | Spooner |
| 2007/0253614 | A1 | 11/2007 | Jung et al. |
| 2007/0273674 | A1 | 11/2007 | Cohen et al. |
| 2007/0273918 | A1 | 11/2007 | Gonzalez |
| 2007/0286486 | A1 | 12/2007 | Goldstein |
| 2008/0088606 | A1 | 4/2008 | Cohen et al. |
| 2008/0088607 | A1 | 4/2008 | Sandstrom et al. |
| 2008/0141117 | A1 | 6/2008 | King et al. |
| 2009/0098925 | A1 | 4/2009 | Gagner et al. |

OTHER PUBLICATIONS

"Pen-One, Inc. Selects Award Winning P9 Design to Develop New Fingerprint Sensing Pen"; Breaking News Jul. 27, 2004 10:00 AM Southfield, MI (For Release Jul. 27, 2004); Jul. 27, 2004; pp. 1-2; printed on Dec. 13, 2006; bearing dates of 2001-2004; located at http://pen-one.com/html/biometric_P9_news_072604.htm; Pen One.

"Pen-One, Inc. to Unveil Connaitre Biometric Pen at Cartes Worldwide Card and Security Conference"; Breaking News Oct. 20, 2004 Southfield, MI (For Release Oct. 22, 2004); Oct. 22, 2004; pp. 1-2; printed on Dec. 13, 2006; bearing dates of 2001-2004; located at http://pen-one.com/html/connaitre_news_102004.htm; Pen One.

"Pen-One News Releases Worldwide Pen-One in the News . . . "; pp. 1-2; printed on Dec. 13, 2006; bearing dates of 2001-2004; located at http://pen-one.com/html/Pen-One_in_the_news.htm; Pen One.

"The World's First Fingerprint Sensing Pen! Pen One in the news . . . "; pp. 1-2; printed on Dec. 13, 2006; bearing dates of 2001-2004; located at http://pen-one.com/index.html; Pen One.

"World's First Use of Fraud Resistant Fingerprint Scanning Biometric Pen"; May 6, 2004; pp. 1-2 ; printed on Dec. 13, 2006; bearing dates of 2001-2004; located at http://pen-one.com/html/biometric_news_050604.html; Pen One.

U.S. Appl. No. 11/603,336, Cohen et al.
U.S. Appl. No. 11/603,334, Cohen et al.
U.S. Appl. No. 11/603,333, Cohen et al.
U.S. Appl. No. 11/603,332, Cohen et al.
U.S. Appl. No. 11/603,289, Cohen et al.
U.S. Appl. No. 11/603,275, Cohen et al.
U.S. Appl. No. 11/580,218, Cohen et al.
U.S. Appl. No. 11/580,217, Cohen et al.
U.S. Appl. No. 11/167,072, Cohen et al.
U.S. Appl. No. 11/166,780, Cohen et al.
U.S. Appl. No. 11/166,035, Cohen et al.

Heim, Kristi; "Stroke of a pen captures data"; The Seattle Times; Apr. 10, 2006; pp. 1-3; The Seattle Times Company; Seattle; U.S.A.; located at http://seattletimes.nwsource.com/html/businesstechnology/2002921837_smartpen10.html; printed on Apr. 11, 2006.

"AirPen Storage Notebook"; Pegasus Technologies; pp. 1-2; bearing a date of Jul. 1, 2004; located at: http://www.pegatech.com/Articles/Article.asp?ArticleID=82&CategoryID=8; printed on Jan. 28, 2005.

Bricklin, Dan; "About Tablet Computing Old and New"; Dan Bricklin's Web Site: www.bricklin.com; bearing dates of Nov. 22, 2002, 1999-2004; pp. 1-7; located at: http://www.bricklin.com/tabletcomputing.htm; printed on Dec. 30, 2004.

Buderi, Robert; Huang, Gregory; "Microsoft plumbs China for IT talent"; NewScientist.com; bearing a date of Nov. 22, 2004; pp. 1-2; located at: www.Newscientist.com; printed on Jan. 7, 2005.

"Camedia Digital Camera AZ-1 Reference Manual"; Olympus Corporation; bearing a date of 2004; pp. 1-212.

"Extended abstract"; pp. 1-3; bearing a date of Sep. 16, 2003; located at : http://csidc.dcs.elf.stuba.sk/ips/project.html; printed on Jan. 3, 2005.

Handschuh, Siegfried; Staab, Steffen; Maedche, Alexander; "Cream- Creating relational metadata with a component-based, ontology-driven annotation framework"; Institute AIFB, University of Karlsruhe; Ontoprise GmbH; FZI Research Center for Information Technologies; pp. 1-8; Karlsruhe, Germany; located at: http://www.aifb.uni-karlsruhe.de/WBS/Sha/papers/kcap2001-annotate-sub.pdf; printed on Jan. 26, 2005.

Jesdanun, Anick; "'Tags' Ease Sifting of Digital Data"; Yahoo! Inc.; The Associated Press; bearing dates of May 2 and 2005; pp. 1-2; located at: http://news.yahoo.com/s/ap/20050502/ap_on_hi_te/social_tagging&printer=1; printed on May 3, 2005.

"Logitech® io™ personal digital pen"; Anotofunctionality.com—Logitech; bearing dates of Jul. 5, 2004 and 1997-2004; p. 1 of 1; located at: http://www.anotofunctionality.com/Default.asp?id=54; Anoto AB; printed on Jan. 12, 2005.

"Mobile Note Taker"; Pegasus—Digital Pens; bearing a date of 2003; pp. 1-4; located at: https://www.pegatech.com/shop/; Pegasus Technologies Ltd.; printed on Jan. 28, 2005.

"Mobile Note Taker"; Pegasus—Digital Pens; bearing a date of 2003; pp. 1-3; located at: https://www.pegatech.com/shop/; Pegasus Technologies Ltd.; printed on Mar. 7, 2005.

"Motion Tracking used in Biomechanic Applications"; bearing a date of 2004; pp. 1-3; Polhemus; Colchester, VT; printed on May 10, 2005; located at http://www.polhemus.com/MotionTrackingbiomechanics.htm.

"Nokia Digital Pen—As Personal as Your Signature"; Nokia—Messaging Enhancements—Nokia Digital Pen; bearing a date of 2004; p. 1 of 1; located at: http://www.nokia.com/nokia/0,5184,5787,00.html; Nokia.com; printed on Jan. 12, 2005.

"OTM Technologies: Products, VPen™—How does it work?"; OTM Technologies—VPen; pp. 1-2; located at: http://www.otmtech.com/vpen3.asp; printed on Jan. 3, 2005.

"OTM Technologies: Products, VPen—What is it?"; OTM Technologies—VPen; pp. 1-2; located at: http://www.otmtech.com/vpen.asp; printed on Jan. 3, 2005.

"PC Notes Taker tracking technology"; 2P; pp. 1-2; located at: http://www.pc-notetaker.com/; printed on Jan. 3, 2005.

Poupyrev, Ivan; Tomokazu, Numada; Weghorst, Suzanne; "Virtual Notepad: Handwriting in Immersive VR"; IS Lab, Hiroshima University; HIT Lab, University of Washington; bearing a date of Mar. 1998; pp. 1-7; Higashi-Hiroshima, Japan; Seattle, WA; printed on Jan. 3, 2005.

Stroud, Michael; "DigiPens Search for Write Market" Wired News; bearing a date of Dec. 21, 2002; pp. 1-2; located at: http://www.wired.com/news/print/0,1294,56951,00.html; printed on Jan. 12, 2005.

VPEN Brochure; "VPEN—Revolutionizing human interaction with the digital world™; OTM Technologies—Light Speed Innovation"; pp. 1-6; located at: http://www.otmtech.com/upload/publications/VPenBrochureFinal.pdf; printed on Jan. 3, 2005.

W., Daniel; Pegasus—Digital Pens : "News & Events>Review—Private review"; bearing dates of Feb. 1, 2004, and 2003; pp. 1-5; located at: http://www.pegatech.com/Articles/Article.asp?ArticleID=68&CategoryID=55; Pegasus Technologies; printed on Jan. 3, 2005.

Zhong, Youliang; Shen, Jianliang; Jin, Jesse S.; Zhang, Guoyin; "Sonar-based Visual Information Architecture for Handwriting Information Processing"; School of Computer Science & Engineering, University of New South Wales, Computer Science & Tech School of Harbin Engineering University; pp. 1-6; Australia, China; printed on Jan. 3, 2005.

U.S. Appl. No. 11/713,092, Cohen et al.

Excerpts from The Oxford English Dictionary $2^{nd}$ Edition; bearing a date of 1989; printed on Apr. 1, 2009; pp. 1-4 and pp. 1-2 (as provided by examiner).

"6 tips for adding international characters and symbols to your document, for Microsoft Office Word 2003, Microsoft Word 2000 and 2002"; Microsoft Office Online; Bearing a date of 2009; pp. 1-6; Microsoft Corporation; printed on Jun. 6, 2009; located at: http://office.microsoft.com/en-us/world/HA011268771033.aspx (as provided by examiner).

Definition of "tag"; Merriam Webster Online Dictionary; pp. 1-2; located at http://www.meriam-webster.com/dictionary/tag (as provided by examiner).

Shneiderman et al.; "Direct Annotation: A Drag-and-Drop Strategy for Labeling Photos"; bearing a date of 2000; pp. 88-95; © 2000 IEEE.

* cited by examiner

FIG. 27
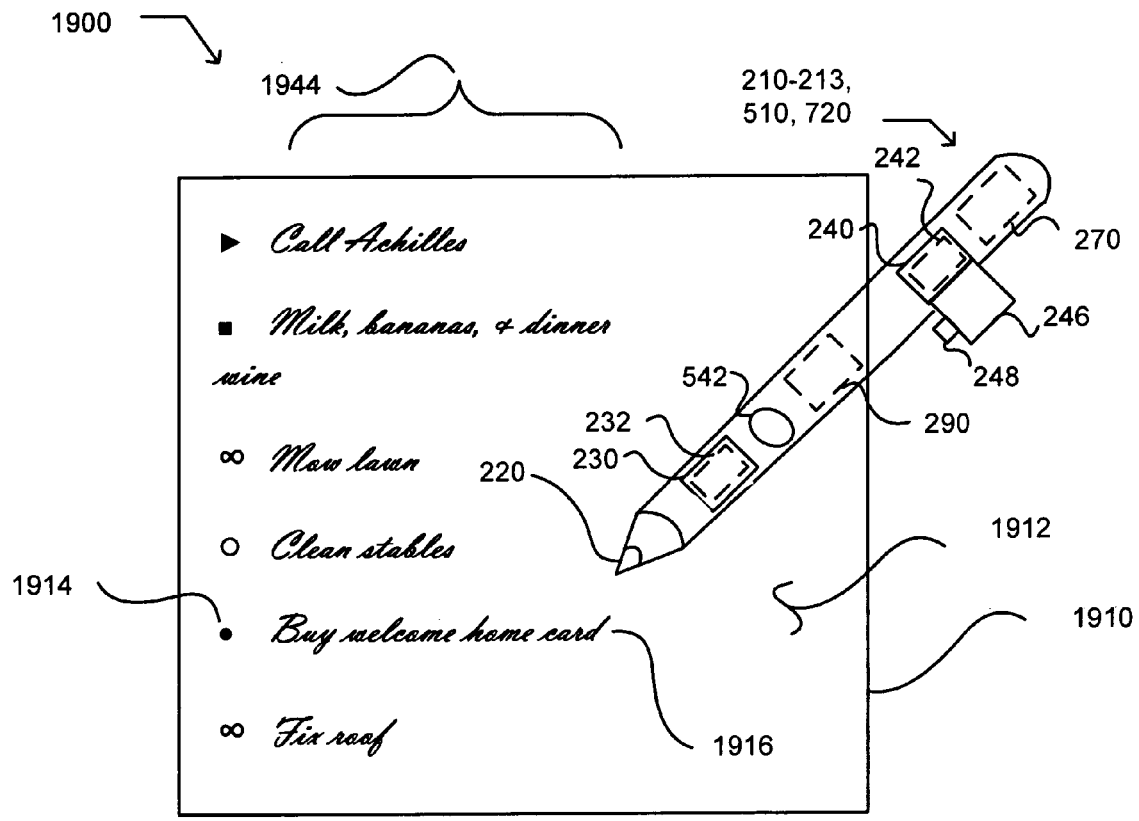
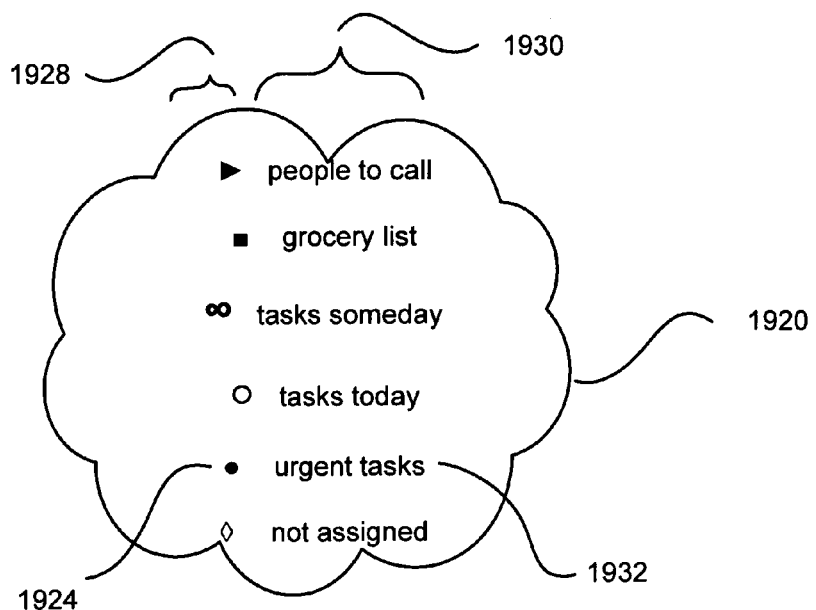

3272 A computer-readable signal-bearing medium.

3274 Program instructions operable to perform a process in a computer system, the process comprising:
a) receiving a content signal indicative of information handwritten to a preformed region of a surface having at least two preformed regions;
b) receiving a label signal indicative of a unique machine-distinguishable identifier associated with the preformed region of a surface having at least two preformed regions; and
c) in response to the label signal, distributing to a data recipient a representation of the information handwritten to the preformed region.

3276 The computer-readable signal-bearing medium includes a computer storage medium.

3278 The computer-readable signal-bearing medium includes a communication medium.

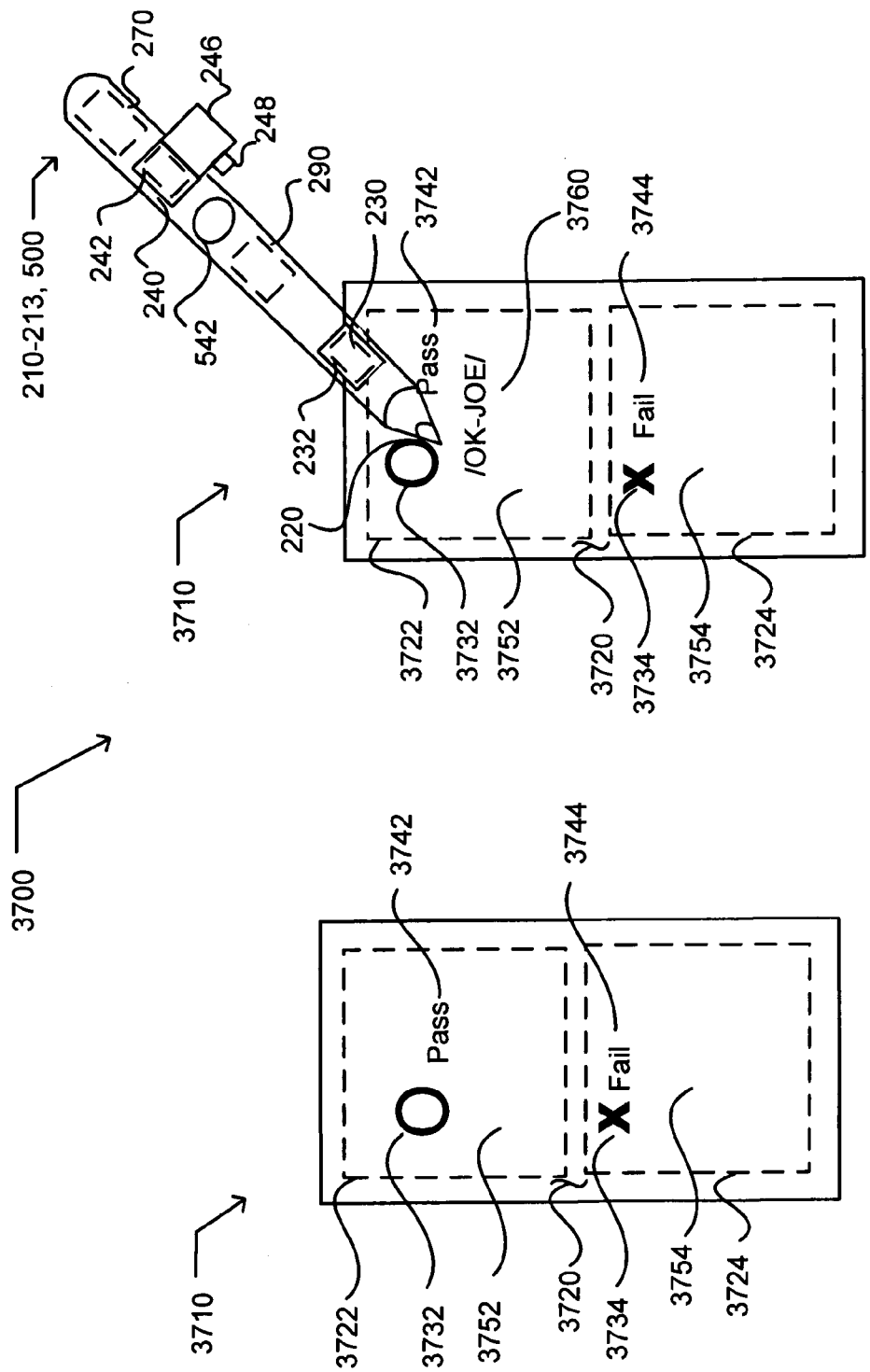

FORMS FOR COMPLETION WITH AN ELECTRONIC WRITING DEVICE

PRIORITY CLAIM, CROSS-REFERENCE TO RELATED APPLICATION, AND INCORPORATION BY REFERENCE

The present application is related to, claims the earliest available effective filing date(s) from (e.g., claims earliest available priority dates for other than provisional patent applications; claims benefits under 35 U.S.C. §119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. For purposes of the USPTO extra-statutory requirements, the present application constitutes a continuation in part of currently co-pending U.S. patent application entitled ELECTRONIC ACQUISITION OF A HAND FORMED EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr., as inventors, filed Mar. 18, 2005, Ser. No. 11/083,567.

2. For purposes of the USPTO extra-statutory requirements, the present application constitutes a continuation in part of currently co-pending U.S. patent application entitled ACQUISITION OF A USER EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr., as inventors, filed Mar. 31, 2005, Ser. No. 11/097,977.

3. For purposes of the USPTO extra-statutory requirements, the present application constitutes a continuation in part of currently co-pending U.S. patent application entitled ACQUISITION OF A USER EXPRESSION AND AN ENVIRONMENT OF THE EXPRESSION, naming Alexander J. Cohen, Edward K. Y. Jung, Royce A. Levien, Robert W. Lord, Mark A. Malamud, and John D. Rinaldo, Jr., as inventors, filed Mar. 31, 2005, Ser. No. 11/097,980.

4. For purposes of the USPTO extra-statutory requirements, the present application constitutes a continuation in part of currently co-pending U.S. patent application entitled ELECTRONIC ASSOCIATION OF A USER EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr., as inventors, filed Apr. 25, 2005, Ser. No. 11/114,245.

5. For purposes of the USPTO extra-statutory requirements, the present application constitutes a continuation in part of currently co-pending U.S. patent application entitled PERFORMING AN ACTION WITH RESPECT TO A HAND-FORMED EXPRESSION, naming Alexander J. Cohen, Edward K. Y. Jung, Royce A. Levien, Robert W. Lord, Mark A. Malamud, and John D. Rinaldo, Jr., as inventors, filed May 25, 2005, Ser. No. 11/137,716.

6. For purposes of the USPTO extra-statutory requirements, the present application constitutes a continuation in part of currently co-pending U.S. patent application entitled PERFORMING AN ACTION WITH RESPECT TO A HAND-FORMED EXPRESSION, naming Alexander J. Cohen, Edward K. Y. Jung, Royce A. Levien, Robert W. Lord, Mark A. Malamud, and John D. Rinaldo, Jr., as inventors, filed May 25, 2005, Ser. No. 11/137,694.

7. For purposes of the USPTO extra-statutory requirements, the present application constitutes a continuation in part of currently co-pending U.S. patent application entitled OUTPUTTING A SAVED HAND-FORMED EXPRESSION, naming Alexander J. Cohen, Edward K. Y. Jung, Royce A. Levien, Robert W. Lord, Mark A. Malamud, and John D. Rinaldo, Jr., as inventors, filed May 25, 2005, Ser. No. 11/137,687.

8. For purposes of the USPTO extra-statutory requirements, the present application constitutes a continuation in part of currently co-pending U.S. patent application entitled MACHINE-DIFFERENTIATABLE IDENTIFIERS HAVING A COMMONLY ACCEPTED MEANING, naming Alexander J. Cohen, Edward K. Y. Jung, Royce A. Levien, Robert W. Lord, Mark A. Malamud, and John D. Rinaldo, Jr., as inventors, filed Jun. 24, 2005, Ser. No. 11/166,780 filed contemporaneously herewith.

9. For purposes of the USPTO extra-statutory requirements, the present application constitutes a continuation in part of currently co-pending U.S. patent application entitled HANDWRITING REGIONS KEYED TO A DATA RECEPTOR, naming Alexander J. Cohen, Edward K. Y. Jung, Royce A. Levien, Robert W. Lord, Mark A. Malamud, and John D. Rinaldo, Jr., as inventors, filed Jun. 24, 2005, Ser. No. 11/166,035 filed contemporaneously herewith.

10. For purposes of the USPTO extra-statutory requirements, the present application constitutes a continuation in part of currently co-pending U.S. patent application entitled ARTICLE HAVING A WRITING PORTION AND PRE-FORMED IDENTIFIERS, naming Alexander J. Cohen, Edward K. Y. Jung, Royce A. Levien, Robert W. Lord, Mark A. Malamud, and John D. Rinaldo, Jr., as inventors, filed Jun. 24, 2005, Ser. No. 11/167,072 filed contemporaneously herewith.

SUMMARY

An embodiment provides an article of manufacture. The article of manufacture includes a display surface that includes a machine-distinguishable form identifier keyed to an electronic version of the form and at least two fields. Each field of the at least two fields respectively includes a unique machine-distinguishable field identifier keyed to a field of the electronic version of a form, a content area that accepts a hand-formed entry, and a unique user-understandable field identifier. In addition to the foregoing, other article of manufacture embodiments are described in the claims, drawings, and text forming a part of the present application.

Another embodiment provides a system. The system includes an article of manufacturer and a computer program product. The article of manufacture includes a display surface that includes a machine-distinguishable form identifier keyed to an electronic version of the form and at least two fields. Each field of the at least two fields respectively having a unique machine-distinguishable field identifier keyed to a field of the electronic version of a form, a content area that accepts a hand-formed entry, and a unique human-understandable field name. The computer program product includes a computer-readable signal-bearing medium bearing program instructions operable to perform a process in a computer system. The process includes receiving a document signal indicative of the machine-distinguishable form identifier keyed to an electronic version of a form. The process also includes receiving an element signal indicative of the unique machine-distinguishable field identifier of a field of the at least two fields, and receiving a mark signal indicative of a hand-formed entry in the content area of the field of the form. The process includes distributing a representation of the hand-formed entry to the electronic version of a form. In addition to the foregoing, other system embodiments are described in the claims, drawings, and text forming a part of the present application.

An embodiment provides a method. The method includes generating a document signal indicative of a form having at least one field, each field of the form respectively having a unique machine-distinguishable identifier and a content area. The method also includes generating an element signal indicative of the unique machine-distinguishable field identifier for a field of the at least one field. The method further includes generating a mark signal indicative of a hand-formed entry in the content area of the field of the at least one field. The method may include electronically associating the field of the at least one field and a representation of the hand-formed entry in the content area. The method may include electronically associating the field of the at least one field and a representation of the hand-formed entry in the content area in response to the element signal and the mark signal. The method may include saving the electronically associated field of the at least one field and a representation of the hand-formed entry in the content area in an electronic version of the form having an identifier associated with a user. In addition to the foregoing, other method embodiments are described in the claims, drawings, and text forming a part of the present application.

Another embodiment provides a device. The device includes a means for generating a document signal indicative of a real-world form having at least one field, each field of the form respectively having a unique machine-distinguishable identifier and a content area. The device also includes a means for generating an element signal indicative of the unique machine-distinguishable field identifier for a field of the at least one field. The device includes a means for generating a mark signal indicative of a hand-formed entry in the content area of the field of the form. The device may include a means for electronically associating the field of the at least one field and a representation of the hand-formed entry. In addition to the foregoing, other device embodiments are described in the claims, drawings, and text forming a part of the present application. A further embodiment provides an article of manufacture. The article of manufacture includes a real-world form keyed to an electronic version of the form and a display surface having at least one field. Each field of the at least one field respectively having a unique machine-distinguishable field identifier keyed to a field of the electronic version of a form, a content area that accepts a hand-formed entry, and a unique user-understandable field identifier. In addition to the foregoing, other article of manufacture embodiments are described in the claims, drawings, and text forming a part of the present application.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 27 illustrates an environment in which embodiments may be implemented;

FIG. 38 illustrates a partial view of an exemplary computer program product;

FIGS. 53A and 53B illustrate a partial view of an exemplary environment in which embodiments may be implemented.

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
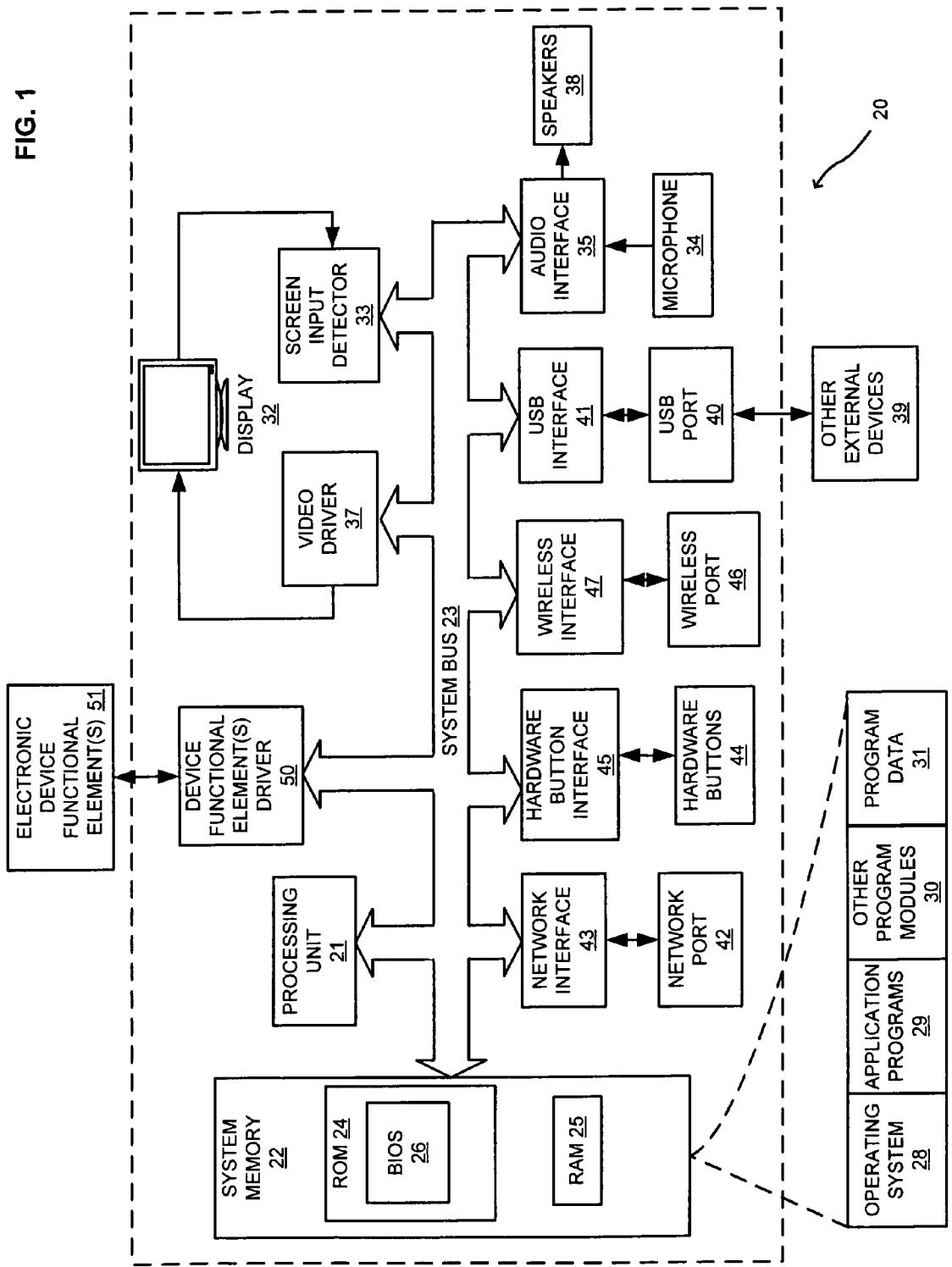
FIG. 1 illustrates an exemplary system in which embodiments may be implemented, including a thin computing device.

FIG. 1 and the following discussion are intended to provide a brief, general description of an environment in which embodiments may be implemented. FIG. 1 illustrates an exemplary system that includes a thin computing device 20 that interfaces with an electronic device (not shown) that includes one or more functional elements 51. For example, the electronic device may include any item having electrical and/or electronic components playing a role in a functionality of the item, such as a limited resource computing device, a digital camera, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30, and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device 20 may be designed to include a user interface having a physical keyboard (not shown).

The device functional elements (not shown) are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and a camera capturing and saving an image.

Figure 2:
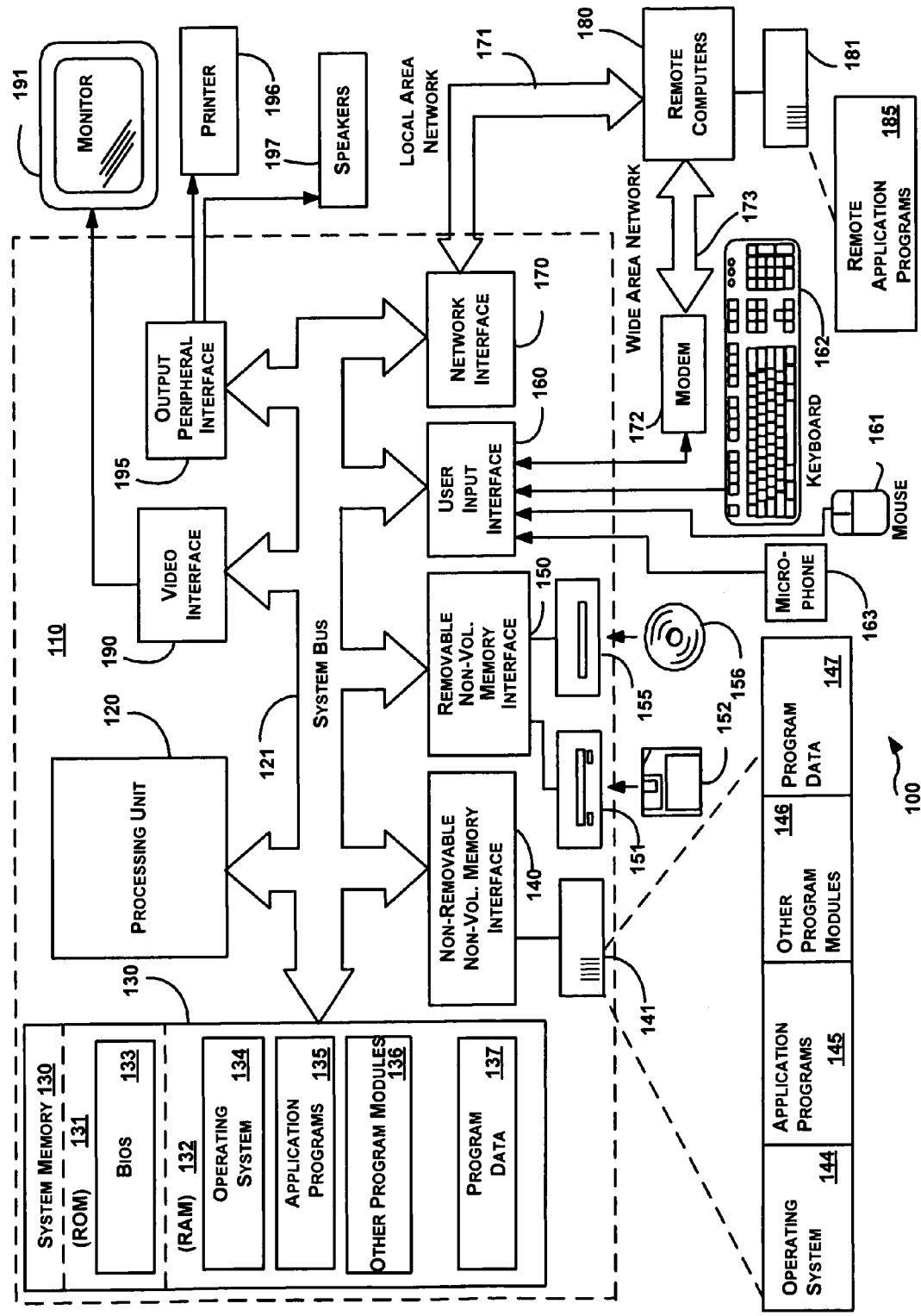
FIG. 2 illustrates another exemplary system in which embodiments may be implemented, including a general-purpose computing device.

FIG. 2 illustrates another exemplary system in which embodiments may be implemented. FIG. 2 illustrates an electronic device that may correspond in whole or part to a general-purpose computing device, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, certain embodiments may be described with reference to acts and symbolic representations of operations that are performed by one or more computing devices, such as computing device 110 of FIG. 2. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIG. 2 illustrates an example of a suitable environment on which embodiments may be implemented. The computing system environment 100 of FIG. 2 is an example of a suitable environment and is not intended to suggest any limitation as to the scope of use or functionality of an embodiment. Neither should the environment be interpreted as having any dependency or requirement relating to any one or combination of components illustrated in an exemplary operating environment.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, server computers, handheld or laptop devices, personal digital assistants, multiprocessor systems, microprocessor-based systems, set top boxes, programmable consumer electronics, network, minicomputers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in distributed computing environments where tasks are performed by remote processing devices that are linked through a communications network. In a distributed computing environment, program modules may be located in both local and remote computer storage media including memory storage devices.

The following includes a series of illustrations depicting implementations of processes. For ease of understanding, certain illustrations are organized such that the initial illustrations present implementations via an overall "big picture" viewpoint and thereafter the following illustrations present alternate implementations and/or expansions of the "big picture" illustrations as either sub-steps or additional steps building on one or more earlier-presented illustrations. This style of presentation utilized herein (e.g., beginning with a presentation of a illustration(s) presenting an overall view and thereafter providing additions to and/or further details in subsequent illustrations) generally allows for a rapid and easy understanding of the various process implementations.

Figure 3:
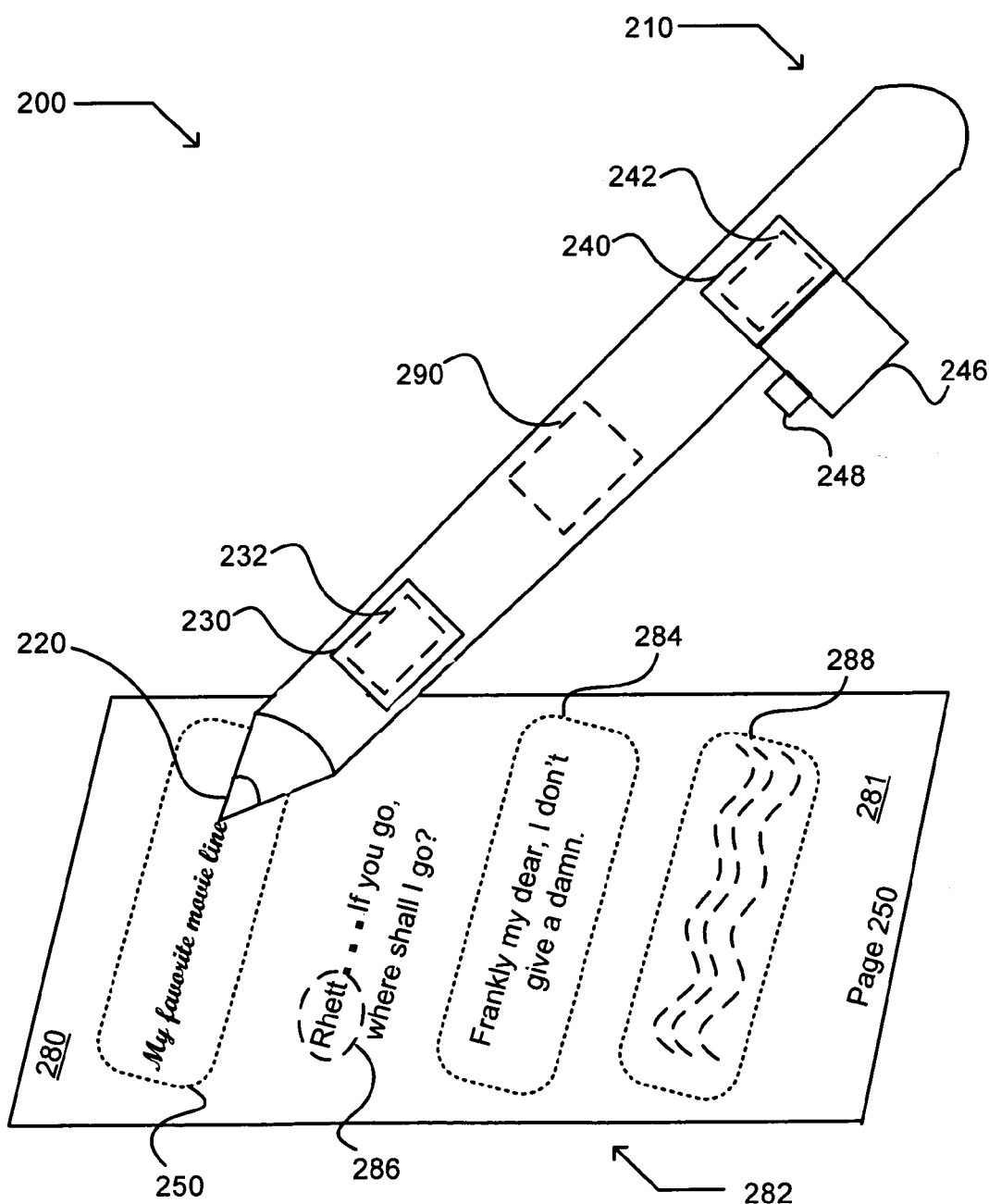
FIG. 3 illustrates an environment that includes partial view of an exemplary handheld writing device, and an exemplary document environment.

FIG. 3 illustrates an environment 200 that includes partial view of exemplary handheld writing device 210, and an exemplary document environment 280. In an embodiment, the exemplary document environment 280 (hereafter "document 280") may include a single sheet, a part of a page, a single page, a poster, a display, multiple pages, a chapter, a volume, and/or a file. In a further embodiment, the document may include a book, such as a bound volume, a box, such as a retail package, a container, a carton, a label, a currency bill or note, and/or check. In another embodiment, the document may include an article of clothing, an item, a structure, a vehicle, and/or an indicator, such as a temperature gauge or speedometer. In an embodiment, a document includes any thing having a human recognizable content.

The document 280 includes a content portion 282. The content portion 282 may include a word 286, illustrated as a word "Rhett," a phrase 284, illustrated as the phrase "Frankly my dear, I don't give a damn," and/or other printed or native content, schematically illustrated as a textual paragraph 288. In another embodiment, the content portion may include a textual content portion. For example, a textual content portion may include words printed on a page, such as a page of a book, and/or words printed on a cover or a spine of a book. In a further embodiment, the content portion may include a human language content, for example, text printed in roman alphabet characters, math symbols, and/or script characters such as Asian language characters. In another embodiment, the content portion may include a human readable content, and/or graphical content. In an embodiment, the content portion may include a graphical content having a meaning or a significance to a human, such as a picture, a drawing, a figure, a photograph, an illustration, a diagram, a doodle, a decoration, a sketch, and/or a portrait. In another embodiment, the content portion may be arbitrary and not recognizable by an individual human reader. In a further embodiment, the content portion may include any content primarily useful to a human reader. For example, a content portion may include a textual and/or graphical label on a retail article, such as clothing, a retail package, or a carton. A content portion may include an address written on shipping label or an address written on a side of a building. A content portion may include an odometer reading on a vehicle or a temperature reading on a thermometer. In another embodiment, the content portion may include an incidental element not primarily employed by a human reader but that aids in distinguishing the document. For example, an incidental element may include a coffee stain, a torn page, and/or a physical attribute of the document. In an embodiment, a content portion may include a human and/or machine recognizable characteristic form or shape, such a pair of skis, a car, and/or a dress.

In an embodiment, the content portion 282 of the document 280 may be displayed on a surface 281, such as a paper surface, a surface of a sheet of paper, a surface of a newspaper, a surface of a book, and/or a surface of a poster. In a further embodiment, the surface may include a surface of a box, a surface of a container, a surface of a carton, a surface of a label, a surface of a currency bill or note, and/or a surface of a check. In another embodiment, a surface may include a surface of an article of clothing, a surface of an item, a surface of a structure, a surface of a vehicle, and/or a surface of an indicator. In an embodiment, a surface may include content located in at least two planes. In another embodiment, a surface may include a planar surface. In an embodiment, the content portion 282 may be electronically displayed, such as a text displayed through the surface 281, and/or a text projected on the surface. The surface electronically displaying the content portion may include a surface of a computer monitor, a surface of a television screen, and/or a surface of an e-paper, The exemplary handheld writing device 210 includes a writing element 220. In an embodiment, the writing element may include an active writing element, such as an ink cartridge operable to discharge a marking fluid onto a surface of a document. The active writing element may include a replaceable ink cartridge. In another embodiment, the active writing element may include a pencil lead. In a further embodiment, the writing element may include a non-marking element, such as non-marking stylus.

The writing device 210 also includes a writing detector module 230 operable to generate information indicative of a handwriting movement 250 by the writing element 220. The handwriting movement is illustrated as "My favorite movie line." The writing detector module 230 may be implemented in any manner, including software, hardware, firmware, and/or a combination thereof. An embodiment of the writing detector module 230 may be implemented using reflected light, optical image, sonar, ultrasound, and/or accelerometer detection of a handwriting movement. The handwriting movement may be formed in response to hand movements. In an alternative embodiment, the handwriting movement may be formed in response to movements of another part of a body, such as by movement of a user's head while holding the writing device in their mouth.

In an embodiment, "information" includes data that may be processed, stored, or transmitted by a computing device. In another embodiment, "information" includes a meaning of data as may be interpreted by or meaningful to people. In an embodiment, "data" includes a piece or pieces of information. Data may include facts, quantities, characters, and/or symbols. Data may be subject to operations by a computer, saved, and transmitted by electrical signals.

In an embodiment, the writing detector module 230 may be implemented by illuminating a surface 281 of the document 280 from the handheld writing device 210, and determining the handwriting movement 250 of the writing element 220 in response to reflected illumination from the surface, such as more fully described in U.S. Pat. No. 6,741,335, titled OPTICAL TRANSLATION MEASUREMENT, issued on May 25, 2004, Kinrot, et al. as inventor; U.S. Pat. No. 6,452,683, titled OPTICAL TRANSLATION MEASUREMENT, issued on Sep. 17, 2002, Kinrot, et al. as inventor; and U.S. Pat. No. 6,330,057, titled OPTICAL TRANSLATION MEASUREMENT, issued on Dec. 11, 2001, Lederer, et al. as inventor, each of which is incorporated herein by reference in their entirety for all that they disclose and teach. In another embodiment, the writing detector module may be implemented by capturing images of a pattern in a writing base and handwriting movements of the pen determined by calculating positions of the writing element based on the images of the writing base, such as more fully described in U.S. Pat. No. 7,180,509 (published as US 2004/0179000) titled ELECTRONIC PEN, MOUNTING PART THEREFOR AND METHOD OF MAKING THE PEN, filed Jun. 26, 2002, under application Ser. No. 10/179,949, Fermgard, et al. as inventor, which is incorporated herein by reference in its entirety for all that is discloses and teaches. In a further embodiment, the writing detector module may be implemented using ultrasound to track a handwriting movement of a writing element, such as more fully described in U.S. Pat. No. 6,876,356 (published as US 2003/0173121) titled DIGITZER PEN filed Mar. 18, 2002, under application Ser. No. 10/098,390, Zloter, et al. as inventor, which is incorporated herein by reference in its entirety for all that it discloses and teaches. In an embodiment, the writing detector module may be implemented using a sensor package that measures velocity, acceleration, and angular acceleration in a handheld writing device, such as more fully described in U.S. Pat. No. 6,993,451 (published as US 2004/0260507) titled 3D INPUT APPARATUS AND METHOD THEREOF, filed Jun. 17, 2004 under application Ser. No. 10/868,959, Chang, et al. as inventor, which is incorporated herein by reference in its entirety for all that it discloses and teaches. In another embodiment, the writing detector module may be implemented using an image processing approach that captures and saves segments of a writing movement as a separate image. The final output is a combination of multiple images superimposed on each other.

In another embodiment, the writing detector module 230 may generate information indicative of a handwriting movement 250 by capturing images of the handwriting movement, and stitching the images together.

In an embodiment, the writing detector module 230 may include an electrical circuit 232 operable to generate information indicative of a handwriting movement of the writing element. In a further embodiment, the writing detector module 230 may include operability to generate information indicative of a movement of the writing element generated by an activity of writing by hand. In another embodiment, the writing detector module may include operability to generate information indicative of a movement of the writing element in response to a hand generated activity.

In a further embodiment, the writing detector module 230 may generate raw handwriting movement information. In another embodiment, the writing detector module may process the raw handwriting movement information.

The writing device 210 also includes a context detector module 240 operable to generate information indicative of a content portion of a document proximate to the handwriting movement of the writing element. In an embodiment, a content portion of a document proximate to the handwriting may include a content portion separated from the handwriting movement of less than approximately one to two inches. In another embodiment, a content portion of a document proximate to the handwriting movement may include a content portion and a handwriting movement both on a page. In a further embodiment, a content portion of a document proximate to the handwriting movement may include a content portion on a body that includes the handwriting movement. In an inanimate example, the content portion may be a book title and/or author printed on a book spine or cover, and the handwriting movement being on a page of the book. In an animate example, the content portion may include a portion of a human body, such as a skin surface having a landmark, and the handwriting movement being on the skin surface and proximate to the landmark, such a surgeon marking incision lines before beginning a procedure.

The context detector module 240 may be implemented in any manner, including software, hardware, firmware, and/or any combination thereof. In an embodiment, the context detector module 240 may include an electrical circuit 242 operable to generate information indicative of a content portion 282 of a document proximate to the handwriting movement of the writing element 220, such as the phrase 284 and/or the word 286. An embodiment includes a context detector module operable to generate information indicative of a content portion of a displayed document proximate to the handwriting movement of the writing element. A further alternative embodiment includes a context detector module operable to generate information indicative of a content portion of an electronically displayed document proximate to the handwriting movement of the writing element. Another embodiment includes a context detector module operable to generate information indicative of a printed content portion of a document proximate to the handwriting movement of the writing element. An embodiment includes a context detector module operable to generate information indicative of a printed content portion of a paper-based document proximate to the handwriting movement of the writing element. A further alternative embodiment includes a context detector module operable to generate information indicative of a content portion of an e-paper document proximate to the handwriting movement of the writing element.

In an embodiment, the context detector module 240 may include an image capture device 246 having a lens 248. The image capture device 246 includes operability to capture at least one image of the content portion 282 proximate to the handwriting movement 250, such as the phrase 284 and/or the word 286. The image capture device 246 and the lens 248 may have any location with respect to the handheld writing device 210 suitable for capturing at least one image of a content portion proximate to the handwriting movement, including within an outer periphery of the handheld writing device, and/or outside the outer periphery. In another embodiment, the image capture device 246 includes operability to capture image information of the displayed content portion proximate to the handwriting movement with a resolution sufficient to render the image information into textural information by an optical character resolution process.

In a further embodiment, the image capture device 246 includes operability to capture at least one image of a displayed content portion as a writer moves the writing element 220 of the handheld writing device 210 toward the document 280. In another embodiment, the image capture device includes operability to capture at least one image of a displayed content portion as a writer imparts a handwriting movement to the writing element. In a further embodiment, the image capture device includes operability to capture at least one image of a displayed content portion as a writer moves the writing element of the handheld writing device away from the document. The lens 248 may include a user adjustable orientation allowing a user to optimize image capture.

In an embodiment, the context detector module 240 may include a user activatable switch (not shown) allowing a user to select when the information indicative of a content portion of a document element will be captured. For example, the image capture device 246 may include a user activatable switch allowing a user to select when an image of a content portion is obtained. A user may aim the lens 248 at a content portion and capture an image by activating the switch. The switch may include a hardware switch, a motion sensitive switch, and/or a voice activated switch.

In an embodiment, the context detector module 240 may further include operability to acquire contextual information from another source, and to use that contextual information to generate information indicative of a content portion of a document proximate to the handwriting movement of the writing element. For example, the handwriting movement may occur proximate to a surface or a device operable to generate contextual information indicative of a content portion of a document proximate to the handwriting movement. The surface may include a touch sensitive screen coupled to a circuit operable to generate the contextual information. Alternatively, the handwriting movement may occur proximate to a surface monitored by an ultrasonic system coupled to a circuit operable to generate contextual information indicative of a content portion of a document proximate to the handwriting movement.

In a further embodiment, the context detector module 240 may generate raw information indicative of a content portion of a document proximate to the handwriting movement of the writing element. In another embodiment, the context detector module may process the raw context portion information.

In another embodiment, the context detector module 240 may include operability to generate information indicative of a content portion of a document proximate to the handwriting movement using other technologies. For example, information indicative of a content portion may be generated using data from a radio frequency identification device (RFID) associated with the document, a global positioning satellite system, and/or other data signal.

In an alternative embodiment, the handheld writing device 210 may include a recognition module 290. The recognition module includes operability to generate information indicative of a human readable content in response to the information indicative of the hand driven movement of the writing element. For example, in an embodiment, the recognition module may determine a presence of human readable content in the information indicative of the hand driven or handwriting movement 250 generated by the writing detector module 230, recognize the human readable content as "My favorite movie line," and generate information indicative of that content. In another embodiment, the recognition module may determine a presence of human readable content, recognize the handwriting movements as forming the human readable content as a script character, and generate information indicative of that script character.

In an operation of an embodiment, a reader may wish to annotate the document 280 with a comment or sketch. The reader holds the handheld writing device 210 in their hand in a manner similar to a conventional pen or pencil, and begins handwriting an annotation using the writing element 220 proximate to a content portion 282. The handheld writing device 210 captures a handwriting movement, or hand driven movement, of the writing element imparted by the user's hand to the writing device, and through the writing detector module 230, generates information indicative of the handwriting movement. The handheld writing device captures a context of the handwriting movement through the context detector module 240 by capturing at least one image of the content portion of the document proximate to the handwriting movement. The context may be captured before the handwriting movement, during the handwriting movement, and/or after the handwriting movement. The context detector module generates information indicative of the content portion of the document proximate to the handwriting movement.

Figure 4:
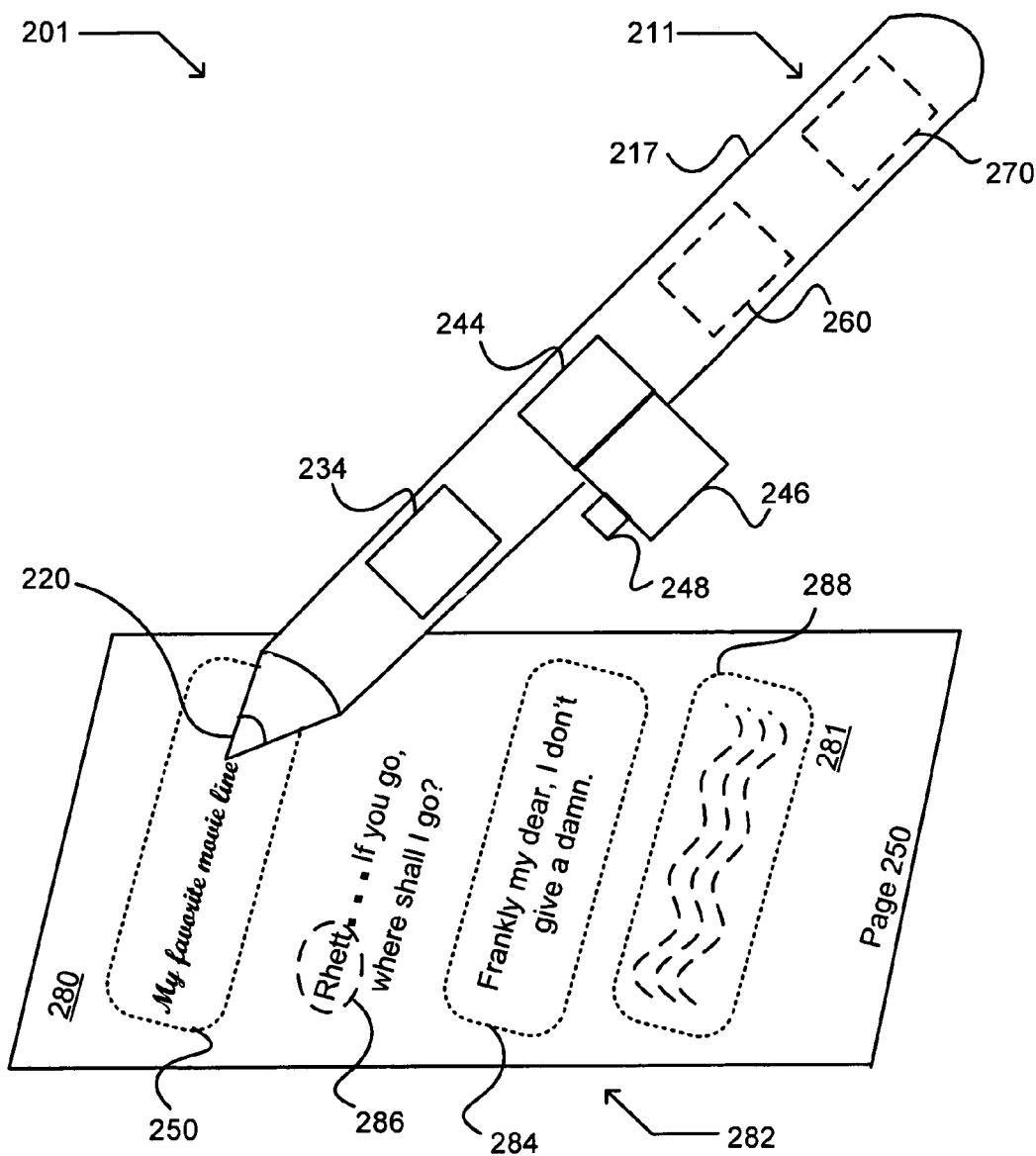
FIG. 4 illustrates a partial view of an environment that includes an exemplary electronic pen, and the exemplary document environment of FIG. 3.

FIG. 4 illustrates a partial view of an environment 201 that includes an exemplary electronic pen 211, and the exemplary document environment 280 of FIG. 3. The electronic pen 211 includes a generally elongated body 217 and the writing element 220 extending from the generally elongated body. In an embodiment, the writing element may be configured to make a visible mark. A visible mark may include any mark visible to a human eye. For example, a visible mark may include an ink mark, and/or a pencil mark. A visible mark may include a letter, a character, a symbol, a line, and/or a figure.

The electronic pen 211 also includes a writing detector module 234 operable to generate information indicative of a hand driven movement of the writing element. In an embodiment, a hand driven movement includes a hand-generated movement. In an alternative embodiment, the writing detector module includes operability to generate information indicative of a hand driven movement of the writing element in contact with the surface 281 of a document 280. In another alternative embodiment, the writing detector module includes operability to generate information indicative of a hand driven movement of the writing element in contact with the surface of a paper document. In a further embodiment, the writing detector module includes operability to generate information indicative of a hand driven movement of the writing element in contact with a surface displaying an electronic document. The writing detector module may be implemented in any manner, including software, hardware, firmware, and/or a combination thereof. An embodiment of the writing detector module may be implemented using reflected light, optical image, sonar, ultrasound, and/or accelerometer detection of the handwriting movement. In an embodiment, the writing detector module may be implemented in a manner at least substantially similar to the writing detector module 230 of FIG. 3.

The electronic pen further includes a context detector module 244 operable to generate information indicative of a content portion of a document proximate to the hand driven movement of the writing element. In an alternative embodiment, the context detector module may include operability to generate information indicative of a content portion of a page of multiage document proximate to the handwriting movement of the writing element. In another alternative embodiment, the context detector module may include operability to generate information indicative of a hand-generated writing movement of the writing element. The context detector module 244 may be implemented in any manner, including software, hardware, firmware, and/or any combination thereof. In an embodiment, the context detector module 244 may be implemented in a manner at least substantially similar to the writing detector module 240 of FIG. 3.

In an alternative embodiment, the electronic pen 211 may include at least one additional module. Additional modules may include a communications module 260 and a storage module 270. In an embodiment, the communications module 260 includes operability to transmit at least one of the signal indicative of a hand driven movement of a writing element and the signal indicative of at least a portion of a document proximate to the hand driven movement of the writing element. The term "signal" means at least one current signal, voltage signal, or signal. In another embodiment, the communications module includes operability to transmit in real time at least one of the information indicative of a hand driven movement of a writing element and the information indicative of at least a portion of a document proximate to the hand driven movement of the writing element. In a further embodiment, the communications module includes operability to transmit at least one of processed information corresponding to the information indicative of a handwriting movement of a writing element and processed information corresponding to the information indicative of at least a portion of a document proximate to the writing movement of the writing element.

The communications module 260 may transmit a signal. In an optional embodiment, the communications module both receives and transmits signals (transceiver). For example and without limitation, "signal" includes a current signal, voltage signal, magnetic signal, or optical signal in a format capable of being stored, transferred, combined, compared, or otherwise manipulated. The communications module may include wireless, wired, infrared, optical, and/or other communications techniques. In an embodiment, the communications module may include operability for communication with a computing device, such as the thin computing device 20 of FIG. 1, and/or the computing device 110 of FIG. 2. The communications module may include an antenna for wireless communication, a connection for wired connection, and/or an optical port for optical communication.

The digital storage module 270 may include any suitable digital storage medium. For example, a digital storage medium may include a computer storage medium. The digital storage module includes operability to save at least one of the information indicative of a hand driven movement of a writing element and the information indicative of at least a portion of a document proximate to the hand driven movement of the writing element. Information may be saved in any form or format, such as a raw data form, or a processed data form. In conjunction with the communications module 260, information may be saved as generated and then be available for uploading at a later time. For example, information may be stored, batched, and subsequently transmitted. In another example, information may be stored, and subsequently transmitted after the electronic pen 211 is docked.

In operation of an embodiment, the electronic pen 211 acquires a handwritten annotation and a context of the handwritten annotation in a manner at least substantially similar to the handheld writing device 210 of FIG. 3. In addition, the electronic pen 211 may transmit signals indicative of the handwritten annotation and the context of the annotation using the communication module 260. One or both of the signals may be transmitted in real time as a reader writes an annotation. In an alternative embodiment, one or both of the signals may be processed by a component of the electronic pen prior to transmission. In another alternative embodiment, the electronic pen may save one or both of the signals in the digital storage medium 270. The saved signal may be transmitted at a later time.

Figure 5:
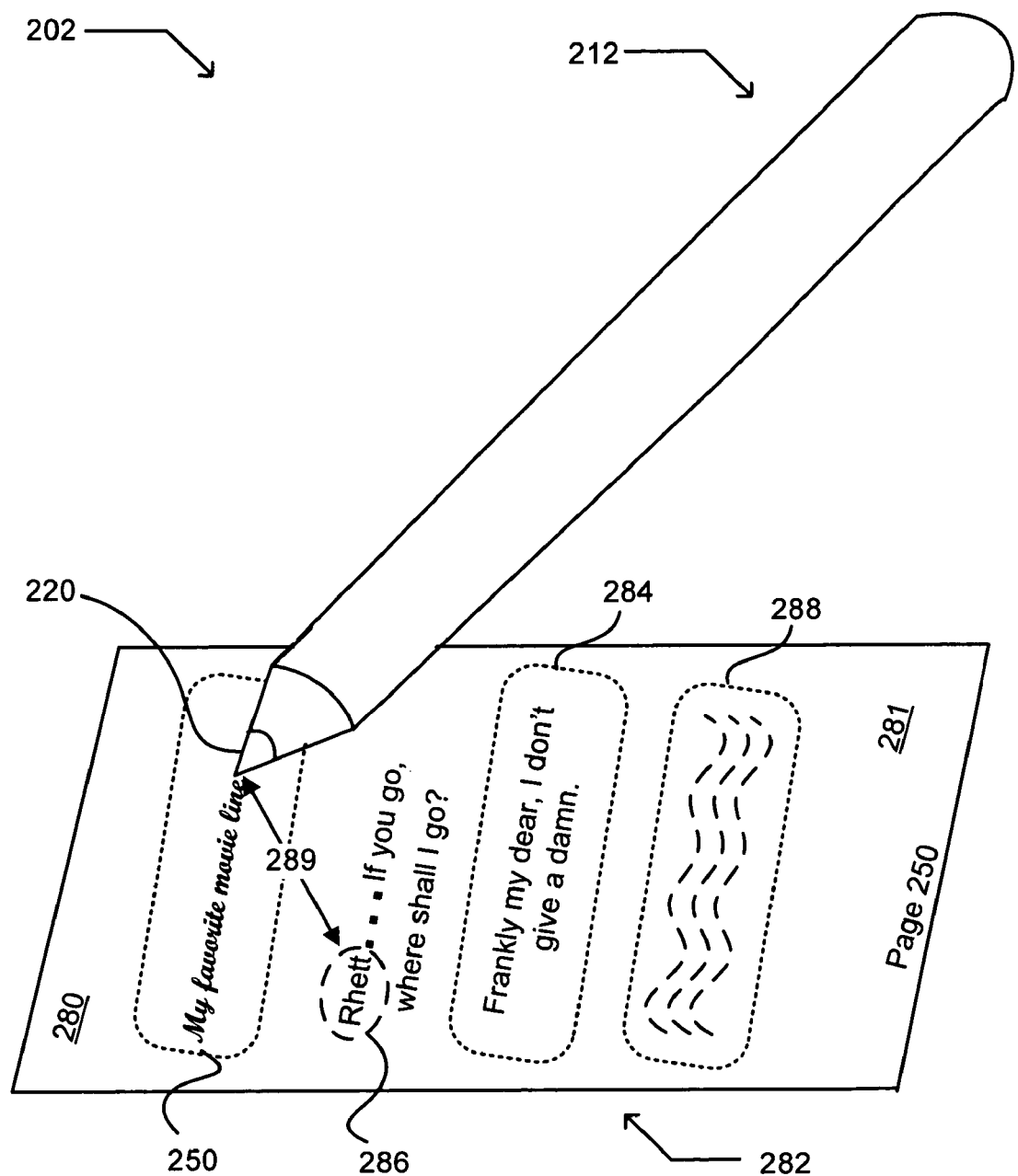
FIG. 5 illustrates a partial view of an environment that includes an exemplary apparatus, and the exemplary document environment of FIG. 3.

FIG. 5 illustrates a partial view of an environment 202 that includes an exemplary apparatus 212, and the exemplary document environment 280 of FIG. 3. The apparatus 212 includes operability to mark the document 280, such as the handwriting movement 250, and to generate an electronic indicator of a position 289 of the mark relative to an existing character, such as the word 286 "Rhett" of the document. The indicator 289 of a position of the mark relative to an existing word 286 may be expressed in any manner, including an indication in Cartesian coordinates, and/or spherical coordinates. In an embodiment, the existing character of the document includes at least one existing letter displayed by the document. In another embodiment, the existing character of the document includes at least one existing word displayed by the document. In a further embodiment, the document includes at least one existing image displayed by the document.

In an alternative embodiment, the apparatus 212 includes a pen configured to mark relative to an existing character, such as the word 286, of a document 280 based, at least in part, on a marking position 289 relative to the existing character of the document, wherein the mark and an indicator of the marking position are saved within the pen.

Figure 6:
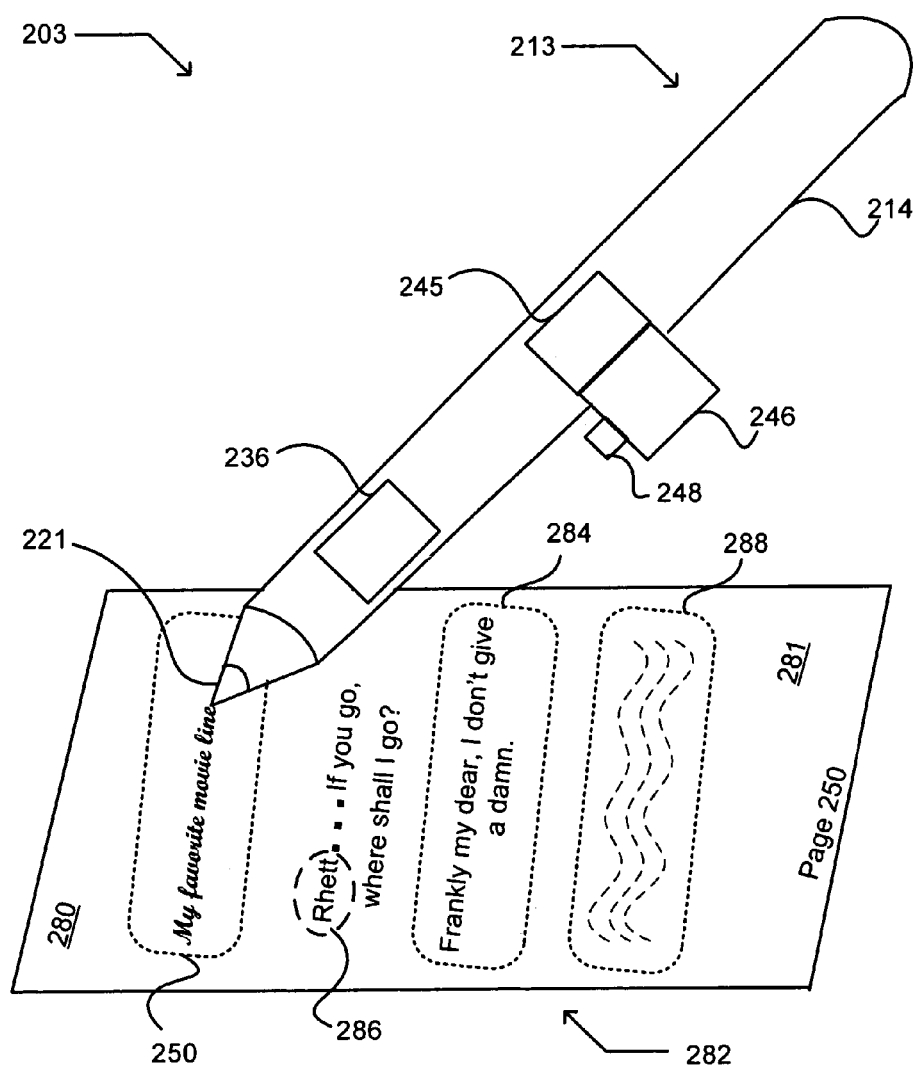
FIG. 6 illustrates a partial view of an environment that includes an exemplary apparatus, and the exemplary document environment of FIG. 3.

FIG. 6 illustrates a partial view of an environment 203 that includes an exemplary apparatus 213, and the exemplary document environment 280 of FIG. 3. The apparatus 213 includes a stylus 221 configured to write on a surface, such as the surface 281 of the document 280. The stylus may be at least similar to the stylus 220 of FIG. 3. The apparatus also includes a position sensor 236 operable to generate information indicative of handwriting movement 250 of the stylus relative to the surface. The apparatus includes an imaging element 245 operable to generate information representing at least a portion of the word 286 displayed from the surface proximate to the handwriting movements.

Figure 7:
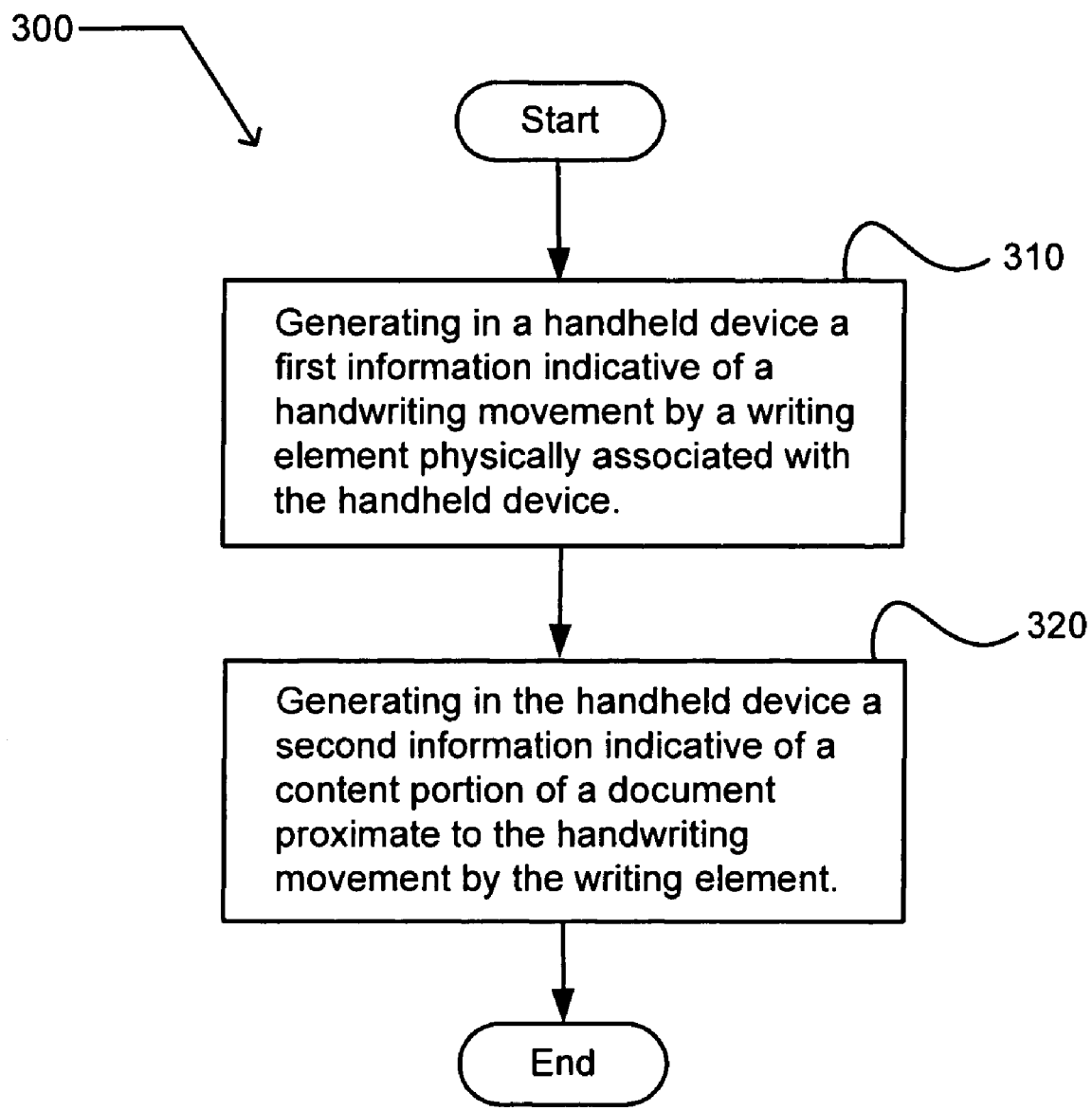
FIG. 7 illustrates an exemplary operational flow.

FIG. 7 illustrates an exemplary operational flow 300. After a start operation, the operational flow 300 moves to a content operation 310. At the content operation 310, a first information is generated in a handheld device indicative of a handwriting movement of a writing element physically associated with the handheld device. At the operation 320, a second information is generated in the handheld device information indicative of a content portion of a document proximate to the handwriting movement of the writing element. The operational flow 300 then proceeds to an end operation.

Figure 8:
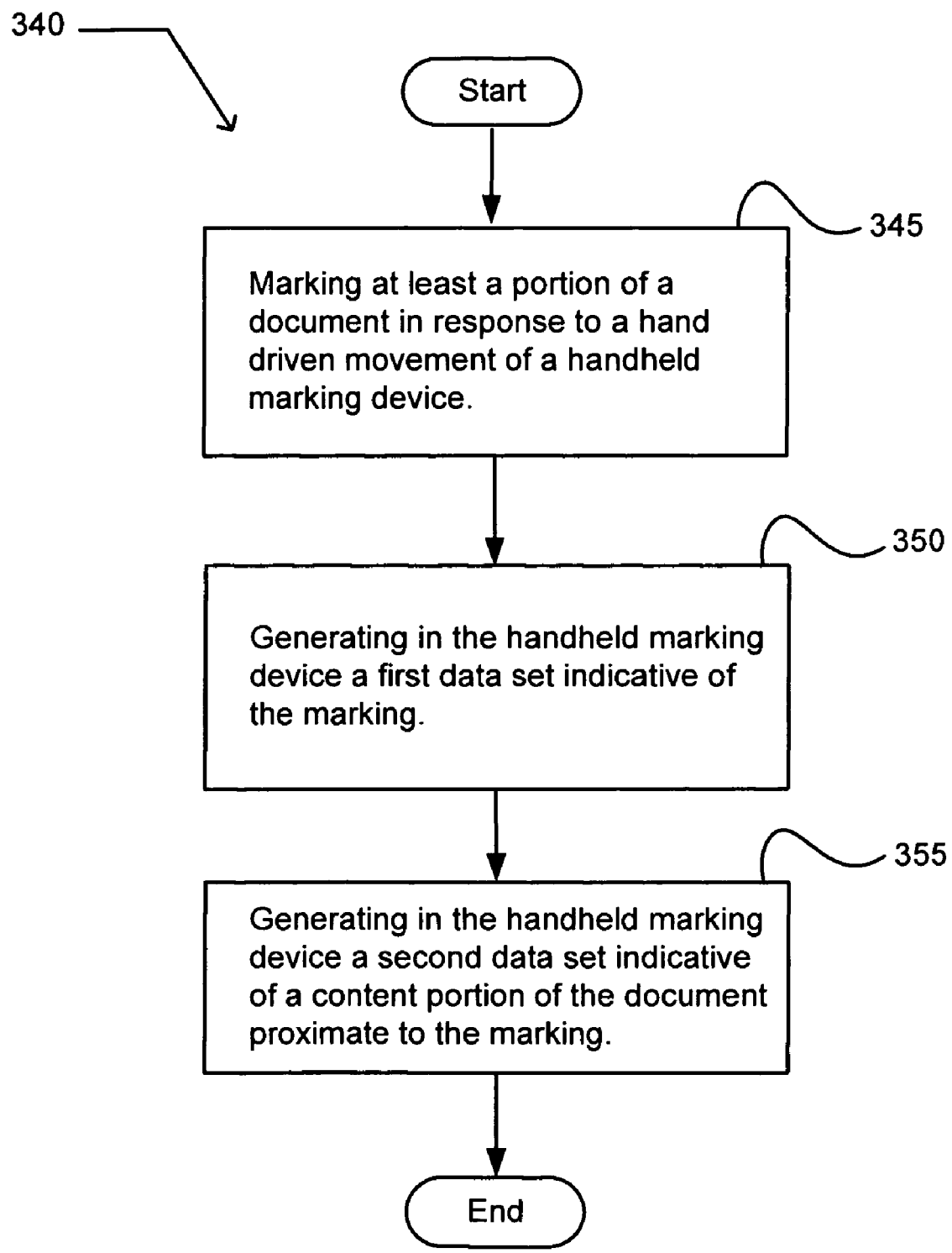
FIG. 8 illustrates another exemplary operational flow.

FIG. 8 illustrates an exemplary operational flow 340. After a start operation, the operational flow 340 moves to a writing operation 345. At the writing operation 345, at least a portion of a document is marked in response to a hand driven movement of a handheld marking device. At a content operation 350, a first data set indicative of the marking is generated in the handheld marking device. At a context operation 355, a second data set indicative of a content portion of the document proximate to the marking is generated in the handheld marking device.

Figure 9:
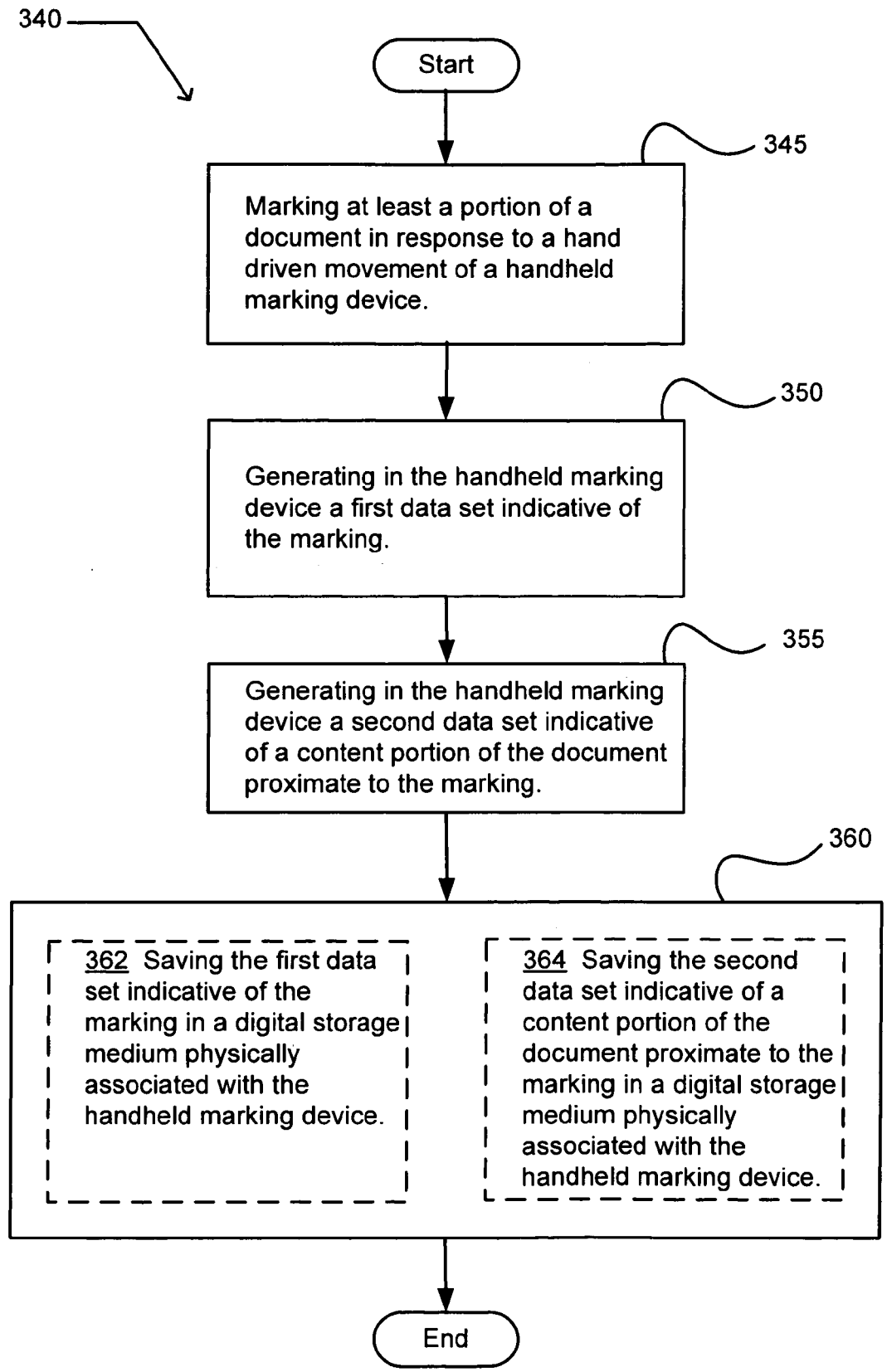
FIG. 9 illustrates an alternative embodiment of the exemplary operational flow of FIG. 8.

FIG. 9 illustrates an alternative embodiment of the exemplary operational flow 340 of FIG. 8. FIG. 9 illustrates an embodiment where the exemplary operation flow 340 may include at least one additional operation 360. The additional operation 360 may include an operation 362 and an operation 364. At the operation 362, the first data set indicative of the marking is saved in a digital storage medium physically associated with the handheld device. At the operation 364, the second data set indicative of a content portion of the document proximate to the marking is saved in a digital storage medium physically associated with the handheld device.

Figure 10:
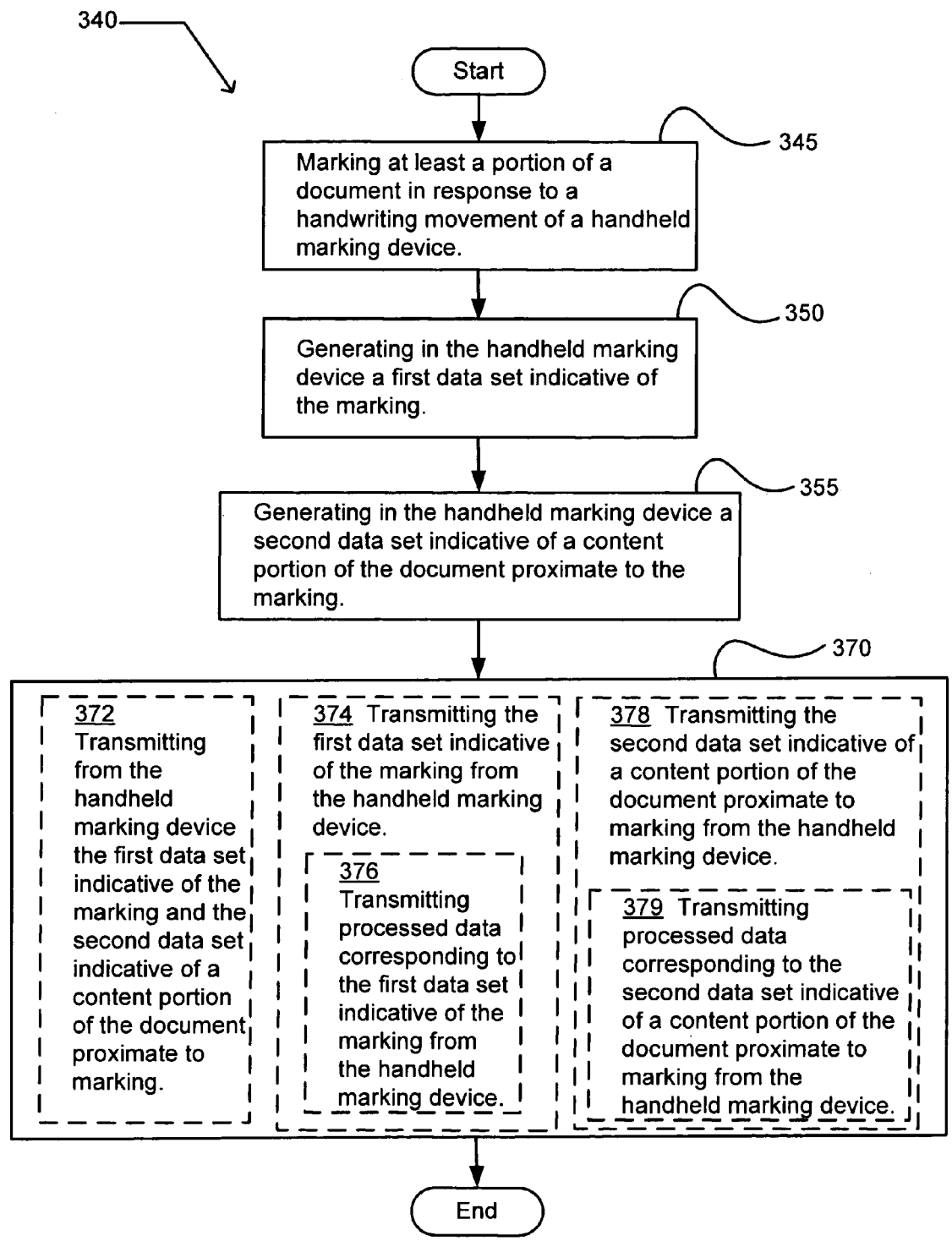
FIG. 10 illustrates another alternative embodiment of the exemplary operational flow of FIG. 8.

FIG. 10 illustrates an alternative embodiment of the exemplary operational flow 340 of FIG. 8. FIG. 10 illustrates an embodiment where the exemplary operation flow 340 may include at least one additional operation 370. The additional operation 370 may include an operation 372, an operation 374, and an operation 378. At the operation 372, the first data set indicative of the marking and the second data set indicative of a content portion of the document proximate to marking are transmitted from the handheld marking device. At the operation 374, the first data set indicative of the marking is transmitted from the handheld marking device. The operation 374 may include at least one additional operation, such as an operation 376. At the operation 376, processed data corresponding to the first data set indicative of the marking is transmitted from the handheld marking device. At the operation 378, the second data set indicative of a content portion of the document proximate to marking is transmitted from the handheld marking device. The operation 378 may include at least one additional operation, such as an operation 379. At the operation 379, processed data corresponding to the second data set indicative of a content portion of the document proximate to marking is transmitted from the handheld marking device.

Figure 11:
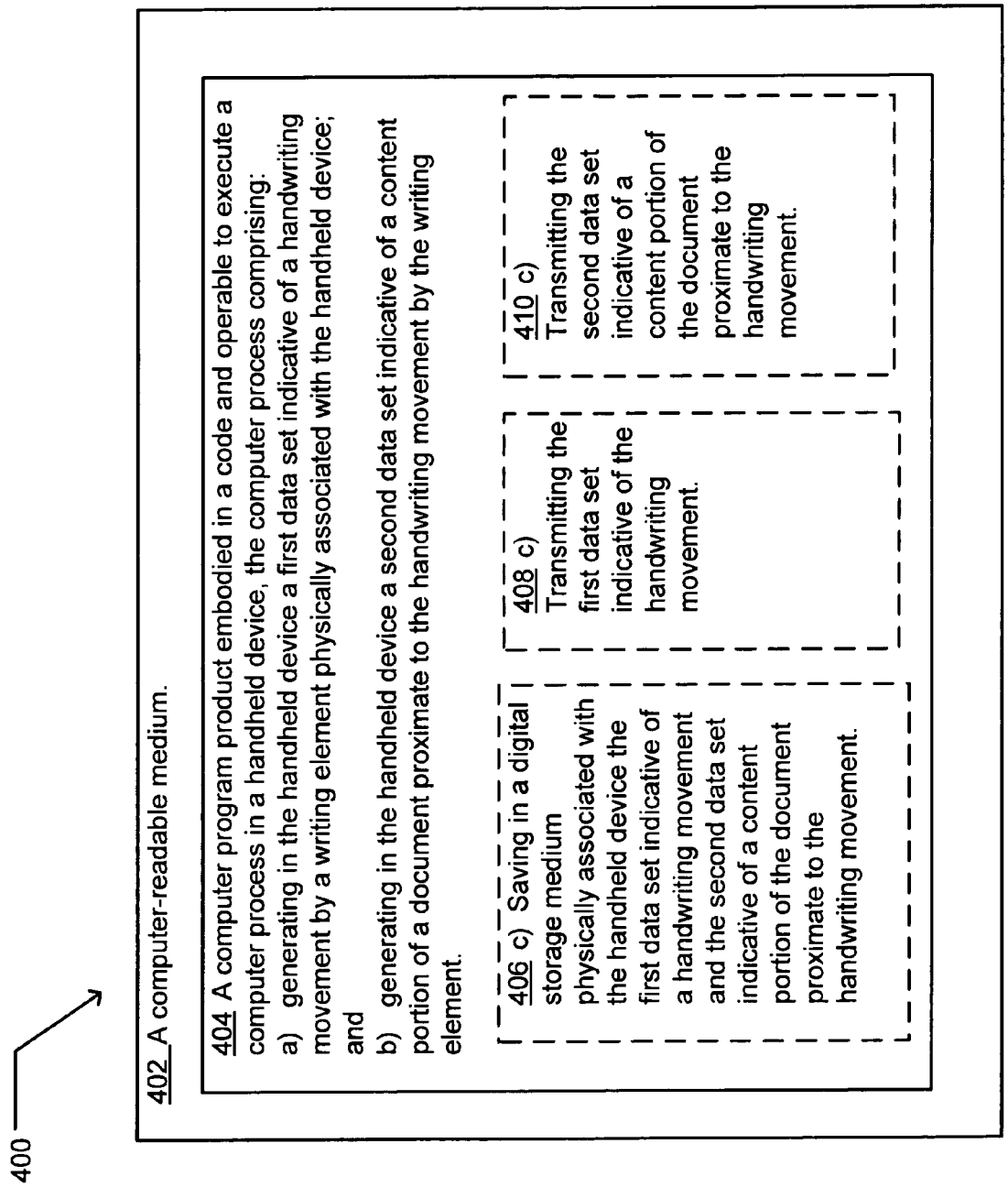
FIG. 11 illustrates a partial view of an exemplary computer-program product that includes a computer program for executing a computer process in a handheld computing device.

FIG. 11 illustrates a partial view of an exemplary computer-program product 400 that includes a computer program 404 for executing a computer process in a handheld computing device. An embodiment of the exemplary computer-program product 400 may be provided using a computer-readable medium 402, and includes computer executable instructions. The computer product 400 encodes the computer program 404 for executing on the handheld computing device a computer process. The computer process includes generating in the handheld device a first data set indicative of a handwriting movement of a writing element physically associated with the handheld device, and generating in the handheld device a second data set indicative of a content portion of a document proximate to the handwriting movement of the writing element. In an alternative embodiment, the computer process 404 may further include an additional process, such as a process 406, a process 408, and a process 410. At the process 406, the first data set indicative of a handwriting movement and the second data set indicative of a content portion of the document proximate to the handwriting movement are saved in a digital storage medium physically associated with the handheld device. At the process 408, the first data set indicative of the handwriting movement is transmitted. At the process 410, the second data set indicative of a content portion of the document proximate to the handwriting movement is transmitted. The computer-readable medium 402 may include a computer storage medium, which may be carried by a computer-readable carrier (not shown). The computer-readable medium 402 may include a communications medium (not shown). The computer-program product 400 may be implemented in hardware, software, and/or firmware.

Figure 12:
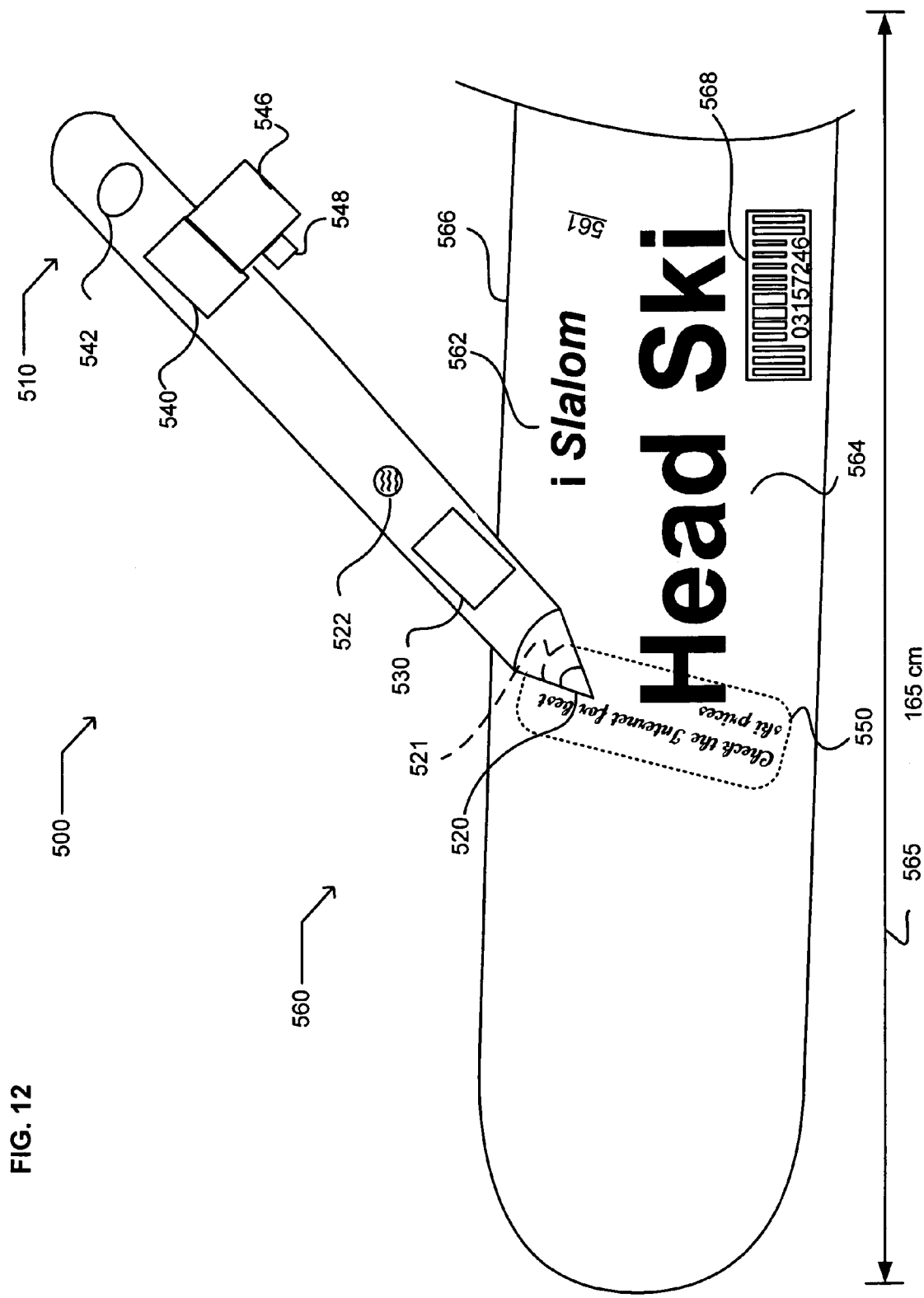
FIG. 12 illustrates an environment that includes a partial view of an exemplary annotation system and a partial view of an exemplary item.

FIG. 12 illustrates an environment 500 that includes a partial view of an exemplary annotation system and a partial view of an exemplary item. The exemplary annotation system is illustrated as an exemplary handheld system 510. The exemplary item is illustrated as a ski 560 having at a top surface 561, and two recognizable aspects printed and/or painted on the surface. Recognizable aspects are illustrated as a text content "i Slalom" 562 and a trademark content "Head Ski" 564. Another recognizable aspect may include a recognizable ski shape, illustrated as a recognizable outer periphery 566, a recognizable electronic product code, illustrated as an electronically readable bar code 568, and/or a recognizable dimension 565, illustrated as a length of 165 cm.

In a further embodiment, a recognizable aspect may include a textual content portion. For example, a textual content portion may include words printed or displayed on a surface, such as a page of a book, and/or words printed on a cover or a spine of a book. In a further embodiment, a recognizable aspect may include a human language content, for example, text printed in roman alphabet characters, math symbols, and/or script characters such as Asian language characters. In another embodiment, a recognizable aspect may include a human readable content, and/or graphical content. In an embodiment, a recognizable aspect may include a graphical content having a meaning or a significance to a human, such as a picture, a drawing, a figure, a photograph, an illustration, a diagram, a doodle, a decoration, a sketch, and/or a portrait. In another embodiment, a recognizable aspect may be arbitrary and recognizable by an individual human reader, and not recognizable by another individual human reader. In a further embodiment, a recognizable aspect may include any content primarily useful to a human reader. For example, a recognizable aspect may include a textual and/or graphical label on a retail article, such as clothing, a retail package, or a carton. A recognizable aspect may include an address written on a shipping label or an address written on a side of a building. A recognizable aspect may include dynamically displayed matter, such as an alignment of an indicator needle with a speed value on a vehicle speedometer, or a temperature reading on a thermometer. In another embodiment, a recognizable aspect may include an incidental element not primarily employed by a human reader but that aids in distinguishing the item. In an embodiment, a recognizable aspect may include any aspect recognizable by a human, a computing device, a recognition program running on a computing device, a computer implement method, and/or a machine. In another embodiment, a recognizable aspect may include a characteristic form and/or shape, such a pair of skates, a car, and/or a dress. In an embodiment, an aspect may be recognizable locally in response to information indicative of a recognizable aspect of an item. In another embodiment, an aspect may be recognizable in response to information provided by a remote third-party responsive at least in part to information indicative of a recognizable aspect of an item.

The exemplary handheld system 510 includes a writing element 520 operable to form a user expression. The user expression is illustrated as a handwritten user expression "Check the Internet for best ski prices" 550. In an embodiment, the writing element may include an active writing element, such as an ink cartridge operable to discharge a marking fluid onto a surface of a document. The active writing element may include a replaceable ink cartridge. The active writing element may include a disappearing ink. The active writing element may include a pencil lead. In a further embodiment, the writing element may include a non-marking element, such as non-marking stylus. In an alternative embodiment, the system may include a microphone 522 operable to capture an audible user expression, such as a sound, word, and/or sentence.

The handheld system 510 includes an annotating device 530 operable to generate information indicative of a user expression associated with a recognizable aspect of the item 560. In an embodiment where the user expression includes the handwritten user expression 550 visually or spatially associated with the recognizable trademark content "Head Ski" 564 and/or the text content "i Slalom" 562 on the top surface 561, the annotating device includes operability to generate information indicative of the handwritten user expression 550 formed by the writing element 520. Where the exemplary item includes a retail item in a store, such as the ski 560, the writing element may include a non-marking writing element. Alternatively, when the item includes a retail item in a store, a user may adhere a "Post It" type notepaper proximate to a recognizable aspect, handwrite on the "Post It" so as not to damage or mar the item, capture the handwritten expression, and then remove the "Post It." In an embodiment where the user expression includes an audible user expression, such as a spoken sentence "Check the Internet for best ski prices," the annotating device may include operability to generate information indicative of the spoken sentence received by the microphone 522.

The annotating device 530 may be implemented in any manner, including software, hardware, firmware, and/or a combination thereof. The annotating device may be implemented in a manner at least substantially similar to the writing detector module 230 of FIG. 3. In an embodiment, the annotating device may include operability to generate information indicative of a user verbal expression (not shown) associated with the recognizable aspect of the item. The annotating device may include operability to generate information indicative of the handwritten user expression "Check the Internet for best ski prices" 550 associated with the recognizable aspect of the item. The annotating device may include operability to generate information indicative of a user hand drawn expression associated with the recognizable aspect of the item. The annotating device may include operability to generate information indicative of a user gesture associated with the recognizable aspect of the item. The annotating device may include operability to generate information indicative of a user gesture formed at least in part by a user limb. The annotating device may include operability to generate information indicative of a user gesture formed with a user held stylus.

Continuing with FIG. 12, the handheld system 510 includes an annotation environment capture device 540 operable to generate information indicative of a recognizable aspect of an item, such as the text content "i Slalom" 562. The annotation environment capture device may be implemented in any manner, including software, hardware, firmware, and/or any combination thereof. The context-detecting device may be implemented in a manner at least substantially similar to the context detector module 240 of FIG. 3. In an embodiment, the context-detecting device 540 may include operability to generate information indicative of a recognizable aspect of an item in response to data acquired from at least one of several technologies and/or data sources. For example, data indicative of a recognizable aspect of an item may be acquired from data corresponding to the recognizable aspect of the item, such as for example, time of day, time of user expression, time period of user expression, user-entered time, time bracket, date, location, presence of another person, presence of other items, temperature, elevation, bearing, and/or global position coordinates. By way of further example, data corresponding to the recognizable aspect of an item may be acquired at least in part from a radio frequency identification device (RFID). The RFID may be directly associated with the aspect of item, associated with the item, and/or indirectly associated with the item.

In another embodiment, the context-detecting device 540 may include an image capture device 546 having a lens 548. The image capture device and/or the lens may be implemented in a manner at least substantially similar to the image capture device 246 and/or lens 248 of FIG. 3. In an embodiment, the context-detecting device 540 may include a user-activatable switch 542 allowing a user to select when the information indicative of a recognizable aspect of an item will be captured. For example, a user may aim the lens 548 at a recognizable aspect of an item and capture an image by activating the switch 542. The switch may include a hardware switch, a motion sensitive switch, and/or a voice activated switch. In a further embodiment, the context-detecting device may generate raw information indicative of a recognizable aspect of an item. In another embodiment, the context-detecting device may process the raw information indicative of a recognizable aspect of an item.

In an embodiment, the context-detecting device 540 may include operability to generate information indicative of a machine recognizable aspect of an item, such as the ski 560. A machine recognizable aspect of the ski may include a ratio of its length dimension 565 to its width (not shown). The context-detecting device may include operability to generate information indicative of an optically recognizable aspect of an item. The context-detecting device may include operability to generate information indicative of a recognizable human readable content of an item, such as the trademark content "Head Ski" 564. The context-detecting device may include operability to generate information indicative of a recognizable native text of an item, such as the text content "i Slalom" 562. The context-detecting device may include operability to generate information indicative of a recognizable shape aspect of an item, such as the ski shape 566. The context-detecting device may include operability to generate information indicative of a recognizable dimensional aspect of an item, such as the length dimension 565 of the ski 560.

In an alternative embodiment of the handheld system 510, an impact and/or pressure sensitive switch 521 may include a non-marking element version of the writing element 520. Tapping the non-marking element 520 against a surface of an item, such as the surface 561, activates the switch 521. In an embodiment, activation of the switch causes the annotating device 530 to record a verbal user expression. In another embodiment, activation of the switch causes the context-detecting device 540 to acquire an image of a recognizable aspect of the item, such as the trademark content "Head Ski" 564.

In a further embodiment, the context-detecting device 540 may include a module operable to recognize data indicative of the recognizable aspect of an item. The module operable to recognize data indicative of the recognizable aspect of an item may include an artificial intelligence module operable to recognize data indicative of the recognizable aspect of an item. The module operable to recognize data indicative of the recognizable aspect of an item may include a pattern recognition module operable to recognize data indicative of the recognizable aspect of an item.

In an embodiment, the system may include a communications device (not shown). The communications device may include operability to communicate at least one of the information indicative of a recognizable aspect of an item and the information indicative of a user expression associated with the recognizable aspect of the item. In another embodiment, the system may include a storage device (not shown). The storage device may include operability to save at least one of the information indicative of a recognizable aspect of an item and the information indicative of a user expression associated with the recognizable aspect of the item.

As used in this document, an "item" may include a thing, an article, an object, an occurrence, a garment, a vehicle, a body, a person, a worldly matter, and/or a state of an item. An item may include a representation. An item may be very small, such as would require aided vision for human viewing, or an item may be very large, such as a building, an aircraft, vehicle, and/or a vessel that a human could walk through. An item may be animate and/or inanimate.

A user expression may be associated by the user with an item or an aspect of an item in any manner. In an embodiment, the user expression may be physically associated with an aspect of an item by the user. For example, a user may associate a user expression and an aspect of an item by writing the user expression on the item and proximate to the aspect. Writing proximate to the text content "i Slalom" 562 is an example of a user expression associated by the user with an aspect of an item. In another embodiment, the user expression may be temporally associated with an item or aspect of an item. For example, a user may temporally associate a user expression and an item or aspect of an item by speaking at a time when the item or aspect of the item is spatially proximate to the user. In another embodiment, a user may associate a user expression and an item or aspect of an item by a gesture. For example, a user may gesturally associate a user expression and an item or aspect of an item by tapping on or pointing to the item or aspect of the item while speaking.

In operation of an embodiment, a user may wish to associate a user expression with a recognizable aspect of an item. For example, a user signing a printed credit card slip in a restaurant may wish to associate information indicative of their entries and the printed credit card slip. In addition, a user may wish to associate information indicative of the meal and the printed credit card slip. In this example, the handheld system 510 generally having a shape of a common writing pen may be used. A written user expression associated with the credit card slip may include a user written entry for a tip, a user written entry for a total charge, and a user written signature entry, made with the active writing element 520 having an ink tip.

In an embodiment, the written entries are captured by the annotating device 530. In another embodiment, images of the written entries are captured by the image capture device 546. Further, before, during, and/or after the writing, the user may verbally express a description the meal and the quality of the meal in association with the printed credit card slip, and perhaps a description of a wine consumed during the meal. A user verbal expression is captured by the microphone 522.

Also, before, during, and/or after the writing, the image capture device 546 captures an image indicative of at least one recognizable aspect of the printed credit card slip. A recognizable aspect of the credit card slip may include a name of the restaurant, a date, a time, a charge for meals, a sever name, and/or a charge for wine.

The annotating device 530 generates information indicative of the user's verbal expression(s) and/or the user's handwritten expression(s). The context-detecting device 540 generates information indicative of a recognizable aspect of the credit card slip. The information indicative of a recognizable aspect of the credit card slip and/or the information indicative of the user expression may be saved in the handheld system for later communication to a computing device, such as a computer device running an expense account program.

Figure 13:
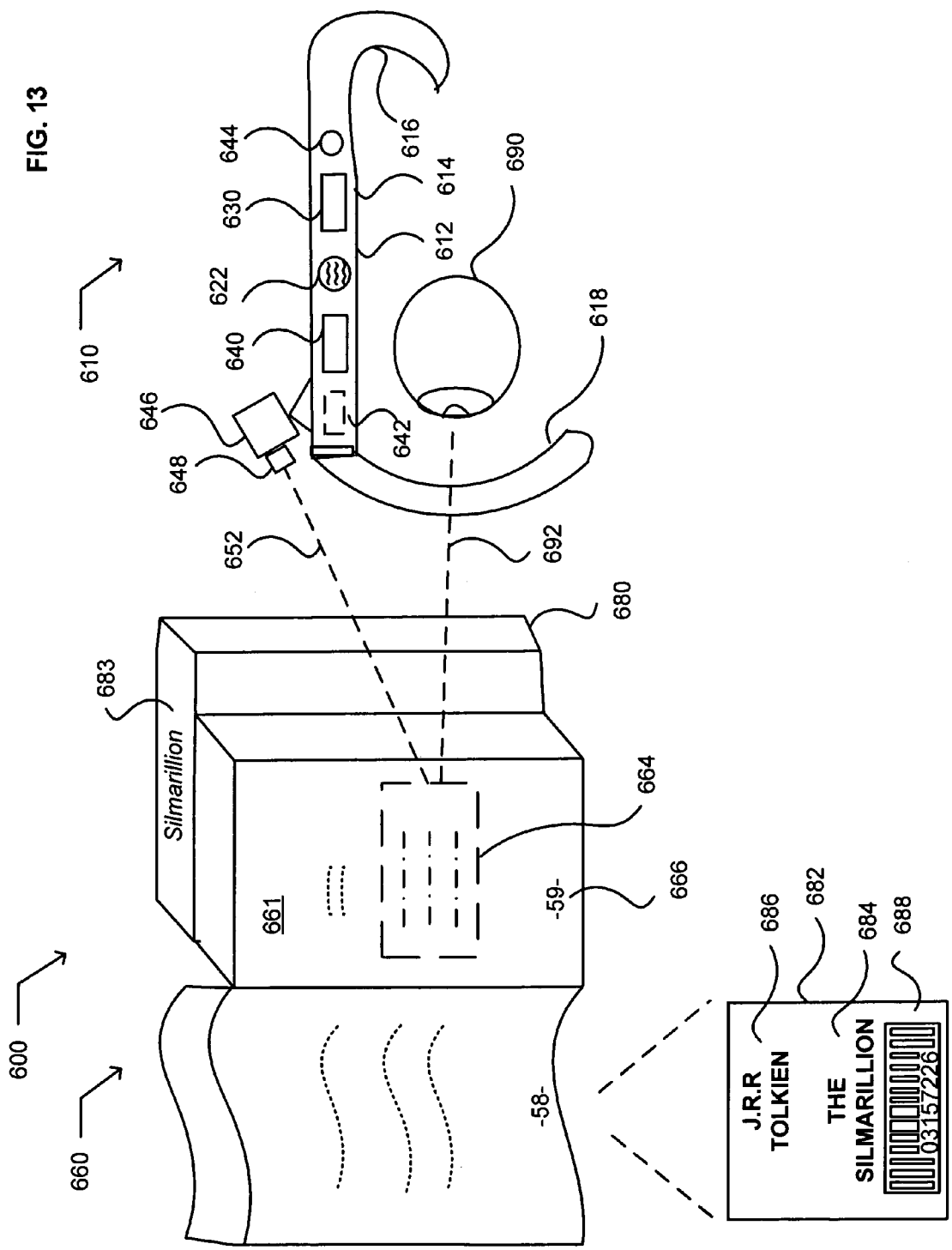
FIG. 13 illustrates an environment that includes a partial view of an exemplary annotation system and a partial view of an exemplary item.

FIG. 13 illustrates an environment 600 that includes a partial view of an exemplary annotation system and a partial view of an exemplary item. The exemplary annotation system is illustrated as an exemplary human wearable annotation system 610, which is further illustrated as an exemplary head mountable system 612. The exemplary item is illustrated as an exemplary bound paper book 660. The exemplary book illustrates several exemplary recognizable aspects, including a cover 682, an author name 686, illustrated as J. R. R. Tolkien, a cover title 684, illustrated as "The Silmarillion," and an electronically readable product code 688, illustrated as a bar code. Further illustrated exemplary recognizable aspects include a page having a page number 666, illustrated as page number "59," a page surface 661, and a binding 680 having a binding title 683, illustrated as "Silmarillion." The exemplary book also illustrates an exemplary recognizable aspect that includes a recognizable text content 664 printed on and native to the page surface 661 of the page number 59.

The exemplary head mountable system 612 includes a frame 614, which includes an earpiece 616 and an eye cover 618. In an optional embodiment, the eye cover may be omitted. The frame includes a configuration to be worn in a manner similar to a pair of eyeglasses. In an embodiment, the eye cover 618 includes a configuration that allows a substantially unobstructed line of sight, illustrated as a eye gaze 692, between an eye 690 and an aspect of an item, illustrated as the recognizable text 664. In an embodiment, the frame provides a structure that incorporates an annotating device 630, an annotation environment capture device 640, and a microphone 622 and associated sound capture circuitry. In an optional embodiment, the frame may also provide a structure that incorporates a user-activatable switch 644. In another embodiment, the system 612 may include any configuration allowing it to be worn on a head.

The annotation environment capture device 640 includes operability to generate information indicative of a recognizable aspect of an item. In an embodiment, annotation environment capture device includes a tracking module 642 operable to track the eye gaze 692 directed proximate to a recognizable aspect of the item. In another embodiment, the annotation environment capture device includes an image capture module 646 operable to acquire an image of a recognizable aspect of the item. In a further embodiment, the annotation environment capture device includes an image capture module 646 and a lens 648 operable to acquire an image of a recognizable aspect of the item in response to a signal indicative of a received user command. The user command may include a verbal command, a gestural command, and/or activation of a switch, such as the switch 644. The capture module 646 and the lens 648 direct a lens track 652 on a recognizable aspect of an item.

The annotation environment capture device 640 operable to generate information indicative of a recognizable aspect of an item may include a module operable to recognize data indicative of the recognizable aspect of an item. The module operable to recognize data indicative of the recognizable aspect of an item may include an artificial intelligence module operable to recognize data indicative of the recognizable aspect of an item. The module operable to recognize data indicative of the recognizable aspect of an item may include a pattern recognition module operable to recognize data indicative of the recognizable aspect of an item.

The annotation environment capture device operable to generate information indicative of a recognizable aspect of an item may include a tracking module operable to track an eye gaze directed proximate to the recognizable aspect of the item. The annotation environment capture device operable to generate information indicative of a recognizable aspect of an item may include a receiver circuit operable to receive a signal containing data indicative of a recognizable aspect of the item. The annotation environment capture device operable to generate information indicative of a recognizable aspect of an item may include an image capture module operable to acquire an image of a recognizable aspect of the item. The annotation environment capture device operable to generate information indicative of a recognizable aspect of an item may include an image capture module operable to acquire an image of a recognizable aspect of the item in response to a signal indicative of a received user command.

The annotation environment capture device 640 may include operability to generate information indicative of a machine recognizable aspect of an item. In an embodiment, a machine recognizable aspect of an item may include the author name 686, the cover title 684, the page number 666, the binding title 683, the electronically readable product code 688, and/or the text content 664. The annotation environment capture device may include operability to generate information indicative of an optically recognizable aspect of an item. In an embodiment, an optically recognizable aspect of an item may include the author name, the cover title, the page number, the binding title, and/or the text content. The annotation environment capture device may include operability to generate information indicative of a human recognizable aspect of an item. In an embodiment, a human recognizable aspect of an item may include the author name, the cover title, the page number, the binding title, and/or the text content. The annotation environment capture device may include operability to generate information indicative of a recognizable native text of an item. In an embodiment, a recognizable native text of an item may include the author name, the cover title, the page number, the binding title, and/or the text content. The annotation environment capture device may include operability to generate information indicative of a recognizable visual aspect of an item. In an embodiment, a recognizable aspect of an item may include an optically recognizable author name, cover title, page number, binding title, and/or text content. The annotation environment capture device may include operability to generate information indicative of a recognizable image aspect of an item. In an embodiment, a recognizable image aspect may include a picture, a figure, a drawing, and/or a graphic element (not shown) of the item. The annotation environment capture device may include operability to generate information indicative of a recognizable aspect of an item. In an embodiment, a recognizable aspect may include any recognizable aspect of the book. The annotation environment capture device may include operability to generate information indicative of a recognizable human readable content. In an embodiment, a recognizable human readable content may include the author name, the cover title, the page number, the binding title, and/or the text content. The context-detecting device operable to generate information indicative of a recognizable aspect of an item may include a context-detecting device operable to generate information indicative of a recognizable audio aspect of an item. For example, the context-detecting device may include an operability to generate information indicative of a recognizable excerpt of a music piece, such as a song, or an excerpt of a speech.

The annotation environment capture device operable to generate information indicative of a recognizable aspect of an item may include an annotation environment capture device operable to generate information indicative of a recognizable aspect of an item in response to an input received from the user. For example, an input received from a user may include an interaction with a user to select an item to which the user expression is associated from among at least two candidate items in an image. By way of further example, an input received from a user may include an interaction with a user to select an aspect of an item to which the user expression is associated from among at least two candidate aspects of an item. The annotation environment capture device operable to generate information indicative of a recognizable aspect of an item may include an annotation environment capture device operable to generate information indicative of a recognizable aspect of an item in response to an input responsive to a gesture by the user. For example, an input responsive to a user gesture may include a user pointing to an item to which the user expression is associated from among at least two candidate items in an environment.

The annotation environment capture device 640 operable to generate information indicative of a recognizable aspect of an item may include an annotation environment capture device operable to generate information indicative of a recognizable shape aspect of an item. The annotation environment capture device operable to generate information indicative of a recognizable aspect of an item may include an annotation environment capture device operable to generate information indicative of a recognizable dimensional aspect of an item.

In a further embodiment, the annotation environment capture device 640 may include a module operable to recognize data indicative of the recognizable aspect of an item. The module operable to recognize data indicative of the recognizable aspect of an item may include an artificial intelligence module operable to recognize data indicative of the recognizable aspect of an item. The module operable to recognize data indicative of the recognizable aspect of an item may include a pattern recognition module operable to recognize data indicative of the recognizable aspect of an item.

The annotation environment capture device 640 may be implemented in any manner, including software, hardware, firmware, and/or any combination thereof. The annotation environment capture device may be implemented in a manner at least substantially similar to the context-detector module 240 of FIG. 3.

Continuing with FIG. 13, the annotating device 630 includes operability to generate information indicative of a user expression associated with the recognizable aspect of the item. In an embodiment, the annotating device may include operability to generate information indicative of a user verbal expression associated with the recognizable aspect of the item. In an embodiment, a user verbal expression may include a verbal sound, a word, at least two words, and/or a sentence. In another embodiment, a user verbal expression may include any vocal expression a user wishes to associate with the recognizable aspect of the item. In an embodiment, the annotating device includes operability to generate information indicative of a preformed user expression associated with the recognizable aspect of the item. In a further embodiment, a preformed user verbal expression may include at least one word representative of at least two words. For example, a verbalized word "high" may represent a verbal expression of "this aspect is of high interest to me."

The annotating device 630 may be implemented in any manner, including software, hardware, firmware, and/or any combination thereof. The annotating device may be implemented in a manner at least substantially similar to the context-detector module 230 of FIG. 3.

In operation of an embodiment, a user may don the exemplary head mountable system 612 in a manner similar to eyeglasses. The person may direct their eye gaze 692 through the eye cover 618 and at one or more recognizable aspects of an item, such as for example, the text content 664. Alternatively, the user's gaze 692 may be directed toward any other recognizable aspect of the book described above, for example, the title 684. The tracking module 642 tracks the gaze 692 of the user's eye 690 and aligns the lens track 652 of the lens 648 of the image capture module 646 with the recognizable text content. An image of the text content 664 may be captured. The capture may be automatic, such as in response to a predetermined time that the gaze 692 is directed toward the recognizable text context, and/or such as in response to the user making a verbal expression associated with the recognizable text context. Alternatively, the capture may be in response the user activating the switch 644 through a touch or verbal command. The context-detector 640 generates information indicative of the recognizable text context responsive to the captured image.

Continuing with the exemplary operation, the user may utter a verbal expression for connection or association with the recognizable aspect of the book 660, which in this example includes the recognizable text aspect 664. The verbal expression may be any verbal expression. For example, a verbal expression may include "This is really interesting stuff," or "This statement contradicts a statement at page 12." The verbal expression is captured by the microphone 622. The annotating device generates information indicative of the user expression in response to the captured verbal expression.

In an alternative embodiment, the exemplary human wearable system 610 may comprise two separate human wearable elements. For example, the annotation environment capture device 640 may be carried in a first element wearable on a person's head and the annotation device 630 carried in a second element wearable around the person's neck. In a further embodiment, the annotating device may include an annotating device having a configuration selected from a group consisting of a handheld device, a wearable device, and a head mountable device. The annotation environment capture device includes an annotation environment capture device having a configuration other than the selected configuration of the annotating device. In another embodiment, the annotation environment capture device may include an annotation environment capture device having a configuration selected from a group consisting of a handheld device, a wearable device, and a head mountable device. The annotating device includes an annotating device having a configuration other than the selected configuration of the annotation environment capture device.

Figure 14:
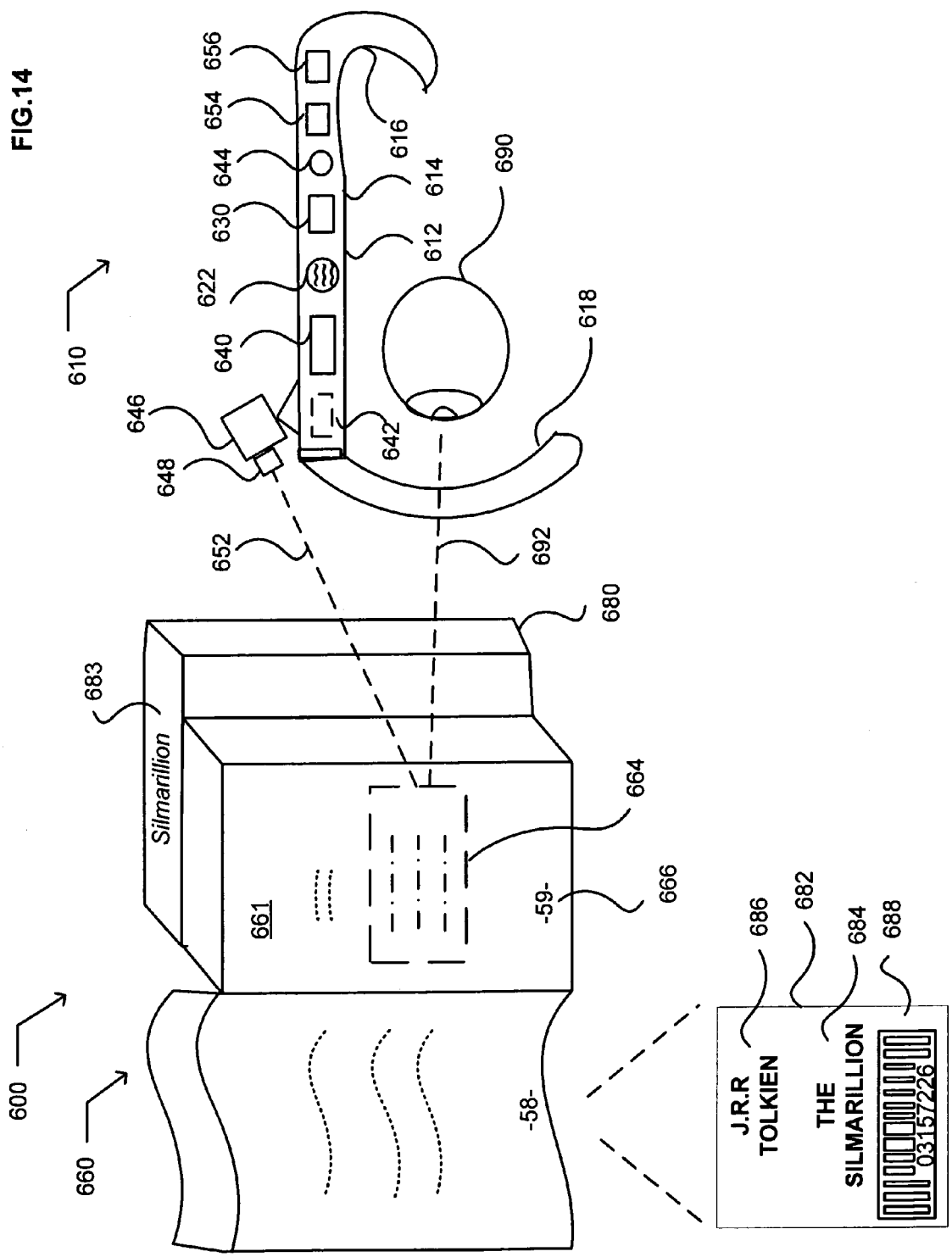
FIG. 14 illustrates a partial view an alternative embodiment of the environment of FIG. 13.

FIG. 14 illustrates a partial view an alternative embodiment of the environment 600 of FIG. 13. The exemplary head mountable system 612 may include at least one additional device. An additional device may include a communications device 654 coupled with an antenna (not shown), and a storage device 656. The communications device includes operability to communicate at least one of the information indicative of a recognizable aspect of an item and the information indicative of a user expression associated with the recognizable aspect of the item. The storage device includes operability to save at least one of the information indicative of a recognizable aspect of an item and the information indicative of a user expression associated with the recognizable aspect of the item.

Figure 15:
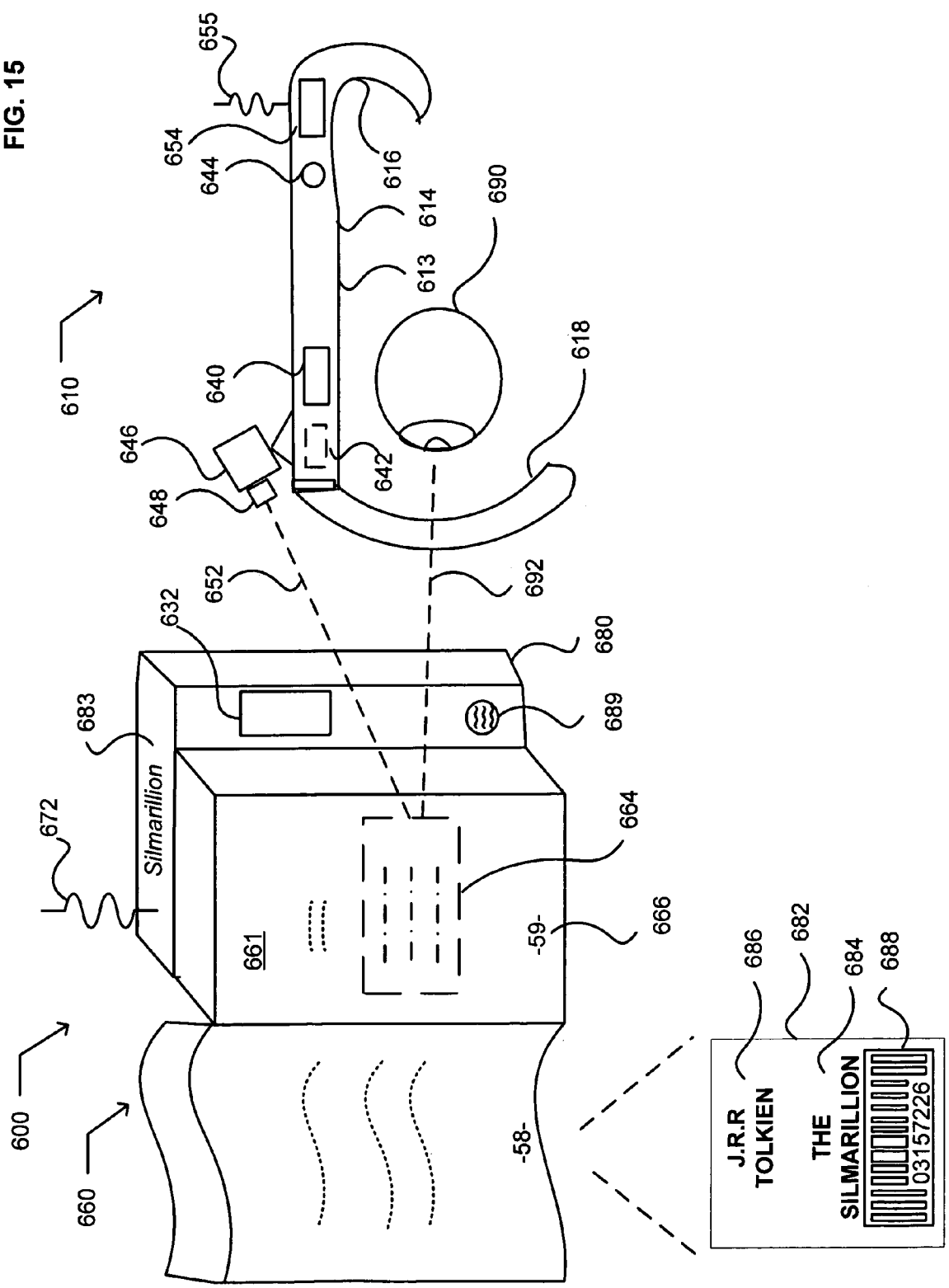
FIG. 15 illustrates a partial view of an alternative embodiment of the environment of FIG. 13 that includes an exemplary head mountable system and an exemplary item illustrated as an exemplary bound book.

FIG. 15 illustrates a partial view of an alternative embodiment of the environment 600 of FIG. 13 that includes an exemplary head mountable system 613 and an exemplary item illustrated as an exemplary bound book 661. The alternative embodiment of the environment 600 includes an exemplary distributed annotation system. The system 613 includes the context-detection module 640, a communications device 654 coupled with an antenna 655. The system 613 is operable to generate information indicative of a recognizable aspect of the item, illustrated as the book 661.

The book 661 includes microphone 689 and associated sound capture circuitry, an annotating device 632, and an antenna 672 coupled with a communications device (not shown). The annotating device 632 includes operability to generate information indicative of a user expression associated with a recognizable aspect of the item, illustrated as the book 661. The annotating device 632 is at least substantially similar to the annotating device 630 of FIG. 13. The microphone 689 and associated sound capture circuitry is at least substantially similar to the microphone 622 and associated sound capture circuitry of FIG. 13. At least one of the communications devices may be configured as a receiver circuit, a transmission circuit, and/or a transceiver circuit.

In operation of an embodiment, a user may don and use the exemplary head mountable system 613 to generate information indicative of a recognizable aspect of an item in a manner at least substantially similar to the system 612 of FIG. 13. Also, as described in conjunction with FIG. 13, the user utters a verbal expression for connection or association with the recognizable aspect of the book 660, which in this example includes the recognizable text aspect 664. In the embodiment illustrated in FIG. 15, the verbal expression is captured by the microphone 689. The annotating device 632 generates information indicative of the user expression in response to the captured verbal expression. In one embodiment, one of the book 661 and the head mountable system 613 may transmit the respective information generated by their device to the other. In another embodiment, the book and the system may transmit the respective information generated by their devices to a third device.

Figure 16:
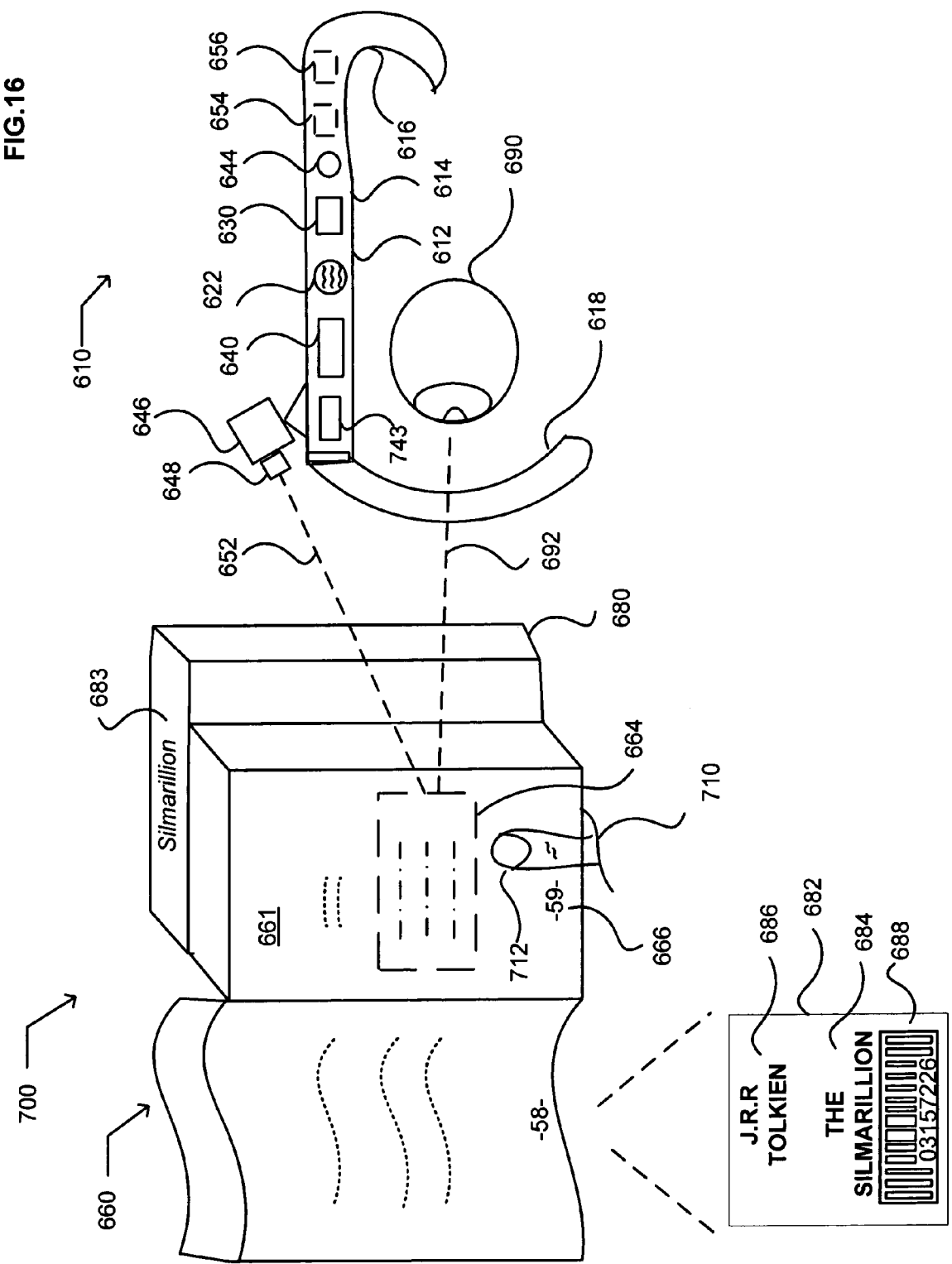
FIG. 16 illustrates an environment that includes a partial view of an exemplary annotation system and a partial view of an exemplary item.

FIG. 16 illustrates an environment 700 that includes a partial view of an exemplary annotation system and a partial view of an exemplary item. The exemplary annotation system is illustrated as an exemplary human wearable system 610, which is further illustrated as an exemplary head mountable system 612. The exemplary item is illustrated as an exemplary bound paper book 660.

The system 612 includes a tracking module 743 carried in the frame 614 and operable to track a user finger 710 and/or a user fingertip 712 proximate to a recognizable aspect of the item, such as the recognizable text content 664 printed on and/or native to the page surface 661. In an embodiment, the tracking module may include operability to track a gesture formed by the user finger and/or the user fingertip.

In an alternative embodiment, the tracking module 743 includes operability to track a stylus. For example, a tracked stylus may include a hand holdable stylus (not shown) proximate to a recognizable aspect of the item.

In operation, a user may place their fingertip 712 and/or their finger 710 on the surface 661 of the page and proximate to the recognizable text content 664. The tracking module 743 tracks the finger and/or fingertip, and upon occurrence of a predetermined condition acquires data indicative of the recognizable text content 664. The predetermined condition may include a gesture with the finger and/or fingertip proximate to the recognizable text content. For example, in an embodiment, the predetermined condition may include tapping the fingertip three times on the page surface 661 proximate to the recognizable text content. In another embodiment, the predetermined condition may include the user activating the switch 644. In a further embodiment, the predetermined condition may include the user speaking a voice command received at the microphone 622. In an embodiment, the predetermined condition may include the fingertip remaining stationary and proximate to the recognizable text content for a predetermined time. The context-detector generates information indicative of a recognizable aspect of the text content in response to the acquired data. Alternatively, the fingertip may be placed proximate to another recognizable aspect of the book 660. For example, another recognizable aspect of the book may include the cover title 684.

The user may create an expression associated with the recognizable aspect of the book 660. In an embodiment, the user may create a verbal expression for association with the recognizable aspect of the item. The verbal expression may be received by the microphone 622. In another embodiment, the user may create the expression by a user gesture associated with the recognizable aspect of the item. The user gesture may be formed at least a part by a user limb associated with the recognizable aspect of the item. The user gesture may be captured by the image capture module 646.

In another embodiment, the annotation environment capture device may remain incorporated in the system 612, and a microphone and an annotating device may be incorporated into a structure of the book 660. For example, the microphone and annotating device may be incorporated as illustrated in conjunction with the book 661 of FIG. 15.

Figure 17:
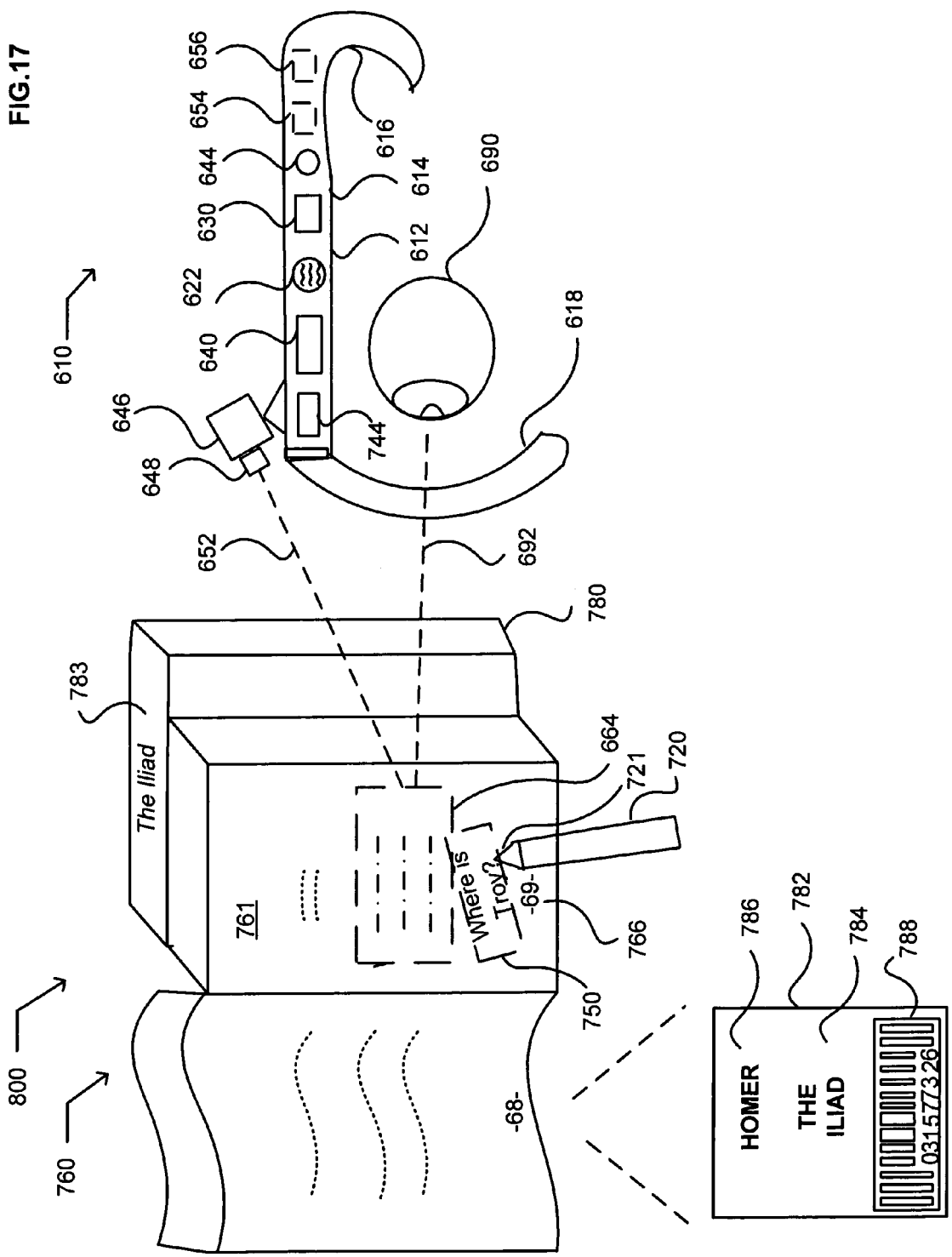
FIG. 17 illustrates an environment that includes a partial view of an exemplary annotation system and a partial view of an exemplary item.

FIG. 17 illustrates an environment 800 that includes a partial view of an exemplary annotation system and a partial view of an exemplary item. The exemplary annotation system is illustrated as an exemplary human wearable system 610, which is further illustrated as the exemplary head mountable system 612. The exemplary item is illustrated as an exemplary bound paper book 760. The exemplary book illustrates several exemplary recognizable aspects, including a cover 782, an author name 786, illustrated as Homer, a cover title 784, illustrated as THE ILIAD, and an electronically readable product code 788, illustrated as a bar code. Further illustrated exemplary recognizable aspects include a page having a page number 766, illustrated as page number "69," a page surface 761, and a binding 780 having a binding title 783, illustrated as THE ILIAD. The exemplary book also illustrates an exemplary recognizable aspect that includes a recognizable text content 664 printed on and native to the page surface 761 of the page number 69.

FIG. 17 also includes a handwriting instrument, illustrated as a pen 720 having a writing tip 721. The pen is illustrated as having formed the handwritten characters "Where is Troy?" 750 in response to a user action.

The exemplary head mountable system 612 includes the frame 614 as described in conjunction with FIG. 13. The frame includes a handwriting-tracking module 744 operable to acquire data indicative of the handwritten annotation 750. In an embodiment, the handwriting-tracking module 744 includes operability to acquire data indicative of the handwritten annotation in response to detected movements by the pen-writing tip 721. In another embodiment, the handwriting-tracking module includes operability acquire data indicative of the handwritten annotation in response to images of the pen-writing tip and/or the handwritten characters. The images may be captured by the capture module 646.

In operation of an embodiment, a user may don and use the exemplary head mountable system 612, and allow the system to generate information indicative of a recognizable aspect of an item in a manner at least substantially similar to the system 612 of FIG. 13. In addition, the user may grasp the pen 720 in their hand and hand generate a user expression, such as the annotation 750, using the pen tip 721 and proximate to a recognizable aspect, such as the recognizable text content 664. Data indicative of the hand-generated annotation is acquired by the handwriting-tracking module 744, and the annotating device 640 generates information indicative of the user expression associated with the recognizable text content 664.

In an alternative embodiment not illustrated, the handwriting instrument may include an annotating device operable to generate information indicative of a user expression associated with the recognizable aspect of the item. The annotating device may be at least substantially similar to the annotating device 530 described in conjunction with FIG. 12.

Figure 18:
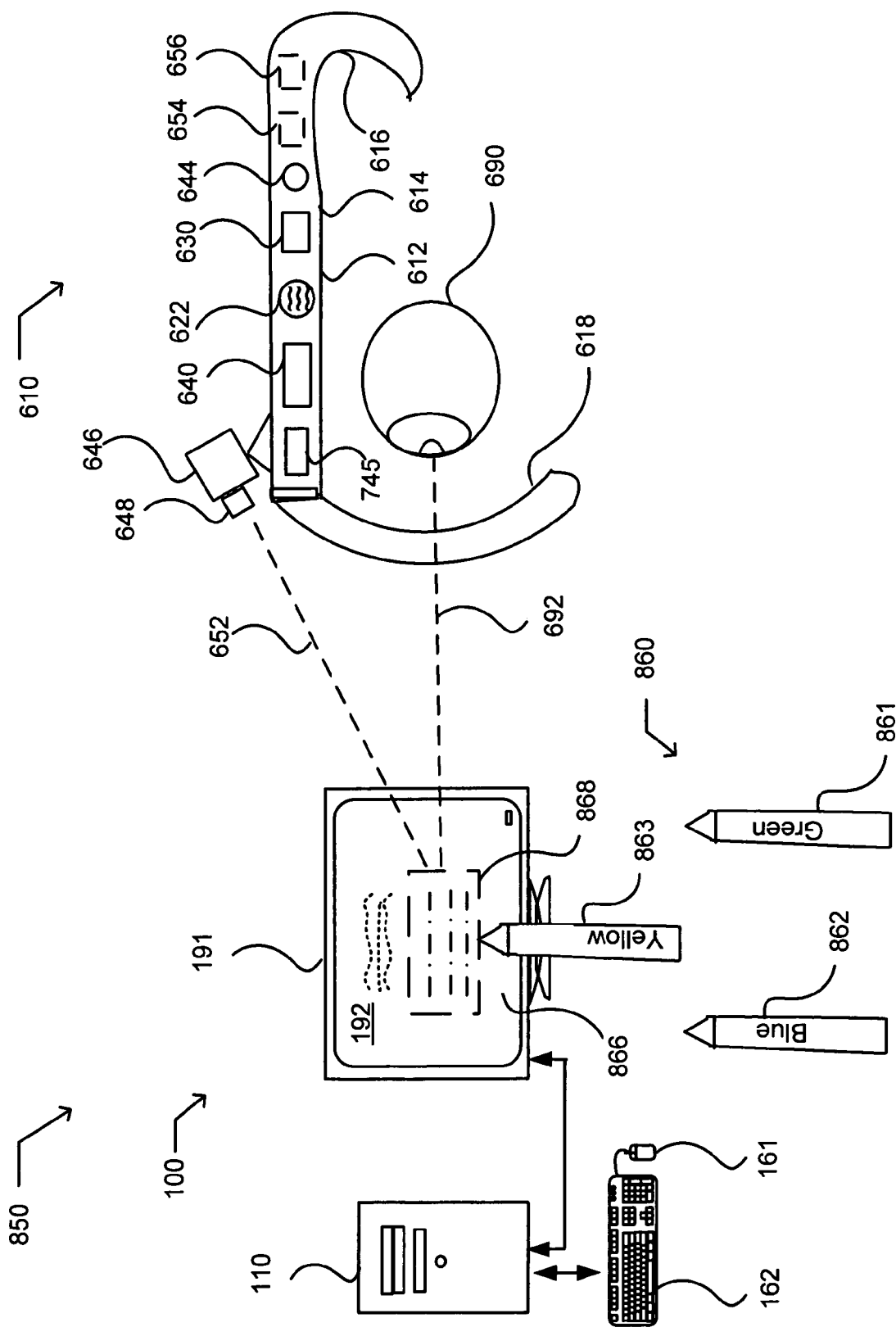
FIG. 18 illustrates an environment that includes a partial view of an exemplary annotation system and a partial view of an exemplary item.

FIG. 18 illustrates an environment 850 that includes a partial view of an exemplary annotation system and a partial view of an exemplary item. The exemplary annotation system is illustrated as an exemplary human wearable system 610, which is further illustrated as an exemplary head mountable system 612 of FIG. 13 and others. The exemplary item is illustrated as an exemplary document with a page 866 thereof displayed through a surface 192 of the monitor 191 of the computing system environment 100 of FIG. 2. The displayed page includes a recognizable text content 868. The head mountable system 612 includes a stylus-tracking module 745 operable to acquire data indicative of a preformed annotation.

The environment 850 also includes a stylus corresponding to a preformed user expression. In an embodiment illustrated in FIG. 18, the stylus is illustrated as a stylus set 860 of three individual styluses that include a green stylus 861, a blue stylus 862, and a yellow stylus 863. In an embodiment, the set of styluses are illustrative of "hi-liter" type highlighting markers used by students and others to annotate course materials. A stylus may have any preformed expression. For example, in an embodiment, the yellow stylus may correspond to a preformed user expression of "highly interesting material." the red stylus may correspond to a preformed user expression of "dumb material." In an embodiment, a stylus may transmit a signal indicative of a preselected or preformed annotation. In another embodiment, a stylus may include an optically recognizable feature indicative of a preselected or preformed annotation. An optically recognizable feature may include a color, a bar code, and/or a shape.

In operation of an embodiment, a user may don and use the exemplary head mountable system 612, and allow the system to generate information indicative of a recognizable aspect of an item in a manner at least substantially similar to the system 612 of FIG. 13. In addition, the user may grasp a stylus in their hand, such as the yellow stylus 863, and use the stylus to associate a preformed user expression with the recognizable text content 868 of the document. The user expression may be associated in any manner that may be captured by the stylus-tracking module 745. For example, in an embodiment, the stylus-tracking module may be operable to capture a tapping of a tip of the yellow stylus 863 proximate to the recognizable text content as a preformed user expression of "highly interesting material." In another embodiment, the stylus-tracking module may be operable to capture a closed figure drawn around the recognizable text content with the tip of a stylus as a preformed user expression, the nature of which is established by the particular stylus selected from the stylus set 860. The annotating device 630 generates information indicative of the user expression associated with the recognizable text context in response to the captured preformed user expression.

Figure 19:
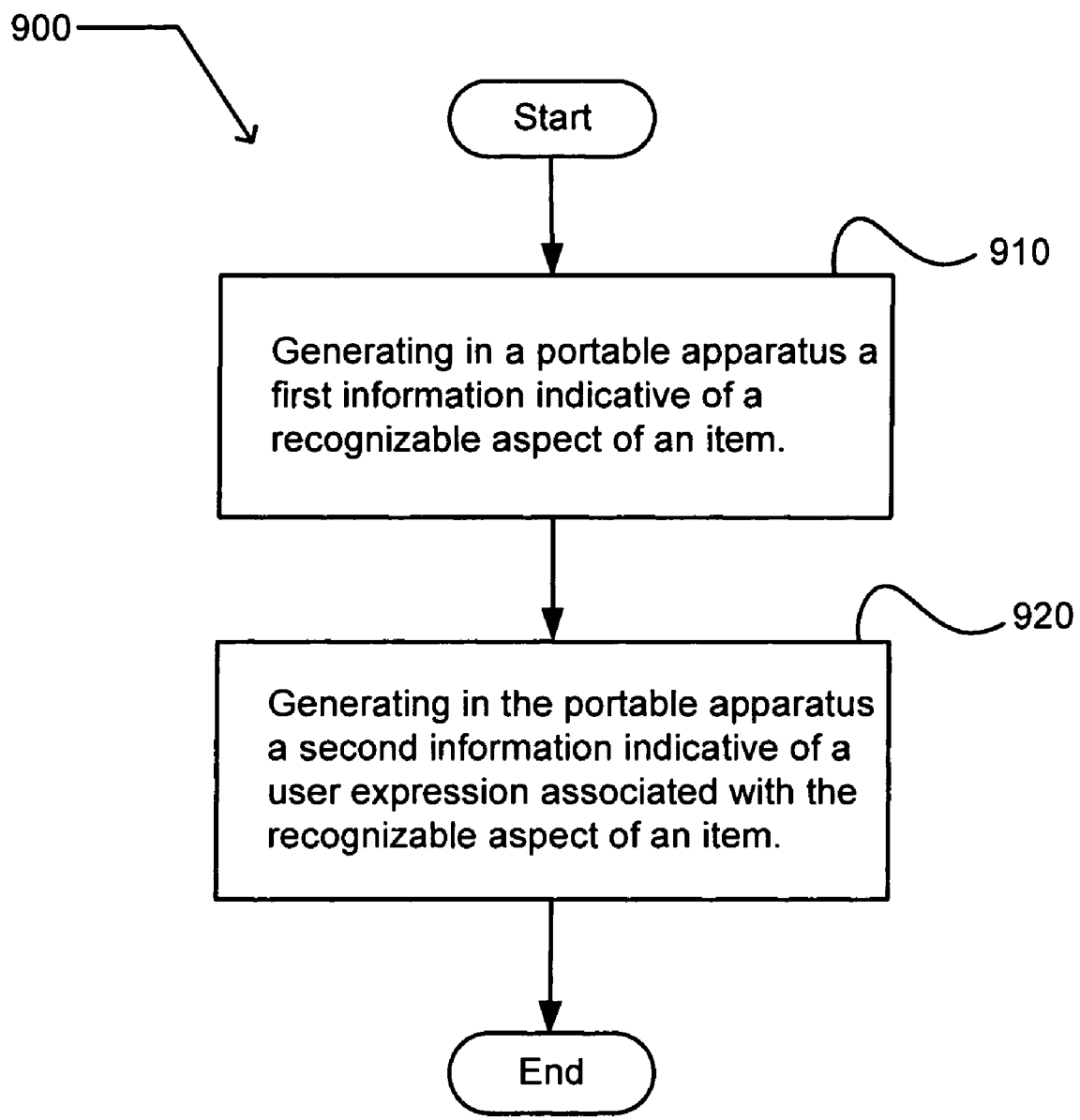
FIG. 19 illustrates an exemplary operational flow.

FIG. 19 illustrates an exemplary operational flow 900. After a start operation, the operational flow moves to a context operation 910. At the context operation, a first information indicative of a recognizable aspect of an item is generated in a portable apparatus. At a context operation 920, a second information indicative of a user expression associated with the recognizable aspect of an item is generated in the portable apparatus. The operational flow then moves to an end operation.

Figure 20:
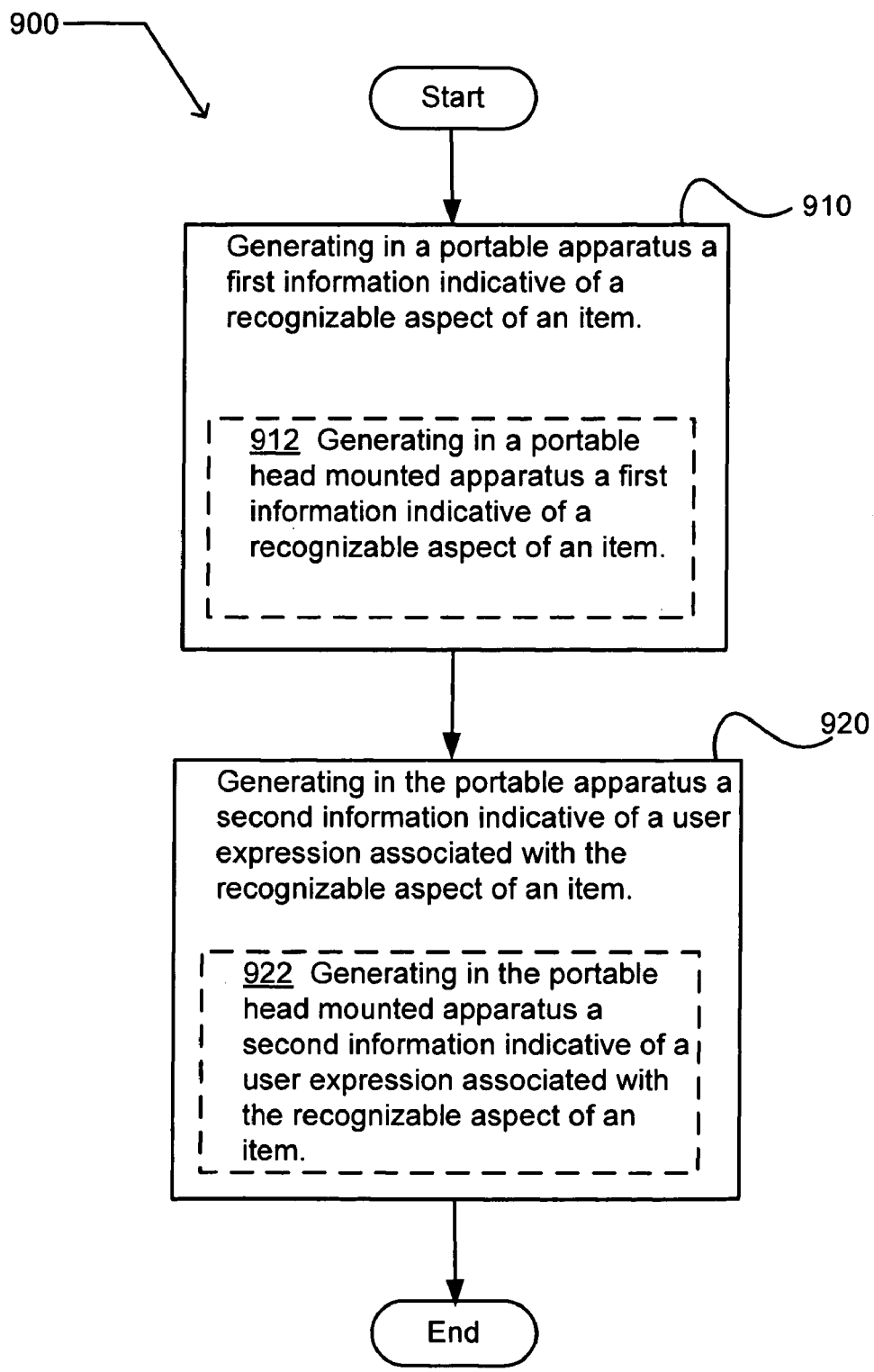
FIG. 20 illustrates an alternative embodiment of the exemplary operational flow of FIG. 19.

FIG. 20 illustrates an alternative embodiment of the exemplary operational flow 900 of FIG. 19. The context operation 910 may include at least one additional operation, such as an operation 912. At the operation 912, a first information indicative of a recognizable aspect of an item is generated in a portable head mountable apparatus. The content operation 920 may include at least one additional operation, such as an operation 922. At the operation 922, a second information indicative of a user expression associated with the recognizable aspect of an item is generated in the portable head mountable apparatus.

Figure 21:
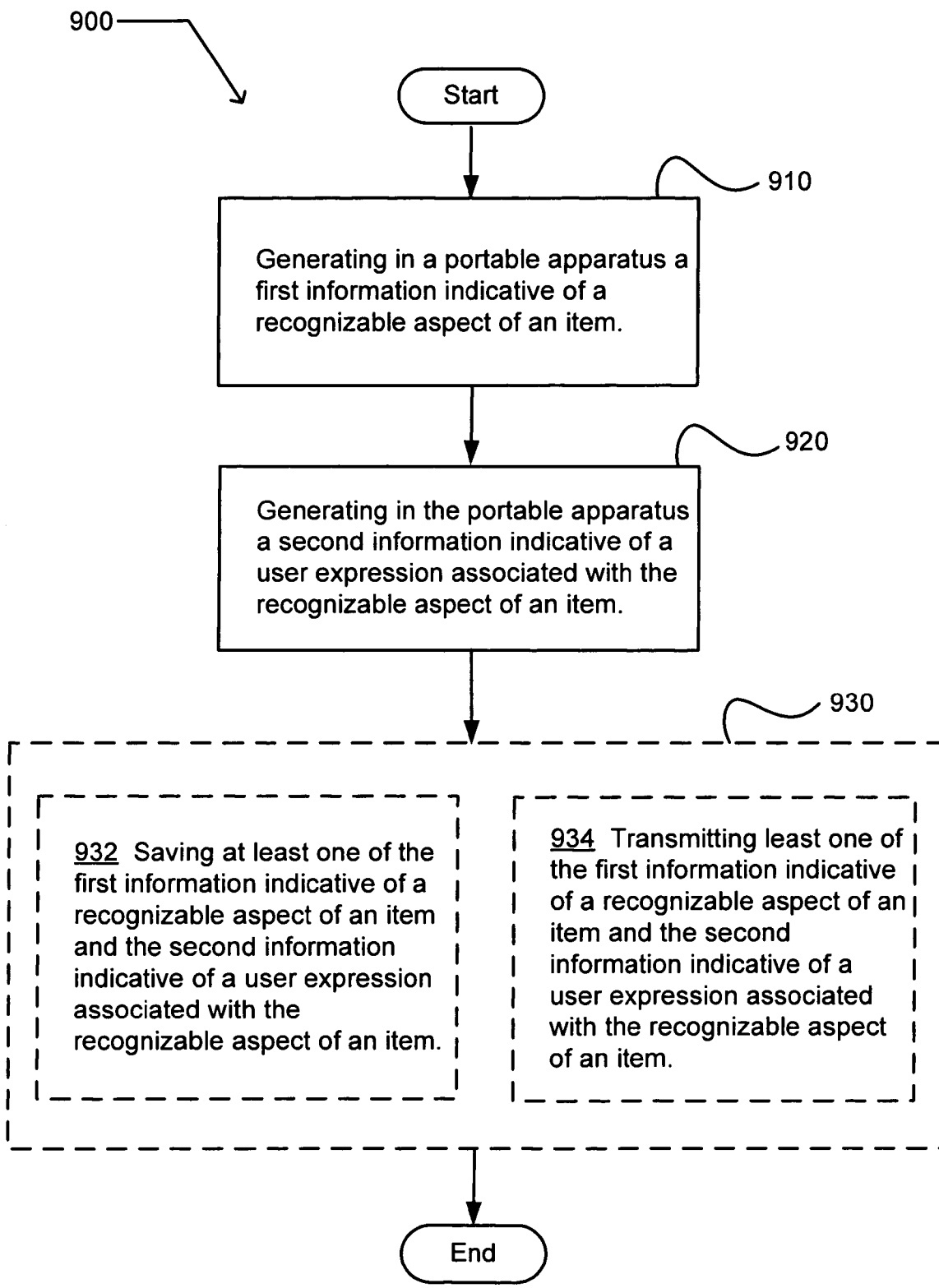
FIG. 21 illustrates another alternative embodiment of the exemplary operational flow of FIG. 19.

FIG. 21 illustrates another alternative embodiment of the exemplary operational flow 900 of FIG. 19. The operational flow 900 may include at least one additional operation 930. The additional operation 930 may include a storage operation 932 and/or a communication operation 934. The storage operation 932 may include saving at least one of the first information indicative of a recognizable aspect of an item and the second information indicative of a user expression associated with the recognizable aspect of an item. The communication operation 934 may include transmitting least one of the first information indicative of a recognizable aspect of an item and the second information indicative of a user expression associated with the recognizable aspect of an item.

Figure 22:
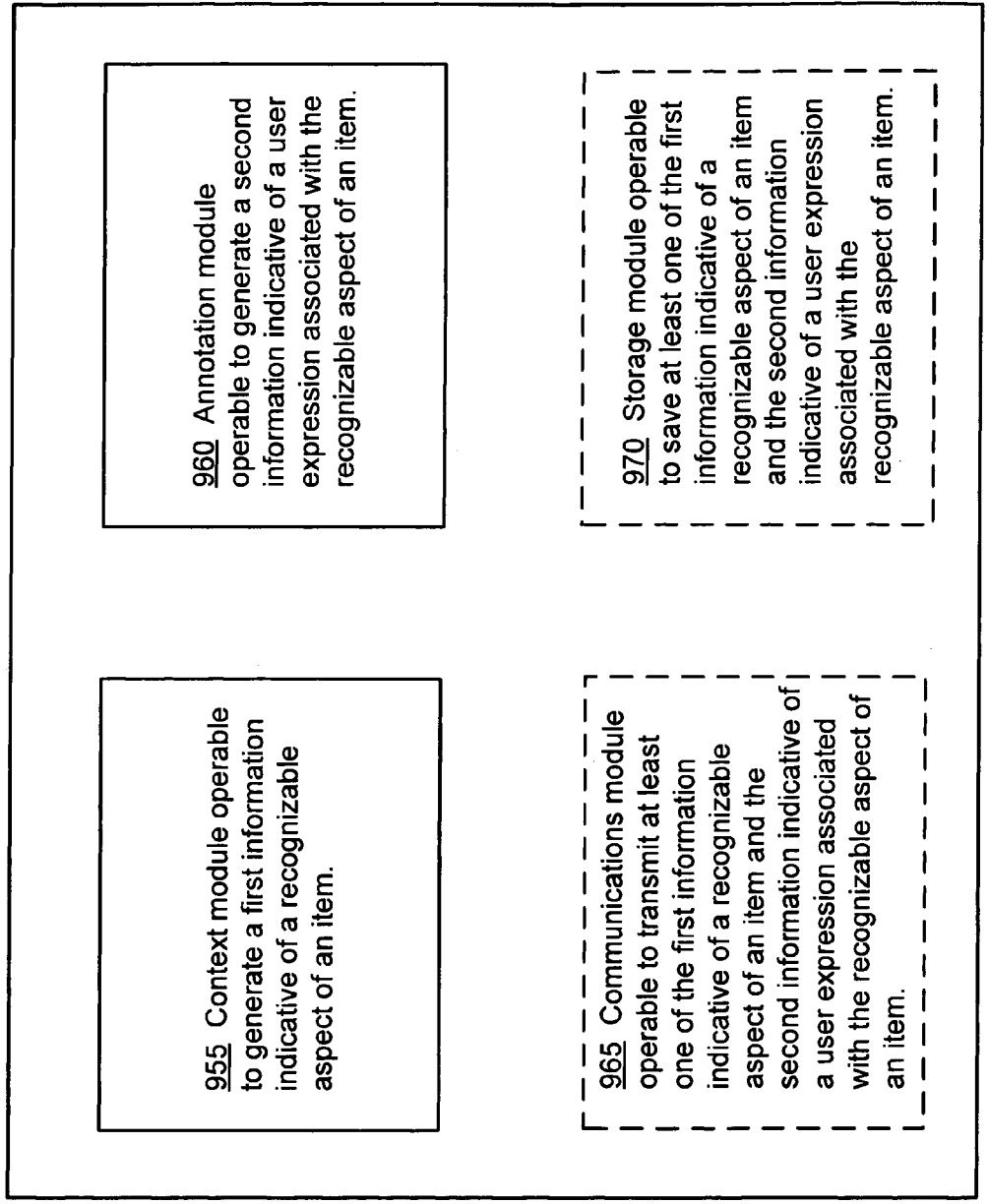
FIG. 22 illustrates a partial view of an exemplary wearable apparatus.

FIG. 22 illustrates a partial view of an exemplary wearable apparatus 950. The apparatus includes a context module 955 operable to generate a first information indicative of a recognizable aspect of an item. The apparatus also includes an annotation module 960 operable to generate a second information indicative of a user expression associated with the recognizable aspect of an item. In an embodiment, the apparatus may include at least one additional module. The additional module may include a communications module 965 operable to transmit at least one of the first information indicative of a recognizable aspect of an item and the second information indicative of a user expression associated with the recognizable aspect of an item. The additional module may include a storage module 970 operable to save at least one of the first information indicative of a recognizable aspect of an item and the second information indicative of a user expression associated with the recognizable aspect of an item.

Figure 23:
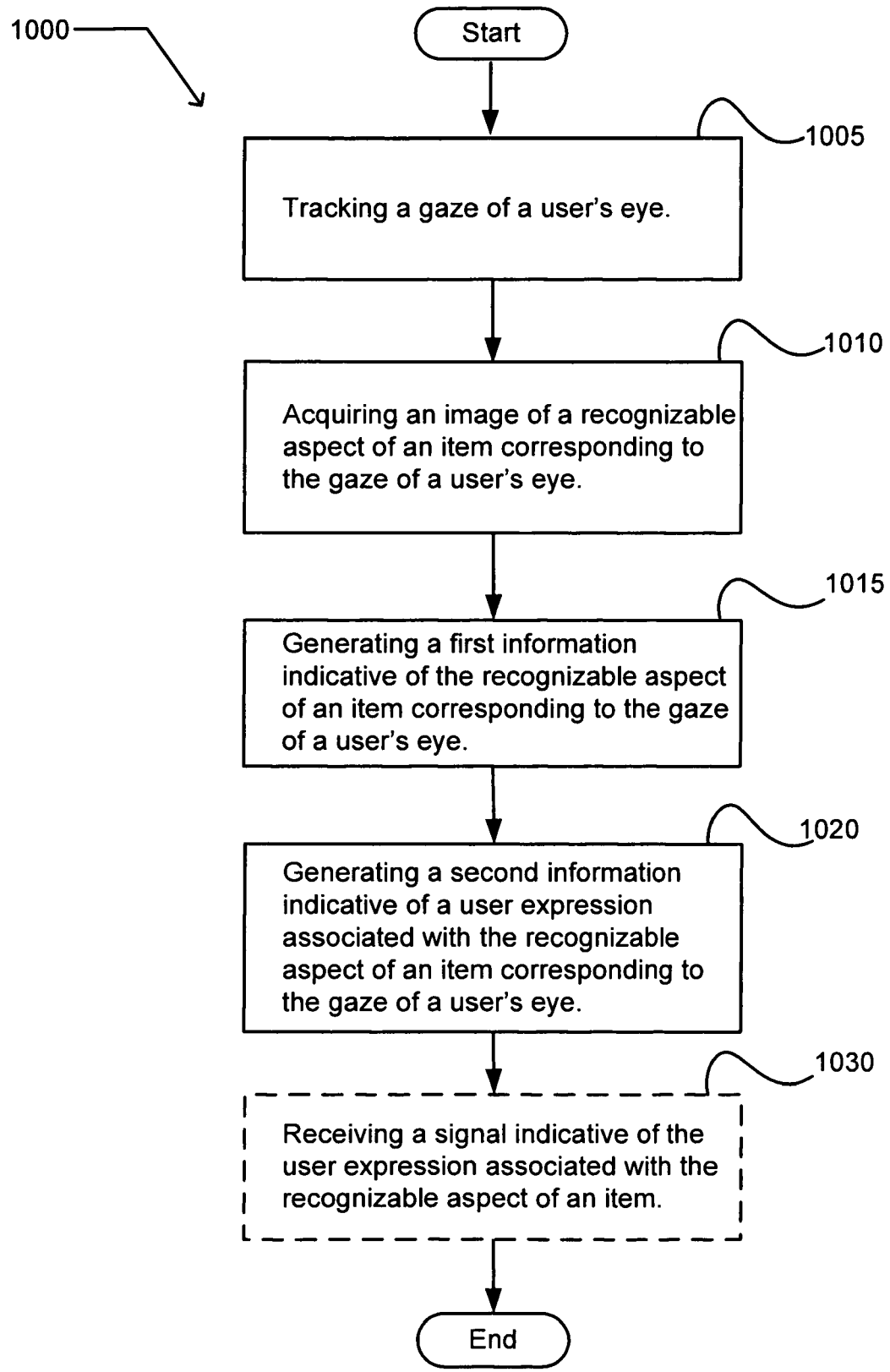
FIG. 23 illustrates an exemplary operational flow.

FIG. 23 illustrates an exemplary operational flow 1000. After a start operation, the operational flow moves to a monitoring operation 1005. At the monitoring operation, a gaze of a user's eye is tracked. At a capture operation 1010, an image is acquired of a recognizable aspect of an item corresponding to the gaze of a user's eye. At a context processing operation 1015, a first information is generated indicative of the recognizable aspect of an item corresponding to the gaze of a user's eye. At an annotation processing operation 1020, a second information is generated indicative of a user expression associated with the recognizable aspect of an item corresponding to the gaze of a user's eye. The operational flow then proceeds to an end operation.

In an embodiment, the operational flow 1000 may include at least one additional operation, such as an operation 1030. At the operation 1030, a signal is received indicative of the user expression associated with the recognizable aspect of an item.

Figure 24:
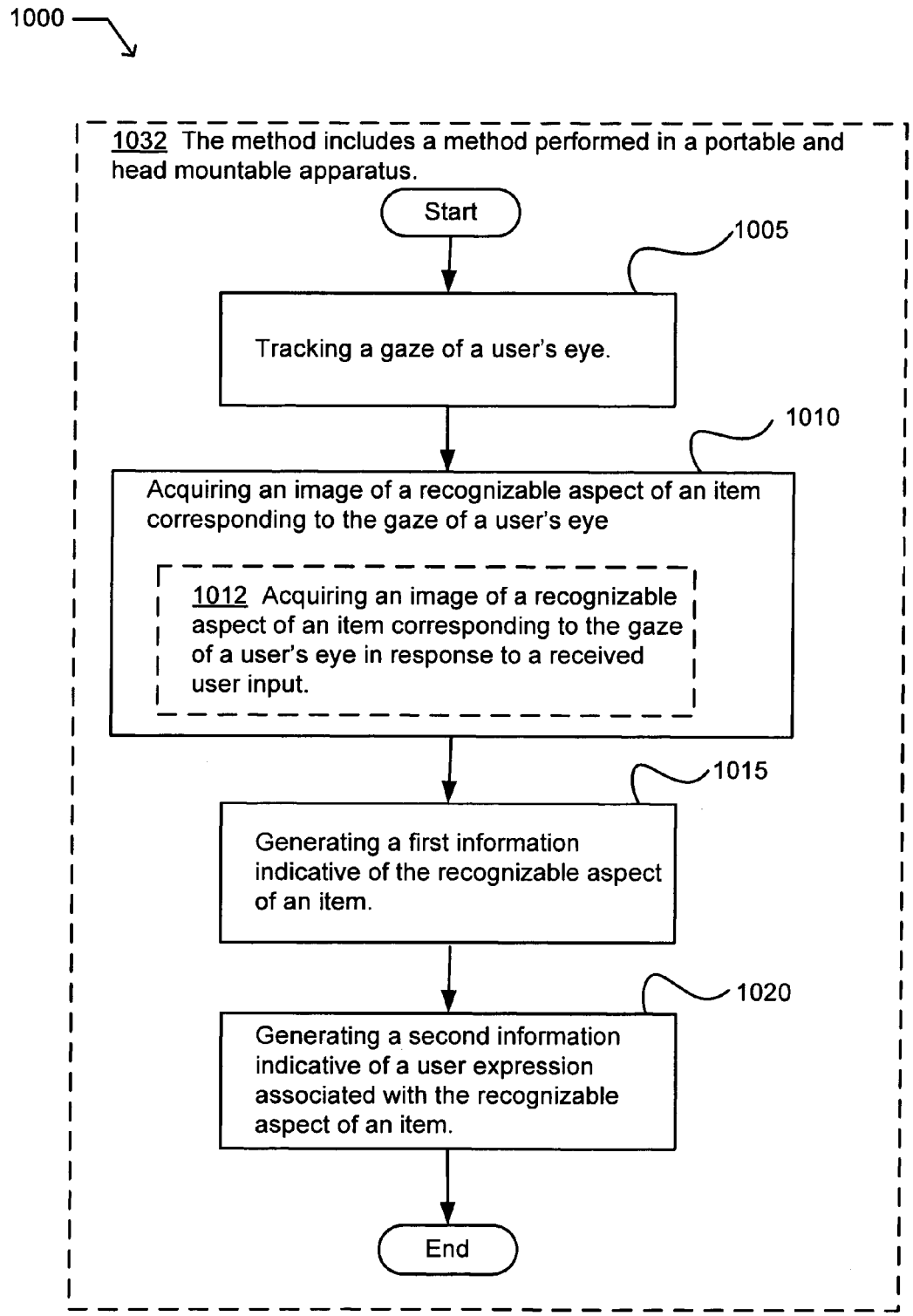
FIG. 24 illustrates an alternative embodiment of the operational flow of FIG. 23.

FIG. 24 illustrates an alternative embodiment of the operational flow 1000 of FIG. 23. In an embodiment, the operational flow 1000 may include an operational flow 1032 performed in a head mountable apparatus. In a further embodiment, the capture operation 1010 may include at least one additional operation, such as an operation 1012. At the operation 1012, an image is acquired of a recognizable aspect of an item corresponding to the gaze of a user's eye in response to a received user input. The received user command may include any suitable command, for example a sound, such as a finger snap, a voice command, such as "acquire this," and/or activation of a button.

Figure 25:
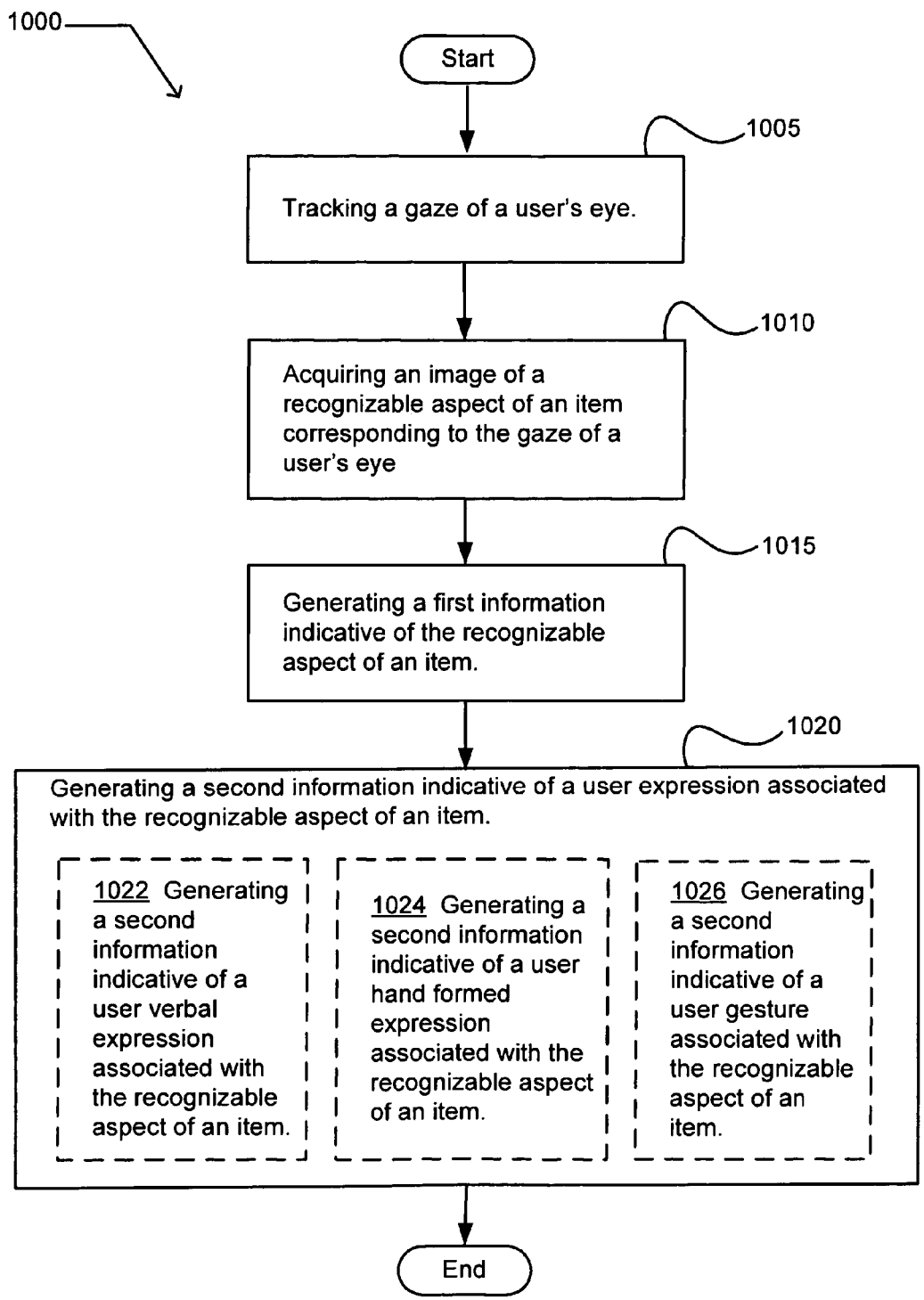
FIG. 25 illustrates another alternative embodiment of the operational flow of FIG. 23.

FIG. 25 illustrates another alternative embodiment of the operational flow 1000 of FIG. 23. The annotation processing operation 1020 may include at least one additional operation. An additional operation may include an operation 1022, an operation 1024, and an operation 1026. At the operation 1022, a second information is generated indicative of a user verbal expression associated with the recognizable aspect of an item. At the operation 1024, a second information is generated indicative of a user hand formed expression associated with the recognizable aspect of an item. At the operation 1026 a second information is generated indicative of a user gesture associated with the recognizable aspect of an item.

Figure 26:
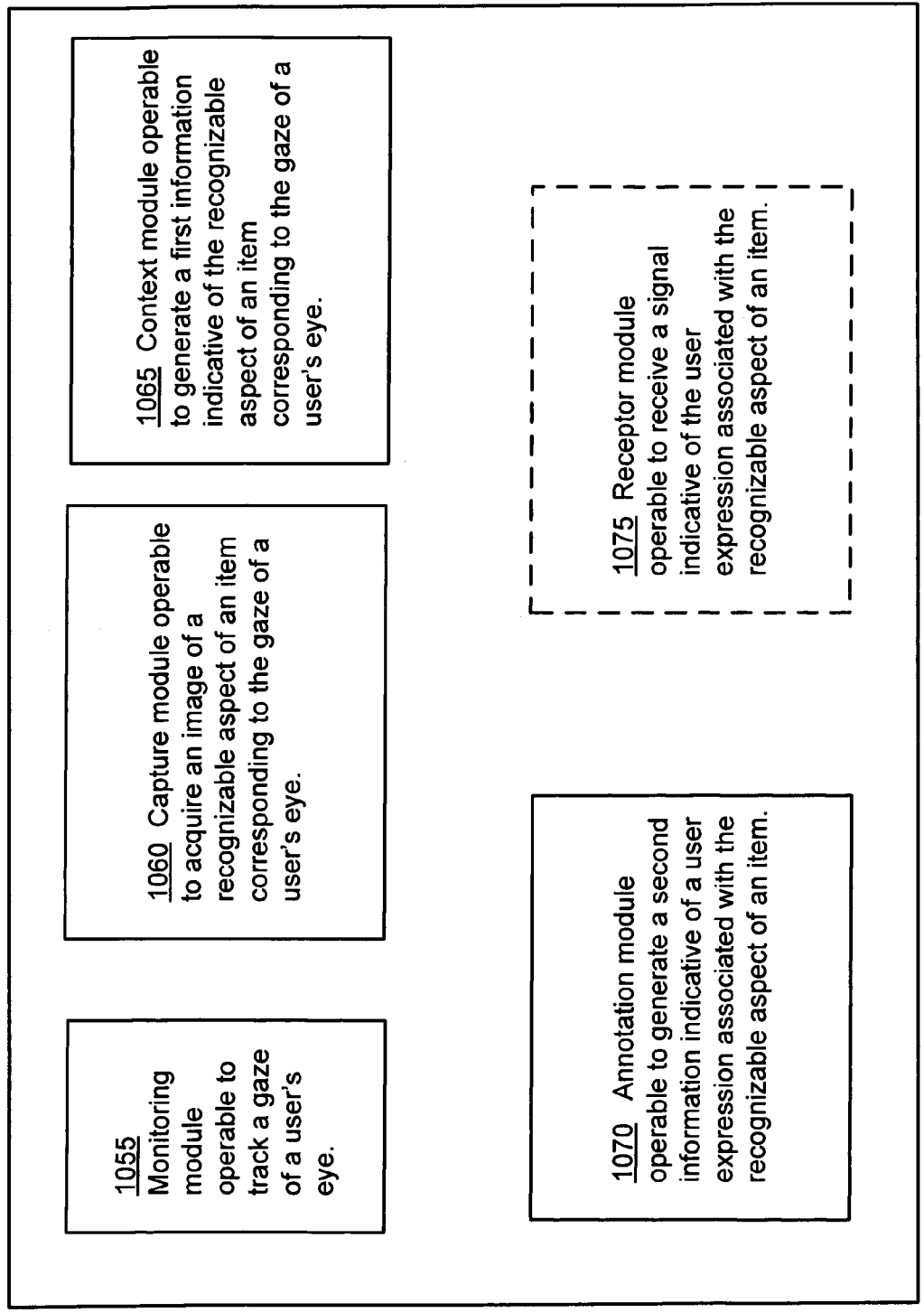
FIG. 26 illustrates a partial view of an exemplary wearable apparatus.

FIG. 26 illustrates a partial view of an exemplary wearable apparatus 1050. The apparatus includes a monitoring module 1055 operable to track a gaze of a user's eye, and a capture module 1060 operable to acquire an image of a recognizable aspect of an item corresponding to the gaze of a user's eye. The apparatus also includes a context module 1065 operable to generate a first information indicative of the recognizable aspect of an item corresponding to the gaze of a user's eye. The apparatus includes an annotation module 1070 operable to generate a second information indicative of a user expression associated with the recognizable aspect of an item. In an alternative embodiment, the apparatus may include a receiver module 1075 operable to receive a signal indicative of the user expression associated with the recognizable aspect of an item. The signal indicative of the user expression may include a video signal indicative of a handwritten user expression, a signal indicative of a spoken user expression, and/or a signal indicative of a user gesture (none shown).

FIG. 27 illustrates an environment 1900 in which embodiments may be implemented. The environment includes an article of manufacture including a surface, illustrated as a document 1910 including a surface 1912. The environment also includes a tag characterization table including at least two machine-distinguishable tags, illustrated as a characterization table 1920 including at least two machine-distinguishable tags 1928 displayed in a column. The tag characterization table further has a unique descriptor respectively correlating to each machine-distinguishable tag of the at least two machine-distinguishable tags, illustrated as a column of unique descriptors 1930. In an embodiment, a machine-distinguishable tag 1924 is illustrated as a "●" and is correlated to a unique descriptor "urgent tasks" 1932. In an embodiment, the tag characterization table may be displayed on a separate article of manufacture. In another embodiment, the tag characterization table may be printed on the document 1910, displayed on an electronic display surface (not shown), and/or known to a user.

As used herein, machine-distinguishable includes anything that may be distinguished from something else using a machine. A machine may include a computing device implementing a distinguishing program. The distinguishing program may be implemented in any technology, such as hardware, software, and/or firmware. In an embodiment, machine distinguishing may include recognizing a tag and/or an identifier. In another embodiment, machine distinguishing may include selecting a tag or identifier of a set based upon a probability that the tag or identifier is not any other tag or identifier of the set.

The environment also includes an exemplary handheld marking device, in an embodiment illustrated as pen having some or all of the elements of any one or all of the exemplary handheld marking device 210 of FIG. 3, the exemplary electronic pen 211 of FIG. 4, the exemplary apparatus 212 of FIG. 5, the exemplary apparatus 213 of FIG. 6, and/or the exemplary handheld system 510 of FIG. 21. In another embodiment, the exemplary handheld marking device may include the pen 720 having a writing tip 721 and the head-mountable system 612 of FIG. 17. The exemplary handheld marking device includes a writing detector module operable to generate a signal indicative of a hand-formed mark by a writing element on a surface, and a tag detector module operable to generate a signal indicative of a machine-distinguishable tag associated with the hand-formed mark. In an embodiment, the writing detector module is illustrated as the writing detector module 230 of the exemplary handheld writing device 210. The tag detector module is further illustrated as the context detector module 240.

In an alternative embodiment (not shown), the environment 1900 may include a device that generates movement tracking data corresponding to movements of the handheld marking device and/or the article of manufacture. For example, Polhemus of Colchester, Vt., manufactures and markets several electromagnetic tracking apparatus that tracks objects in a space. Movement tracking data may be used in generating a content signal indicative of a hand-formed mark on a surface, and/or generating a label signal indicative of a machine-distinguishable tag associated with the hand-formed mark.

In an embodiment, the surface 1912 of document 1910 is initially blank. In use, and as illustrated in FIG. 27, a user moves the writing element 220 of the handheld writing device 210 to form at least one instance of a hand-formed mark 1944 on the surface 1912. FIG. 27 illustrates instances of hand-formed marks each respectively formed on a single line. The user also hand-forms a machine-distinguishable tag on the surface 1912 and respectively associates the machine-distinguishable tag with at least one hand-formed mark. The machine-distinguishable tag is selected from the at least two machine-distinguishable tags 1928 displayed in a column. For example, FIG. 27 illustrates a hand-formed machine-distinguishable tag "●" 1914 proximally associated with a hand-formed mark, illustrated as a textual entry "Buy welcome home card" 1916. The exemplary handheld marking device captures the hand-formed mark and generates a content signal indicative of the hand-formed mark using the writing detector module 230. The exemplary handheld marking device also captures the hand-formed machine-distinguishable tag using the writing detector module 230, and/or the context detector module 240, and generates a label signal indicative of the hand-formed machine-distinguishable tag.

Figure 28:
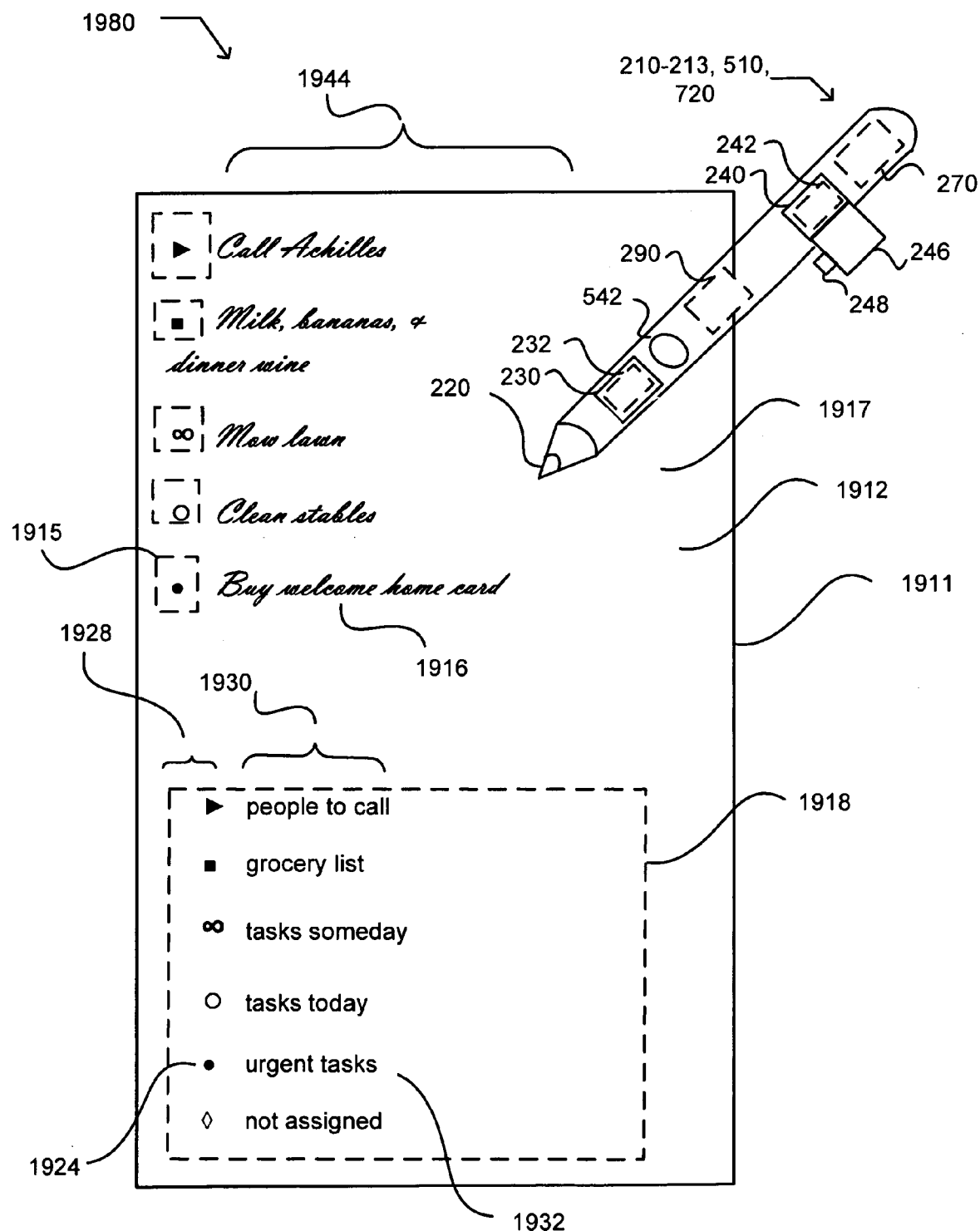
FIG. 28 illustrates another environment in which embodiments may be implemented.

FIG. 28 illustrates another environment 1980 in which embodiments may be implemented. The environment includes an article of manufacture, illustrated as a document 1911 including a surface 1912. The surface includes a writing surface portion 1917 and a tag portion 1918. The writing surface portion accepts at least one mark by a handheld marking device. The tag portion displays the at least two machine-distinguishable tags 1928 displayed in a column, each machine-distinguishable tag of the at least two machine distinguishable tags is unique and user associatable with at least one mark. A tag may be associated by using a handheld marking device, such as the device 210-213, 510, and/or 720.

In an embodiment, the writing surface portion 1917 is initially blank. In use, and as illustrated in FIG. 28, a user moves the handheld marking device to form at least one hand-formed mark 1944 on the surface 1912 of the handwriting portion. The user also associates a machine-distinguishable tag with the at least one hand-formed mark. In an embodiment illustrated in FIG. 28, a user associates a machine-distinguishable tag with at least one hand-formed mark by capturing the machine-distinguishable tag from the at least two machine-distinguishable tags of the tag portion 1918. In an embodiment, the machine-distinguishable tag may be captured from the tag portion as an image using the image capture device 246 of the context detector module 240. A user may associate the machine-distinguishable tag "●" 1924 of the at least two machine-distinguishable tags 1928 with the hand-formed mark "Buy welcome home card" 1916 by capturing an image (represented as the captured image 1915) of the machine-distinguishable tag "●" with the context detector module 240. The association may include a temporal association between forming the hand-formed mark 1916 and capturing the machine-distinguishable tag "●". In a further embodiment, the association may include a gesture indicating an association between the hand-formed mark 1916 and capturing the machine-distinguishable tag "●". For example, a gesture may include tapping a portion of the handheld marking device on the surface 1912, and/or tapping a fingertip on any surface. In another embodiment, a scanner (not shown) embodied in the handheld marking device may be used to discern the machine-distinguishable tag "●" for association with the hand-formed mark 1916.

Figure 29:
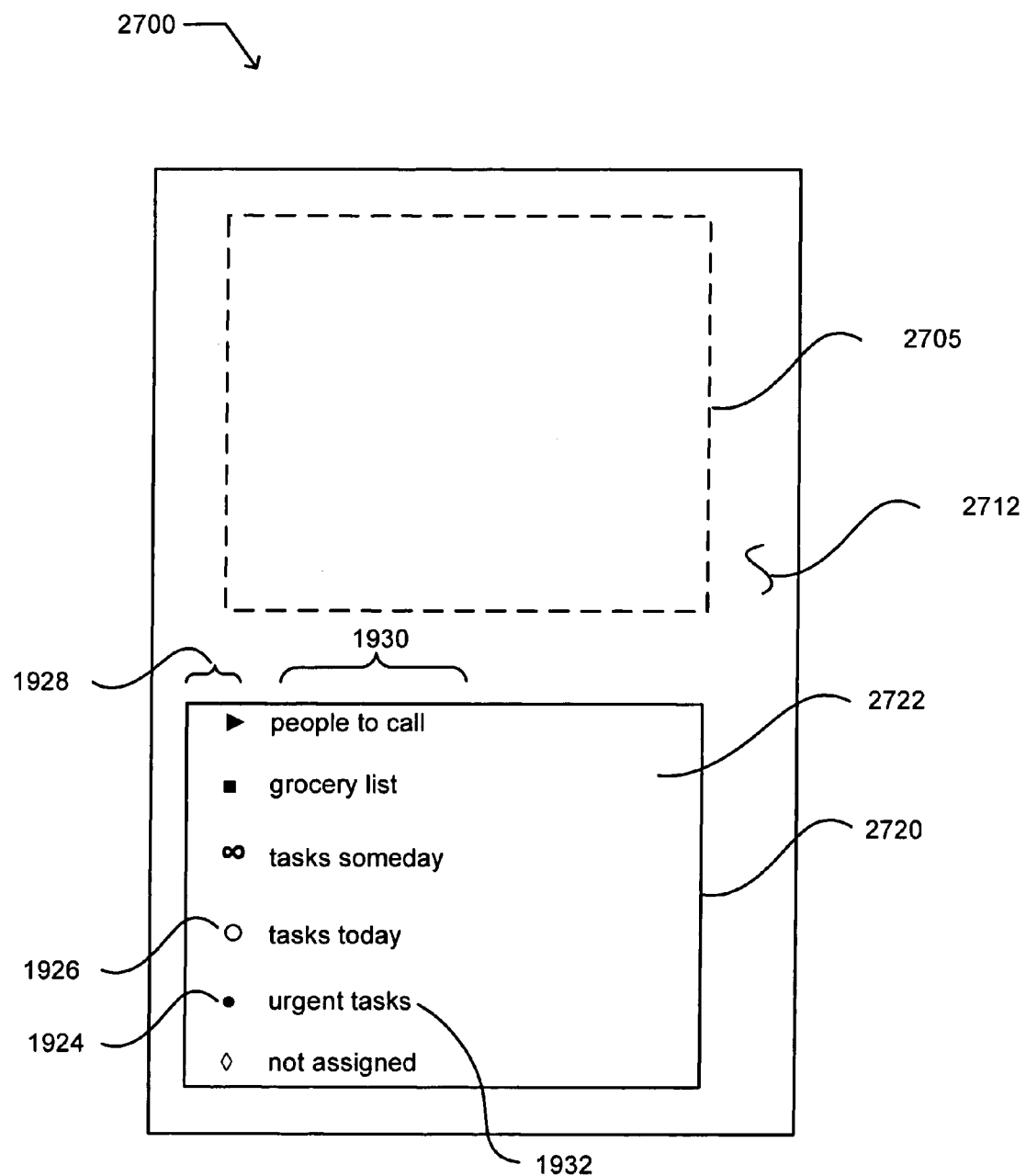
FIG. 29 illustrates a partial view of an embodiment of an article of manufacture.

FIG. 29 illustrates a partial view of an embodiment of an article of manufacture 2700. The article of manufacture includes a surface having a writing portion that accepts at least one hand-formed mark, illustrated as a surface 2712 having a writing portion 2705 that accepts at least one hand-formed mark. The article of manufacture also includes a tag portion 2720. The tag portion displays a tag characterization table 2722 that includes at least two machine-distinguishable tags, illustrated as a tag characterization table having six unique machine-distinguishable tags 1928 displayed in the column. Each machine-distinguishable tag of the at least two machine-distinguishable tags is unique and keyed to a data recipient.

The writing portion 2705 that accepts at least one hand-formed mark may include a writing surface portion that accepts at least one hand-formed mark. In an embodiment, the writing surface portion that accepts at least one hand-formed mark may include a paper writing surface portion that accepts at least one hand-formed mark. For example, in an embodiment, the article of manufacture 2700 may include a preprinted sheet of paper including the writing surface portion. In another embodiment, the article of manufacture may include a tablet having at least two preprinted sheets of paper, each sheet respectively including the writing surface portion. In another embodiment, the writing portion that accepts at least one hand-formed mark may include an electronic display surface portion that accepts at least one hand-formed mark. For example, the electronic display surface may include an electronically driven display that accepts handwriting, such as a display screen of a tablet PC. The writing portion that accepts at least one hand-formed mark may include a writing portion that accepts at least one mark formed by a marking element of a handwriting device. The marking element may include a marking element that leaves a visible mark or a writing element that does not leave a visible mark. For example, the writing portion that accepts at least one hand-formed mark may include a writing portion that accepts at least one mark formed by an ink disbursed from a pen.

Figure 31:
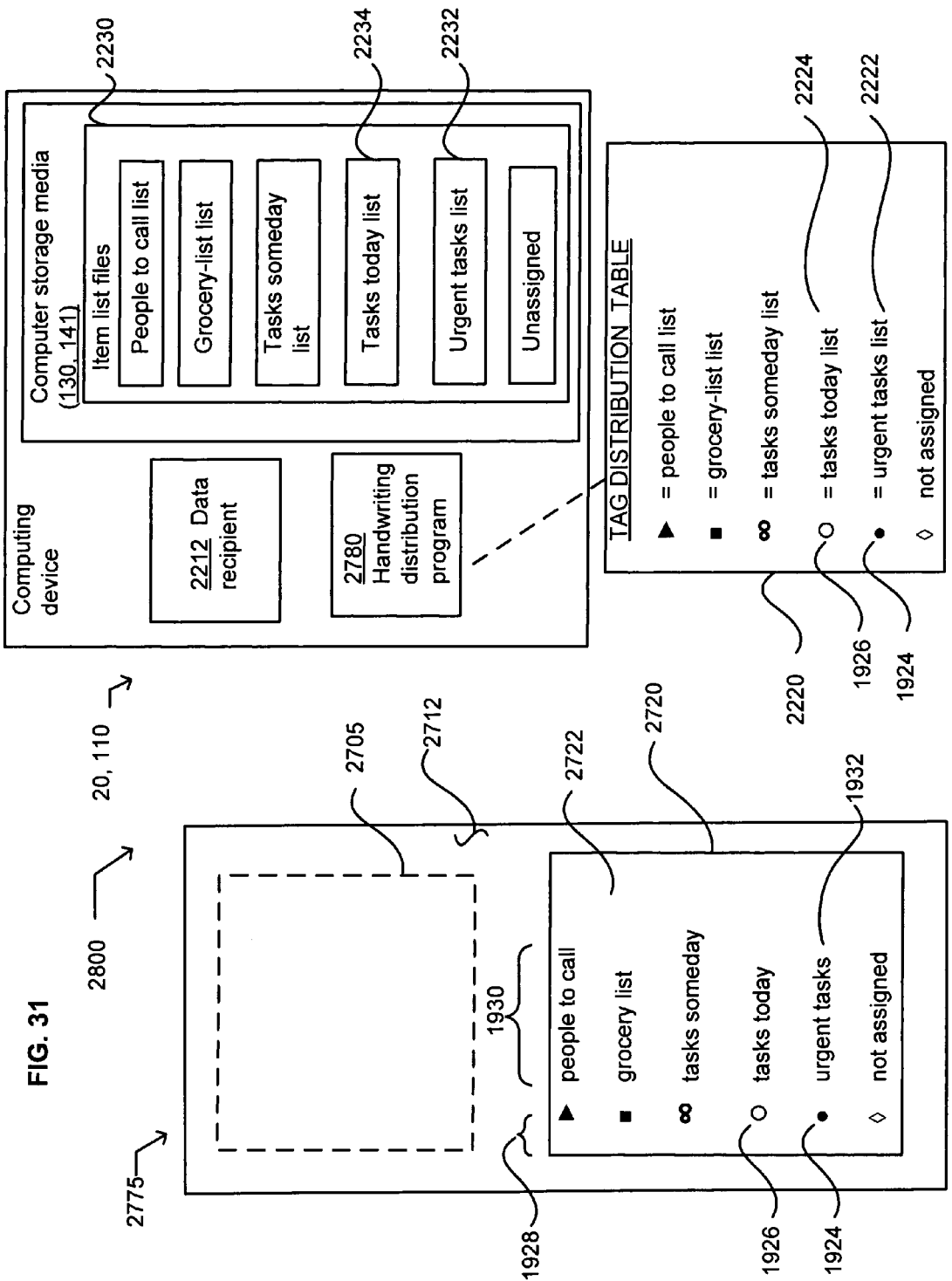
FIG. 31 illustrates a partial view of a system in which embodiments may be implemented.

The tag portion 2720 that displays at least two machine-distinguishable tags 1928 may include a tag portion displaying at least two machine-distinguishable tags, each machine-distinguishable tag of the at least two machine-distinguishable tags being unique, keyed to a data recipient, and associatable with the at least one hand-formed mark. FIG. 29 illustrates the at least two machine-distinguishable tags as including the machine-distinguishable tag "●" 1924 and the machine-distinguishable tag "○" 1926, which are respectively unique. FIG. 31, infra, illustrates a tag distribution table 2220 that respectively keys the at least two machine-distinguishable tags to data recipients. For example, FIG. 31 illustrates the tag distribution table keying the machine-distinguishable tag "●" 1924 to the urgent tasks list 2222, which corresponds to urgent task list file 2232, and keying the machine-distinguishable tag "○" 1926 to the tasks today list 2224, which corresponds to the tasks today list file 2234. In an embodiment, the at least two machine-distinguishable tags may be user associated with a hand-formed mark by a user drawing or hand reproducing a tag proximate to the hand-formed mark. In another embodiment, the at least two machine-distinguishable tags may be user associated with a hand-formed mark by a user scanning a tag proximate in time to the user writing the hand-formed mark. In a further embodiment, each machine-distinguishable tag of the at least two machine-distinguishable tags may be predefined. FIG. 29 illustrates an embodiment where the tag portion 2720 includes a unique predefinition for each machine-distinguishable tag, collectively illustrated as the column of unique predefined descriptors 1930. For example, the machine-distinguishable tag "●" 1924 is predefined by printing proximate thereto a characterization "urgent tasks" 1932. In an alternative embodiment, a user may define at least one of the at least two machine-distinguishable tags 1928. The tag portion displaying at least two machine-distinguishable tags may include a tag portion displaying at least two machine-distinguishable tags, each machine-distinguishable tag of the at least two machine-distinguishable tags being unique, keyed to a data recipient and configured for a user gestural association with the at least one hand-formed mark. For example, the machine-distinguishable tag "○" 1926 may be formed by a user gesture spatially proximate to but not on the surface 2705 using a stylus of a handwriting device, such as the element 220 of the exemplary handheld writing device 210 of FIG. 3.

In operation, a user creates a hand-formed mark on the writing portion 2705. The user associates a machine-distinguishable tag of the at least two machine distinguishable tags with the hand-formed mark. In an embodiment, both may be accomplished in a manner at least similar to that described in conjunction with FIG. 27.

FIG. 29 also illustrates a partial view of an alternative embodiment. The alternative embodiment includes a device that includes a writing portion 2705 and a tag portion 2720. The writing portion includes a portion of the paper surface 2712 that accepts at least one handwritten word and a hand-formed machine-distinguishable tag proximate to the handwritten word. The tag portion includes a paper surface displaying at least two machine-distinguishable tags and a characterization for each machine-distinguishable tag. Each machine-distinguishable tag is respectively correlatable to a data file.

Figure 30:
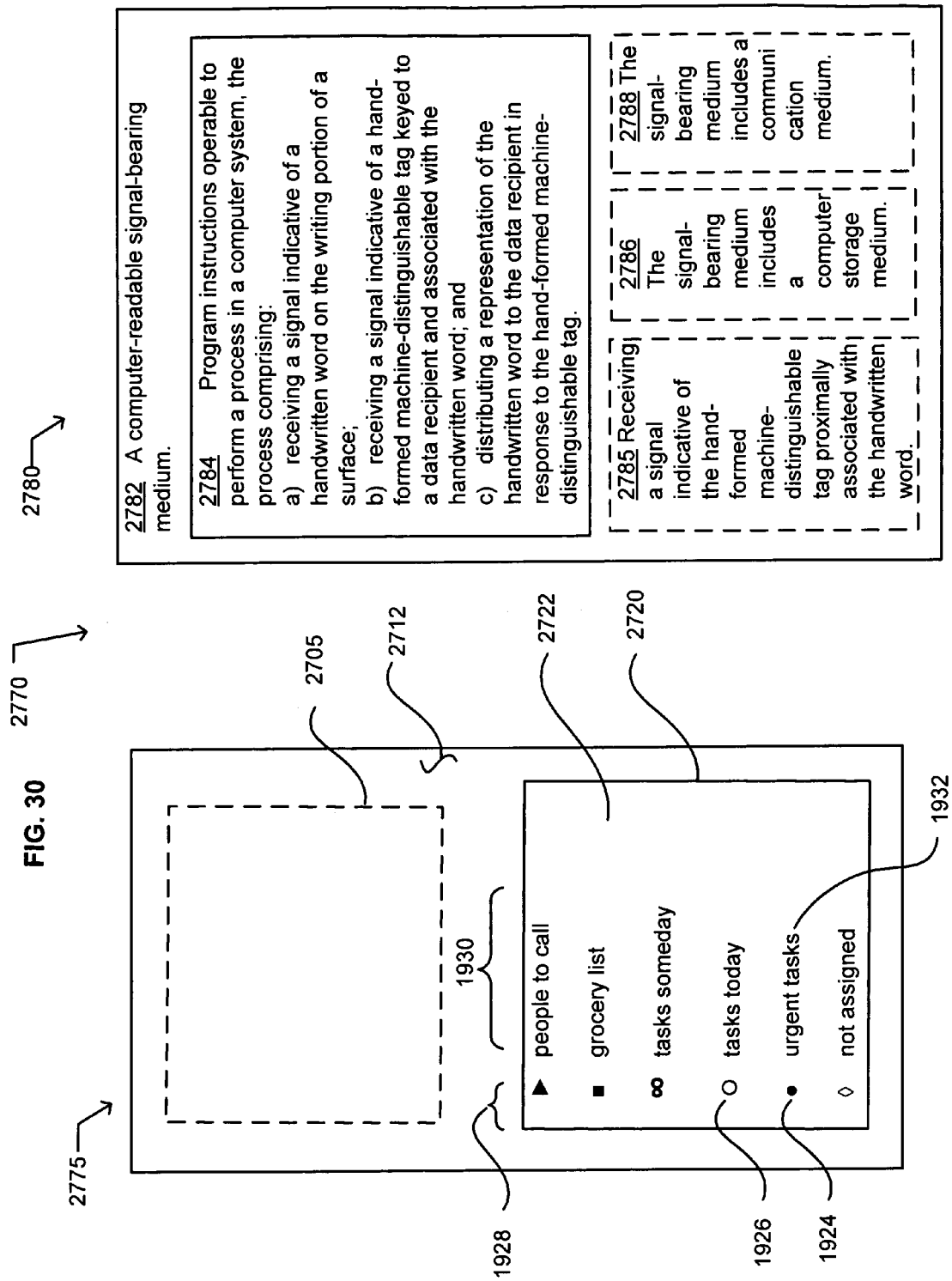
FIG. 30 illustrates a partial view of a system in which embodiments may be implemented.

FIG. 30 illustrates a partial view of a system 2770 in which embodiments may be implemented. The system includes a device 2775, which in an embodiment may be substantially similar to the article of manufacture 2700 described in conjunction with FIG. 29. The device includes the writing portion 2705 of a surface 2712 that accepts a handwritten word and a hand-formed machine-distinguishable tag associated with the handwritten word. The device also includes the tag portion 2720 of the surface which displays the at least two machine-distinguishable tags 1928. Each machine-distinguishable tag of the at least two machine distinguishable tags respectively being correlatable with a data recipient described in conjunction with FIG. 31, infra. Each machine-distinguishable tag of the at least two machine-distinguishable tags respectively includes a unique descriptor and/or characterization corresponding thereto, collectively illustrated as the column of unique descriptors 1930. The writing portion may include a writing portion of a paper surface that accepts a handwritten word and a hand-formed machine-distinguishable tag associated with the handwritten word.

The system 2770 also includes a computer program product 2780, also referred to herein in an alternative as a handwriting distribution program 2780. The computer program product includes program instructions 2784 operable to perform a process in a computer system and a computer-readable signal-bearing medium 2782 bearing the program instructions. The process includes receiving a signal indicative of a handwritten word on the writing portion of a surface, and receiving a signal indicative of the hand-formed machine-distinguishable tag keyed to a data recipient and associated with the handwritten word. The process also includes distributing a representation of the handwritten word to the data recipient in response to the hand-formed machine-distinguishable tag. The receiving a signal indicative of the hand-formed machine-distinguishable tag keyed to a data recipient and associated with the handwritten word may include receiving a signal 2785 indicative of the hand-formed machine-distinguishable tag keyed to a data recipient and proximally associated with the handwritten word.

The computer-readable medium 2782 may include a computer storage medium 2786, which may be carried by a computer-readable carrier (not shown). In an alternative embodiment, the computer-readable medium may include a communications medium 2788. The computer-program product 2780 may be implemented in hardware, software, and/or firmware.

FIG. 31 illustrates a partial view of a system 2800 in which embodiments may be implemented. The system includes an exemplary surface, illustrated in an embodiment as the surface 2712 of the device 2775 of FIG. 30. The surface includes a writing portion, illustrated in an embodiment as the writing portion 2705 of the surface 2712 of FIG. 30. In an embodiment, the device 2775 may be at least similar to the article of manufacture 2700 described in conjunction with FIG. 29. The surface also includes a tag portion displaying at least two machine-distinguishable tags and a characterization of each machine-distinguishable tag, illustrated as the tag portion 2720 described in conjunction with FIG. 29. The system further includes a computing device, illustrated as the thin computing device 20 described in conjunction with FIG. 1, or the general-purpose computing device 110 described in conjunction with FIG. 2. The system also includes a handwriting distribution program that includes a tag distribution table, illustrated as the handwriting distribution program 2780 described in conjunction with FIG. 30, and a tag distribution table 2220. In an embodiment, the handwriting distribution program is saved in the non-removable non-volatile memory hard disk drive 141 of the general-purpose computing device 110. In an embodiment, the surface may include a paper surface.

FIG. 31 further illustrates an embodiment where a data recipient includes an item list file 2230 saved in a computer storage media, such as the system memory 130 and/or a computer storage media product associated with the computing device 110, and/or such as the non-removable non-volatile memory hard drive 141. The item list file may include at least two list subfiles, one of which is illustrated as an "Urgent task list" subfile 2232, and another of which is illustrated as a "Tasks today list" subfile 2234. FIG. 31 further illustrates an embodiment where the tag distribution table 2220 keys a machine-distinguishable tag to a data recipient by correlating a machine-distinguishable tag with a list file. For example, the tag distribution table correlates the machine-distinguishable tag "●" 1924, and the "Urgent task list" subfile 2222. In another embodiment, a data recipient may include a file associated with the application programs 145 and/or program data 147 saved on the general-purpose computing device 110 described in conjunction with FIG. 2. For example, the machine-distinguishable tag "●" may be correlated with a subfile associated with Microsoft's Outlook® program, such as a "Tasks" folder. In a further embodiment, a data recipient may include a program, a data file, and/or an application, illustrated as a data recipient 2212.

In an embodiment, the system 2800 may be used in a manner at least similar to the environment 1900 and/or the environment 1980 described in conjunction with FIGS. 27 and/or 28. A user may employ a handheld marking device (not shown) to make a handwritten mark on the writing portion 2705 of the surface 2712. The handheld marking device may include a marking device described in conjunction with FIGS. 27 and/or 28. For example, and similar to that illustrated in conjunction with FIGS. 27 and/or 28, a user may move the writing element 220 of the handheld writing device 210 to form at least one instance of a hand-formed mark (not shown) on the writing portion 2705 of the surface 2712. The user may also hand-form a machine-distinguishable tag selected from the at least two machine-distinguishable tags 1928 on the surface and in an association with at least one hand-formed mark. The exemplary handheld marking device captures the hand-formed mark and generates a content signal indicative of the hand-formed mark using the writing detector module 230. The exemplary handheld marking device also captures the hand-formed machine-distinguishable tag using the writing detector module 230, and/or the context detector module 240, and generates a label signal indicative of the hand-formed machine-distinguishable tag.

The process of the program instructions 2784 of the handwriting distribution program 2780 described in conjunction with FIG. 30 receives a signal indicative of the handwriting, such as a handwritten word, on the writing portion 2705 of the surface 2712. The process also receives a signal indicative of the hand-formed machine-distinguishable tag keyed to a data recipient and associated with the handwriting. The process further distributes a representation of the handwritten word to a data recipient, such as a subfile of the item list files 2230 and/or the data recipient 2212, in response to the hand-formed machine-distinguishable tag.

Figure 32:
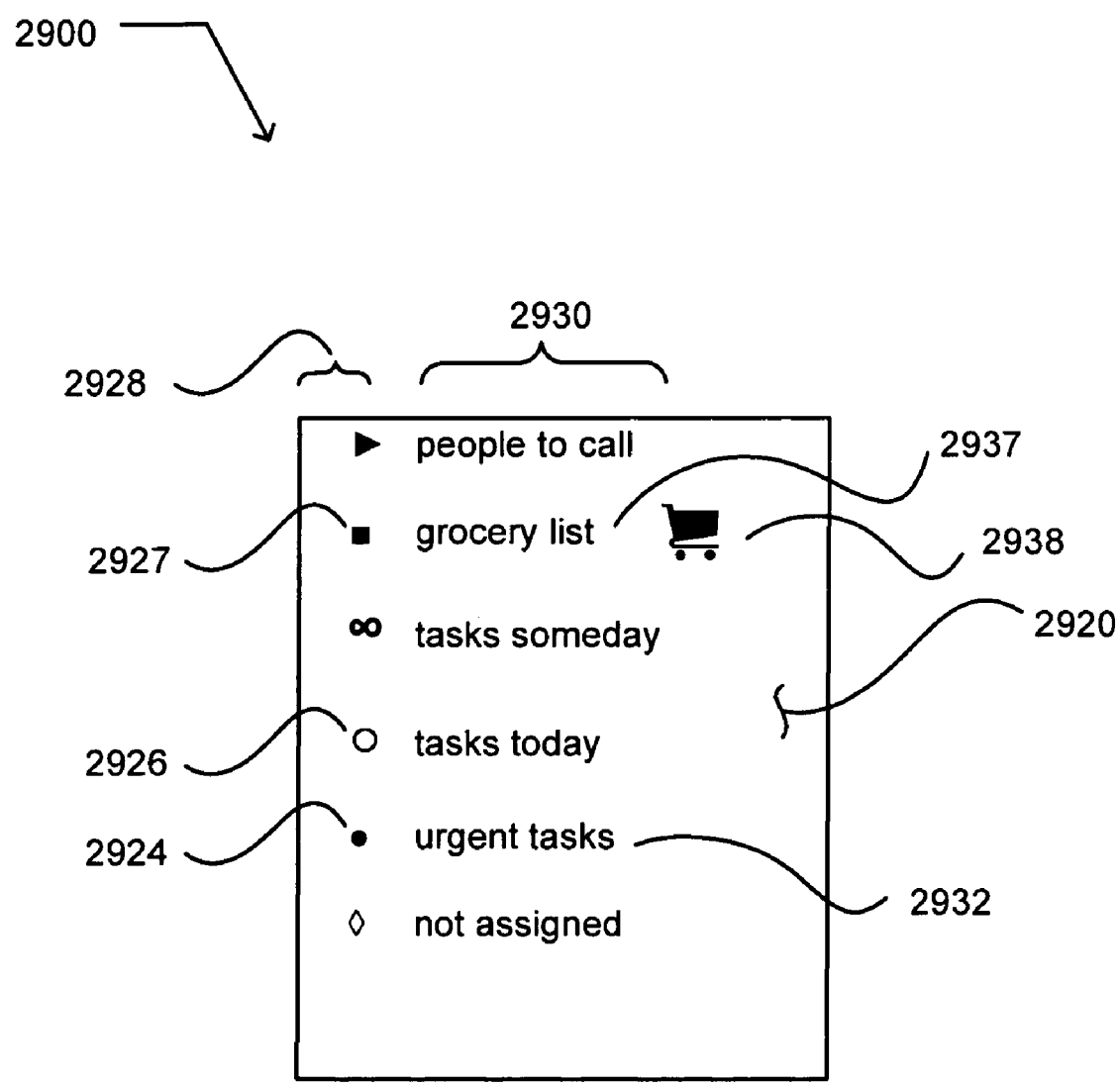
FIG. 32 illustrates an exemplary system in which embodiments may be implemented.

FIG. 32 illustrates an exemplary system 2900 in which embodiments may be implemented. The system includes at least two machine-differentiatable identifiers. Each identifier of the at least two machine-differentiatable identifiers being respectively keyed to a data recipient, such as the data recipient 2212 of FIG. 31, and associatable with a hand-formed mark on a surface. In an embodiment and as illustrated in FIG. 32, the at least two machine-differentiatable identifiers may include the at least two machine-differentiatable identifiers 2928 displayed in a column. The at least two machine-differentiatable identifiers are illustrated in part as a machine-differentiatable identifier "●" 2924, a machine-differentiatable identifier "○" 2926, and a machine-differentiatable identifier "■" 2927. The system further includes a commonly accepted meaning respectively associated by a group of users with each machine-differentiatable identifier of the at least two machine-differentiatable identifiers. FIG. 32 illustrates the commonly accepted meaning respectively associated by a group of users displayed with each machine-differentiatable identifier, illustrated as the column of commonly accepted meanings 2930. The column of commonly accepted meanings may be similar to the column of unique descriptors 1930 described in conjunction with FIGS. 29 and 30. However, in an embodiment, the commonly accepted meaning may not be displayed.

In an embodiment, each machine-differentiatable identifier of the at least two machine-differentiatable identifiers 2930 may further include a user-understandable identifier corresponding to the commonly accepted meaning respectively associated by a group of users with each machine-differentiatable identifier of the at least two machine-differentiatable identifiers. For example, the user-understandable identifier corresponding to the commonly accepted meaning respectively associated by a group of users with each machine-differentiatable identifier of the at least two machine-differentiatable identifiers may include a user visually-recognizable and understandable identifier corresponding to the commonly accepted meaning respectively associated by a group of users with each machine-differentiatable identifier of the at least two machine-differentiatable identifiers. An alternative embodiment may include a graphic or pictograph, such as a shopping cart icon 2938, corresponding to the machine-differentiatable identifier "■" 2927 instead of a word descriptor "grocery list" 2937. In a further embodiment, the user-understandable identifier corresponding to the commonly accepted meaning respectively associated by a group of users with each machine-differentiatable identifier of the at least two machine-differentiatable identifiers may include a user touch-recognizable and understandable identifier corresponding to the commonly accepted meaning respectively associated by a group of users with each machine-differentiatable identifier of the at least two machine-differentiatable identifiers. In an implementation, a user touch-recognizable and understandable identifier may include an identifier distinguishable by touch, such as Braille. In another embodiment, the user-understandable identifier may include at least one of a user understandable color, a pattern, a shade, a tone, a letter, a word, a phrase, a number, an alphanumeric, a character, an icon, a geometric shape, a figure, a graphic, a glyph, a repeated pattern, a random pattern, an image, a region, and/or a legend. In another embodiment, an instance of a machine-differentiatable identifier and a user-understandable identifier may be at least substantially similar. For example, a single instance of the shopping cart icon 2938 may serve as both the machine-differentiatable identifier 2927 and a user-understandable identifier 2937.

The machine-differentiatable identifier keyed to a data recipient may further include at least one of a color, a pattern, a shade, a tone, a letter, a word, a phrase, a number, an alphanumeric, a character, an icon, a geometric shape, a figure, a graphic, a glyph, a repeated pattern, a random pattern, an image, a region, and/or a legend keyed to a data recipient. The machine-differentiatable identifier keyed to a data recipient may include a machine-differentiatable identifier recognizable by a pattern recognition method and keyed to a data recipient. The machine-differentiatable identifiers keyed to a data recipient may include a machine-differentiatable identifier corresponding to a data recipient. The machine-differentiatable identifier keyed to a data recipient may include a machine-differentiatable identifier uniquely identifying a data recipient. The machine-differentiatable identifier keyed to a data recipient may include a machine-differentiatable identifier keyed to at least one of a file, a record, a database, and/or a storage medium.

In an embodiment, the each identifier of the at least two machine-differentiatable identifiers being respectively keyed to a data recipient and associatable with a hand-formed mark on a surface may include each identifier of the at least two machine-differentiatable identifiers being respectively keyed to a data recipient, formable on a surface by a handheld writing implement, and associatable with a hand-formed mark on a surface. In a further embodiment, the each identifier of the at least two machine-differentiatable identifiers being respectively keyed to a data recipient and associatable with a hand-formed mark on a surface may include each identifier of the at least two machine-differentiatable identifiers being respectively keyed to a data recipient and spatially associatable with a hand-formed mark on a surface. The each identifier of the at least two machine-differentiatable identifiers being respectively keyed to a data recipient and associatable with a hand-formed mark on a surface may include each identifier of the at least two machine-differentiatable identifiers being respectively keyed to a data recipient and temporally associatable with a hand-formed mark on a surface. The each identifier of the at least two machine-differentiatable identifiers being respectively keyed to a data recipient and associatable with a hand-formed mark on a surface may include each identifier of the at least two machine-differentiatable identifiers being respectively keyed to a data recipient, user scannable, and user associatable with a hand-formed mark on a surface. For example, each machine-differentiatable identifier may be scannable using an optical character recognition device, a bar code reader, and/or a radio frequency identification device.

In an embodiment, the each identifier of the at least two machine-differentiatable identifiers 2928 being respectively keyed to a data recipient and associatable with a hand-formed mark on a surface may include each identifier of the at least two machine-differentiatable identifiers being respectively keyed to a data recipient and a user drag and drop associatable with a hand-formed mark on a surface. In another embodiment, the each identifier of the at least two machine-differentiatable identifiers being respectively keyed to a data recipient and associatable with a hand-formed mark on a surface may include each identifier of the at least two machine-differentiatable identifiers being respectively keyed to a data recipient and gesturally associatable with a hand-formed mark on a surface.

In an embodiment, the commonly accepted meaning respectively associated by a group of users with each machine-differentiatable identifier of the at least two machine-differentiatable identifiers 2928 may include a commonly accepted meaning respectively associated with each machine-differentiatable identifier of the at least two machine-differentiatable identifiers by a prospective group of users. For example, a prospective group of users may include people expected to use a program released by a software manufacturer. A prospective group may include people targeted for advertising by a manufacturer of a software program. In another embodiment, the commonly accepted meaning respectively associated by a group of users with each machine-differentiatable identifier of the at least two machine-differentiatable identifiers may include a commonly accepted meaning respectively associated with each machine-differentiatable identifier of the at least two machine-differentiatable identifiers by a current group of users. For example, a current group of users may include current users of a software program, a user group, an ad hoc group, and/or an affiliated group, such as persons associated with an employer or governmental agency. In a further embodiment, the commonly accepted meaning respectively associated by a group of users with each machine-differentiatable identifier of the at least two machine-differentiatable identifiers includes commonly accepted meaning respectively associated with each machine-differentiatable identifier of the at least two machine-differentiatable identifiers by a de facto group of users. In an embodiment, the commonly accepted meaning respectively associated by a group of users with each machine-differentiatable identifier of the at least two machine-differentiatable identifiers includes commonly accepted meaning respectively associated with each machine-differentiatable identifier of the at least two machine-differentiatable identifiers by a de jure group of users.

In an embodiment, the system 2900 may include a surface 2920 displaying the at least two machine-differentiatable identifiers 2928. In another embodiment, the system may include a surface displaying the at least two machine-differentiatable identifiers and the commonly accepted meaning respectively associated by a group of users with each machine-differentiatable identifier of the at least two machine-differentiatable identifiers. The surface may include a paper surface. The surface may include an electronic display surface.

Figure 33:
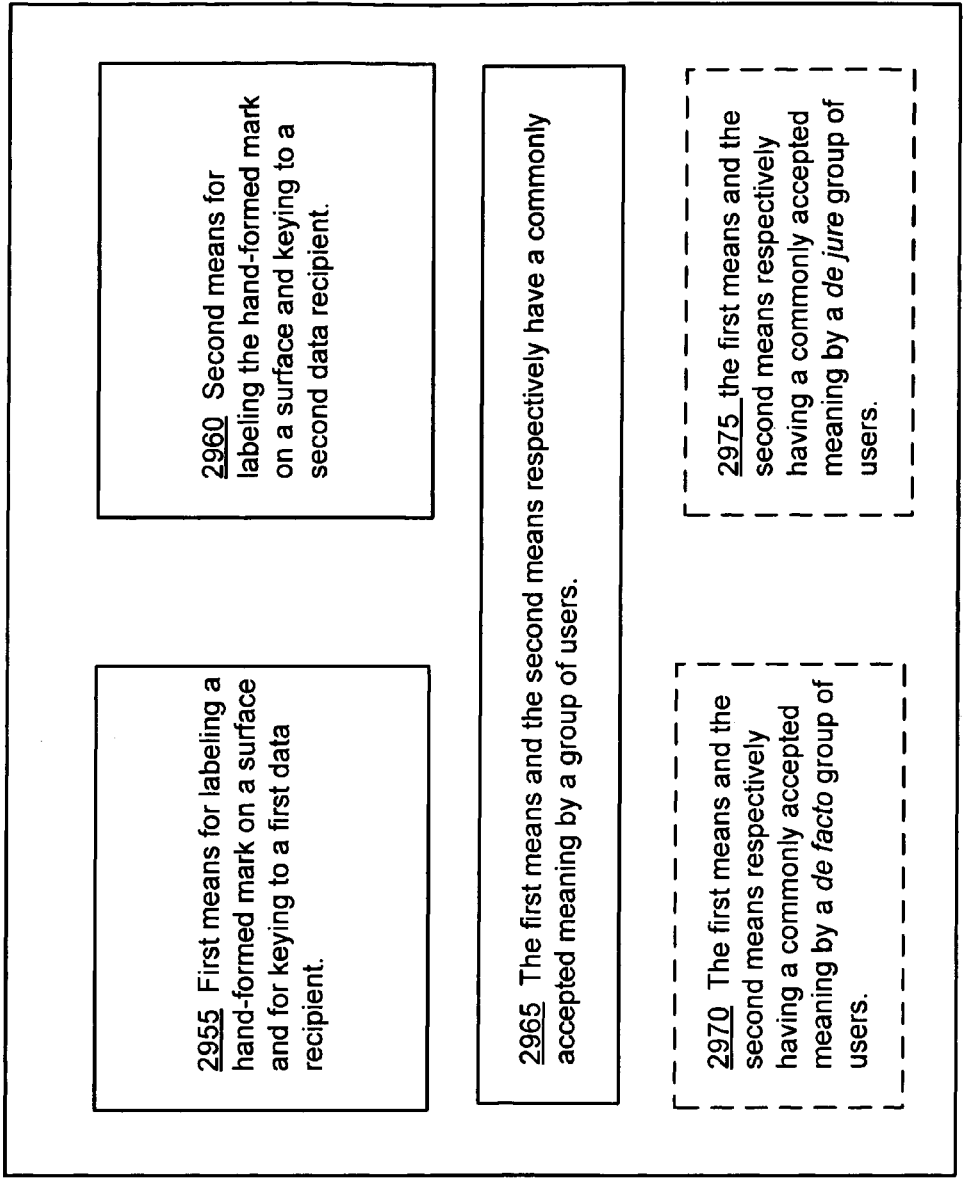
FIG. 33 illustrates a partial view of another system in which embodiments may be implemented.

FIG. 33 illustrates a partial view of a system 2950 in which embodiments may be implemented. The system includes a first means 2955 for labeling a hand-formed mark on a surface and for keying to a first data recipient. The system also includes a second means 2960 for labeling the hand-formed mark on a surface and keying to a second data recipient. The first means and the second means respectively have a commonly accepted meaning by a group of users 2965. The first means and the second means respectively having a commonly accepted meaning by a group of users may include the first means and the second means respectively having a commonly accepted meaning by a de facto group of users 2970. The first means and the second means respectively having a commonly accepted meaning by a group of users includes the first means and the second means respectively having a commonly accepted meaning by a de jure group of users 2975.

Figure 34:
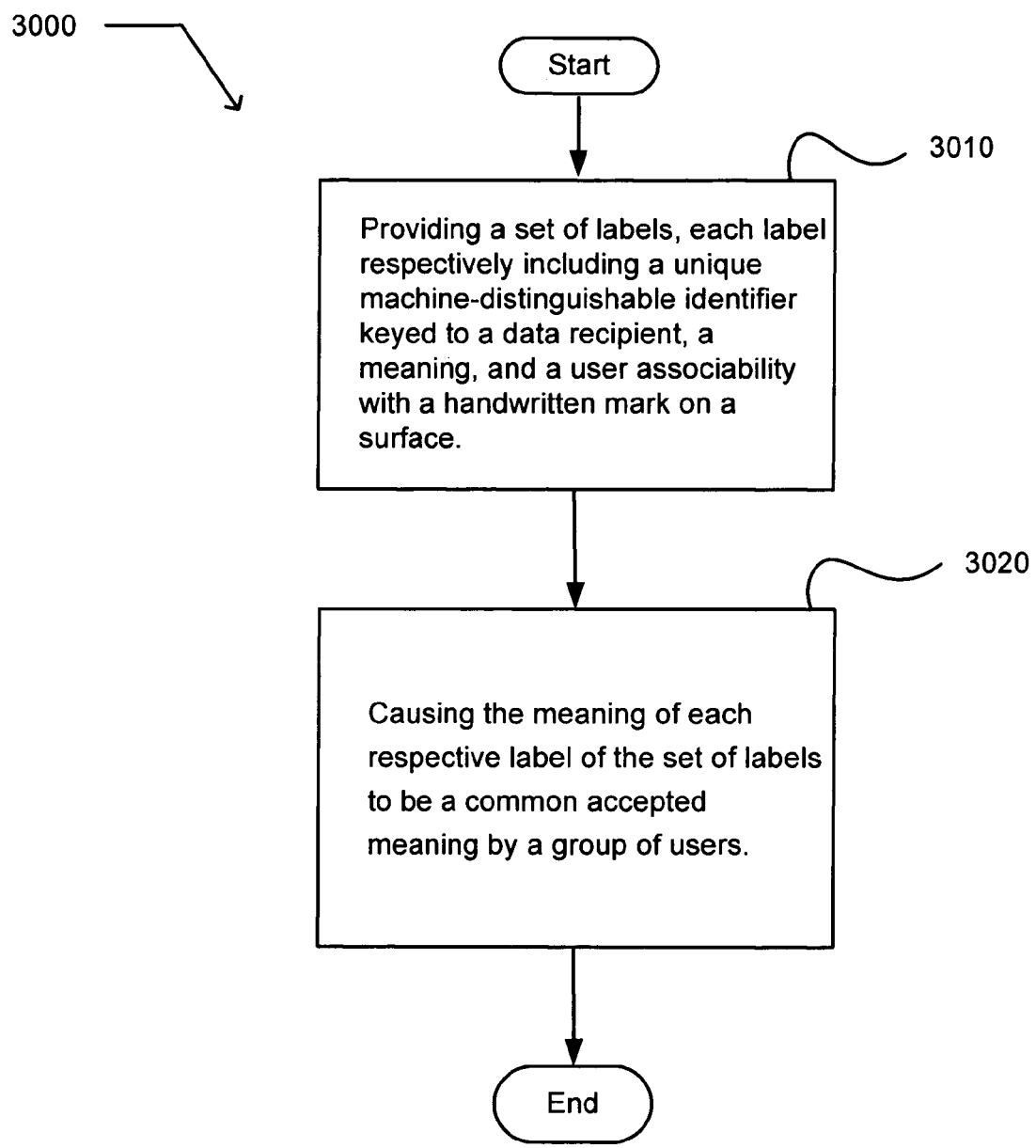
FIG. 34 illustrates an exemplary operational flow.

FIG. 34 illustrates an exemplary operational flow 3000. After a start operation, the flow moves a supplying operation 3010. The supplying operation provides a set of labels. Each label respectively includes a unique machine-distinguishable identifier keyed to a data recipient, a meaning, and a user associability with a handwritten mark on a surface. The user associability may include a machine-distinguishable identifier that a user may establish an association with the handwritten mark by hand forming the machine-distinguishable identifier proximate to the handwritten mark. The user associability may include a machine-distinguishable identifier with which a user may use to establish an association with the handwritten mark by scanning the machine-distinguishable identifier the handwritten mark. A promotion operation 3020 causes the meaning of each respective label of the set of labels to be a commonly accepted meaning by a group of users. In an embodiment, the promotion operation may include marketing, advertising, and/or publicity. The flow then moves to an end operation.

Figure 35:
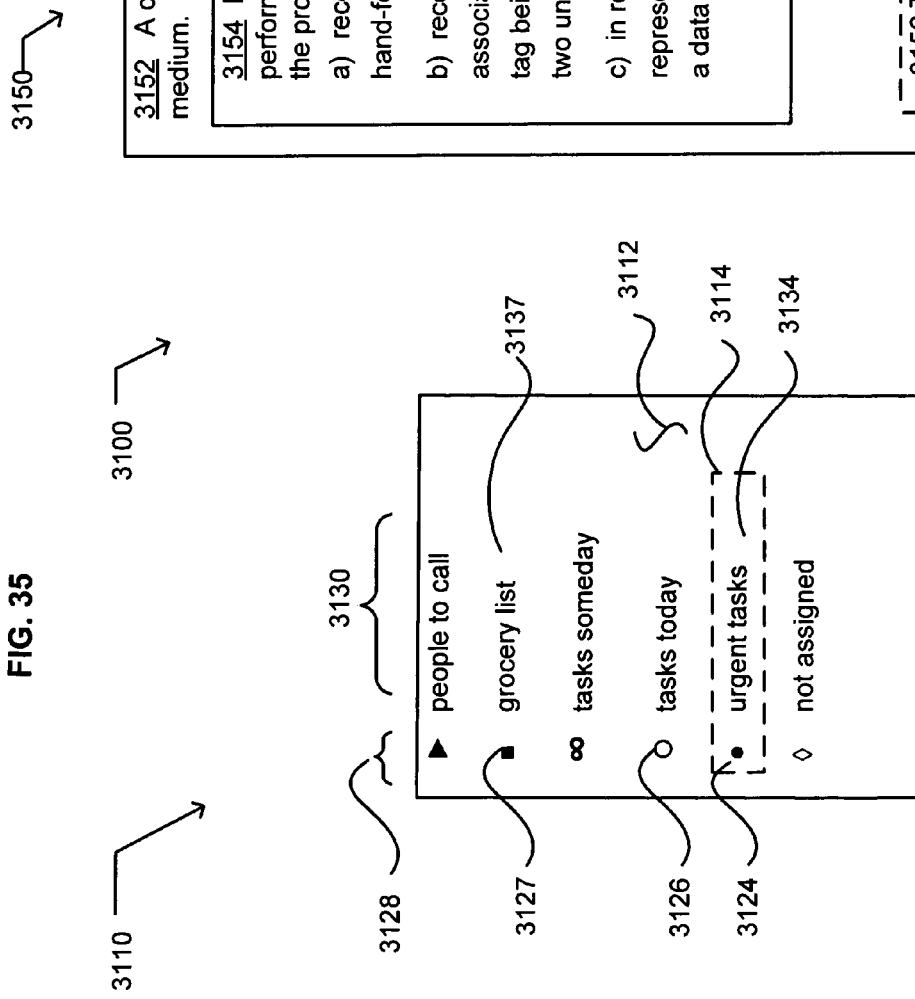
FIG. 35 illustrates a partial view of an exemplary system in which embodiments may be implemented.

FIG. 35 illustrates a partial view of an exemplary system 3100 in which embodiments may be implemented. The system includes an article 3110 and a computer program product 3150. The article includes at least two unique tags, which are illustrated as six unique tags 3128 displayed for convenience with one tag displayed on each line of a display surface 3112. Each tag of the at least two tags respectively includes a commonly accepted meaning, a machine-distinguishable identifier keyed to a data recipient, and a user associability with a hand-formed mark on a surface. The commonly accepted meaning of each respective tag of the at least two unique tags includes a commonly accepted meaning in a group of users. The commonly accepted meaning of each tag is illustrated as a column 3130 of commonly accepted meanings. The machine-distinguishable identifier of each tag is respectively illustrated as a column 3128 of six unique machine-distinguishable identifiers. In an embodiment, the user associability is provided by the machine-distinguishable identifiers being hand formable. In another embodiment, the user associability is provided by the machine-distinguishable identifiers being user scannable. A tag of the article 3110 is illustrated as a tag 3114. The tag 3114 includes a machine-distinguishable identifier 3124, illustrated as a "●," and a commonly accepted meaning, illustrated as an "urgent tasks" 3134.

The computer program product 3150 includes a computer-readable signal-bearing medium 3152 bearing program instructions 3154 operable to perform a process in a computer system. The process includes receiving a signal indicative of the hand-formed mark on a surface, and receiving a signal indicative of a tag associated with the hand-formed mark, the tag being a tag selected from the at least two unique tags. The process also includes distributing a representation of the hand-formed mark to a data recipient in response to the tag.

The computer-readable signal-bearing medium 3152 may include a computer storage medium 3156, which may be carried by a computer-readable carrier (not shown). The computer-readable medium may include a communications medium 3158. In an alternative embodiment, the computer-program product 3150 may be implemented in hardware, software, and/or firmware.

Figure 36:
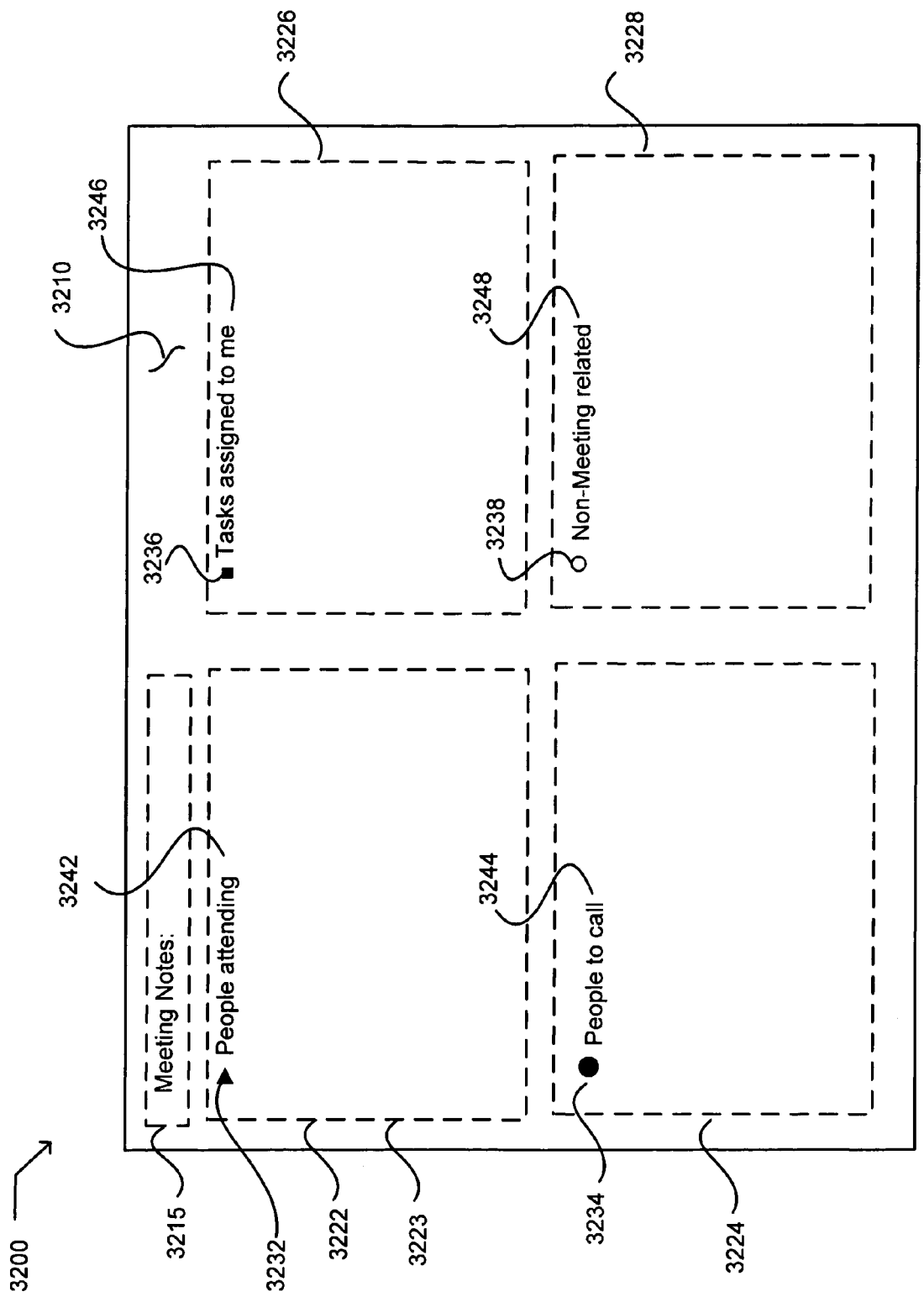
FIG. 36 illustrates a partial view of an embodiment of an article of manufacture.

FIG. 36 illustrates a partial view of an embodiment of an article of manufacture 3200. The article of manufacture includes a writing surface 3210 having at least two regions that accept handwriting. In an embodiment, the at least two regions that accept handwriting are illustrated as a first region 3222, a second region 3224, a third region 3226, and a fourth 3228. Each region of the at least two regions that accept handwriting respectively includes a unique user-understandable identifier and a unique machine-distinguishable identifier keyed to a data receptor. In the embodiment, the unique machine-distinguishable identifier is illustrated as a machine-distinguishable identifier "▶" 3232, a machine-distinguishable identifier "●" 3234, a machine-distinguishable identifier "■" 3236, and a machine-distinguishable identifier "○" 3238 respectively for regions 3222, 3224, 3226, and 3228. The machine-distinguishable identifiers are respectively keyed to a data receptor, for example, such as generally described in conjunction with FIG. 31. Also in the embodiment illustrated, the unique user-understandable identifier are illustrated as unique user-understandable word phrase identifiers "People attending" 3242, "People to call" 3244, "Tasks assigned to me" 3246, and "Non-Meeting related" 3248 respectively for regions the first region 3222, the second region 3224, the third region 3226, and the fourth 3228.

The writing surface 3210 having at least two regions that accept handwriting may include a writing surface having at least two delineated regions that accept handwriting. In an embodiment, the at least two delineated regions may include visually defined regions. A region may be visually delineated by a border around an outer periphery of the region, for example, such as a border 3223 around a periphery of the region 3222. The writing surface having at least two regions that accept handwriting may include a writing surface having at least two visually defined regions that accept handwriting. The at least two visually defined regions may be defined in any manner. For example, regions may be visually defined by unique colors, textures, and/or patterns. In another embodiment, the writing surface having at least two regions that accept handwriting may include a writing surface having at least two coordinately defined handwriting regions of an electronic display surface that accept handwriting. For example, a lower left corner of the region 3222 may be defined by coordinates x,y (not shown) and the upper right corner may be defined by coordinates x',y' (not shown). The writing surface may include a paper writing surface. The writing surface having at least two regions that accept handwriting may include a paper writing surface having at least two regions that accept handwriting. The writing surface having at least two regions that accept handwriting may include an electronically driven writing surface having at least two regions that accept handwriting. The writing surface 3210 having at least two regions that accept handwriting may include a writing surface having two regions that accept a hand-formed color, pattern, shade, letter, word, phrase, number, alphanumeric, character, icon, geometric shape, figure, graphic, glyph, repeated pattern, random pattern, image, region, and/or legend.

The unique machine-distinguishable identifier, such as the machine distinguishable identifier 3232, may include a unique identifier recognizable by a pattern recognition method. The unique machine-distinguishable identifier keyed to a data receptor may include a unique machine-distinguishable identifier corresponding to a data recipient. The unique machine-distinguishable identifier keyed to a data receptor may include a unique machine-distinguishable identifier keyed to at least one of a file, a record, a database, and/or a storage medium. The unique machine-distinguishable identifier may include at least one of a machine-distinguishable color, a pattern, a shade, a tone, a letter, a word, a phrase, a number, an alphanumeric, a character, an icon, a tag, a geometric shape, a figure, a graphic, a glyph, a repeated pattern, a random pattern, an image, a region, and/or a legend.

In another embodiment, the article of manufacture 3200 may include a document title 3215. In an embodiment, the document title may include any descriptive, suggestive, and/or distinctive name. The document title may include at least one of a machine-distinguishable color, a pattern, a shade, a tone, a letter, a word, a phrase, a number, an alphanumeric, a character, an icon, a tag, a geometric shape, a figure, a graphic, a glyph, a repeated pattern, a random pattern, an image, a region, and/or a legend.

In an alternative embodiment, the article of manufacture 3200 includes a writing surface 3210 having at least one preformed region, illustrated as the region 3222. The at least one preformed region is configured to accept a handwritten information, and includes a unique user-understandable identifier, illustrated as the user-understandable word phrase identifiers "People attending" 3242, and a unique machine-distinguishable identifier keyed to a data receptor, illustrated as the machine-distinguishable identifier "▶" 3232.

Figure 37:
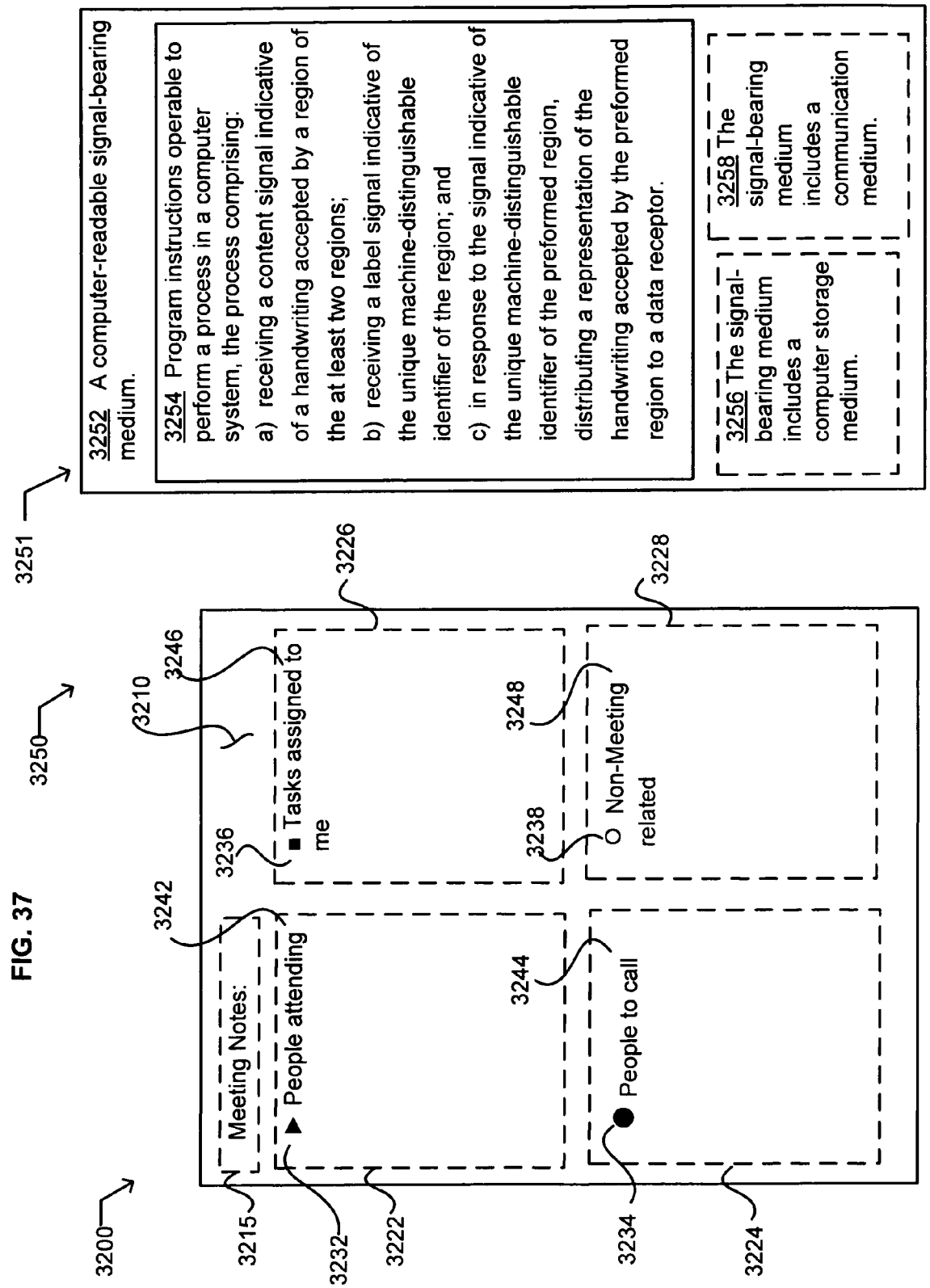
FIG. 37 illustrates a partial view of a system.

FIG. 37 illustrates a partial view of a system 3250. The system includes the article of manufacture, illustrated as in the article of manufacture 3200 described in conjunction with FIG. 36. The system 3250 also includes a computer program product 3251. The computer program product includes program instructions 3254 operable to perform a process in a computer system and a computer-readable signal-bearing medium 3252 bearing the program instructions. The process includes receiving a content signal indicative of a handwriting accepted by a region of the at least two regions, and receiving a label signal indicative of the unique machine-distinguishable identifier of the region. The process also includes distributing a representation of the handwriting accepted by the preformed region to a data receptor in response to the signal indicative of the unique machine-distinguishable identifier of the preformed region. The computer-readable medium 3252 may include a computer storage medium 3256, which may be carried by a computer-readable carrier (not shown). The computer-readable medium may include a communication medium 3258. In an alternative embodiment, the computer-program product may be implemented in hardware, software, and/or firmware.

FIG. 38 illustrates a partial view of an exemplary computer program product 3270. The computer program product includes program instructions 3274 operable to perform a process in a computer system and a computer-readable signal-bearing medium 3272 bearing the program instructions. The process includes receiving a content signal indicative of information handwritten to a preformed region of a surface having at least two preformed regions, and receiving a label signal indicative of a unique machine-distinguishable identifier associated with the preformed region of a surface having at least two preformed regions. The process also includes distributing to a data recipient a representation of the information handwritten to the preformed region in response to the label signal. The computer-readable signal-bearing medium 3272 may include a computer storage medium 3276, which may be carried by a computer-readable carrier (not shown). The computer-readable signal-bearing medium may include a communications medium 3278. In an alternative embodiment, the computer-program product may be implemented in hardware, software, and/or firmware.

Figure 39:
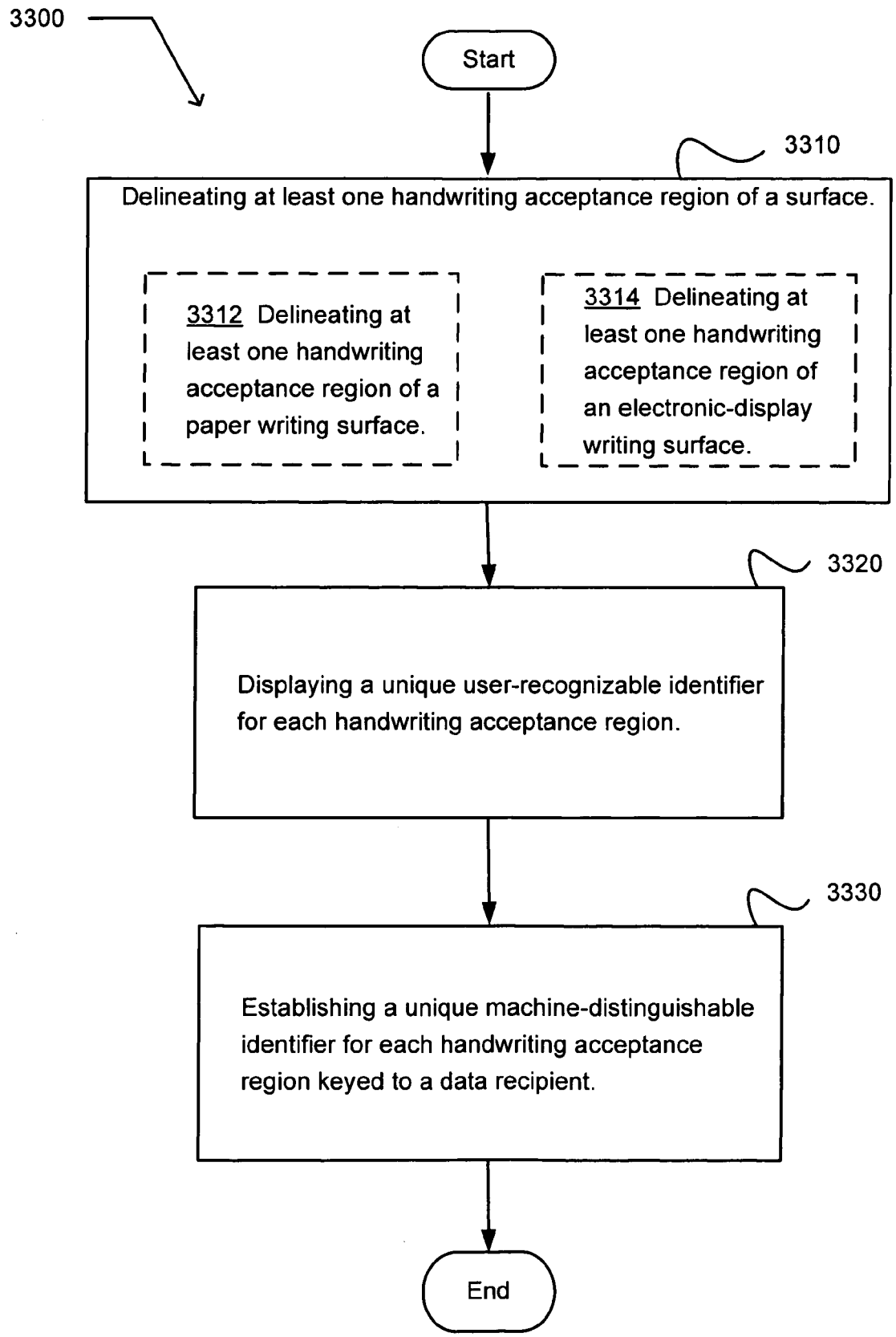
FIG. 39 illustrates an exemplary operational flow.

FIG. 39 illustrates an exemplary operational flow 3300. After a start operation, the operational flow moves to a demarcation operation 3310. The demarcation operation delineates at least one handwriting acceptance region of a surface. A first presentation operation 3320 displays a unique user-recognizable identifier for each handwriting acceptance region. A second presentation operation 3330 establishes a unique machine-distinguishable identifier for each handwriting acceptance region keyed to a data recipient. The unique machine-distinguishable identifier for each handwriting acceptance region may be established by forming a logical association between the unique machine-distinguishable identifier and each handwriting acceptance region. Alternatively, the unique machine-distinguishable identifier for each handwriting acceptance region may be established by displaying a unique machine-distinguishable identifier for each handwriting acceptance region. The operational flow then moves to an end operation.

In an alternative embodiment, the demarcation operation 3310 may include at least one additional operations. An additional operation may include an operation 3312 and an operation 3314. The operation 3312 delineates at least one handwriting acceptance region of a paper writing surface. The operation 3314 delineates at least one handwriting acceptance region of an electronic-display writing surface.

Figure 40:
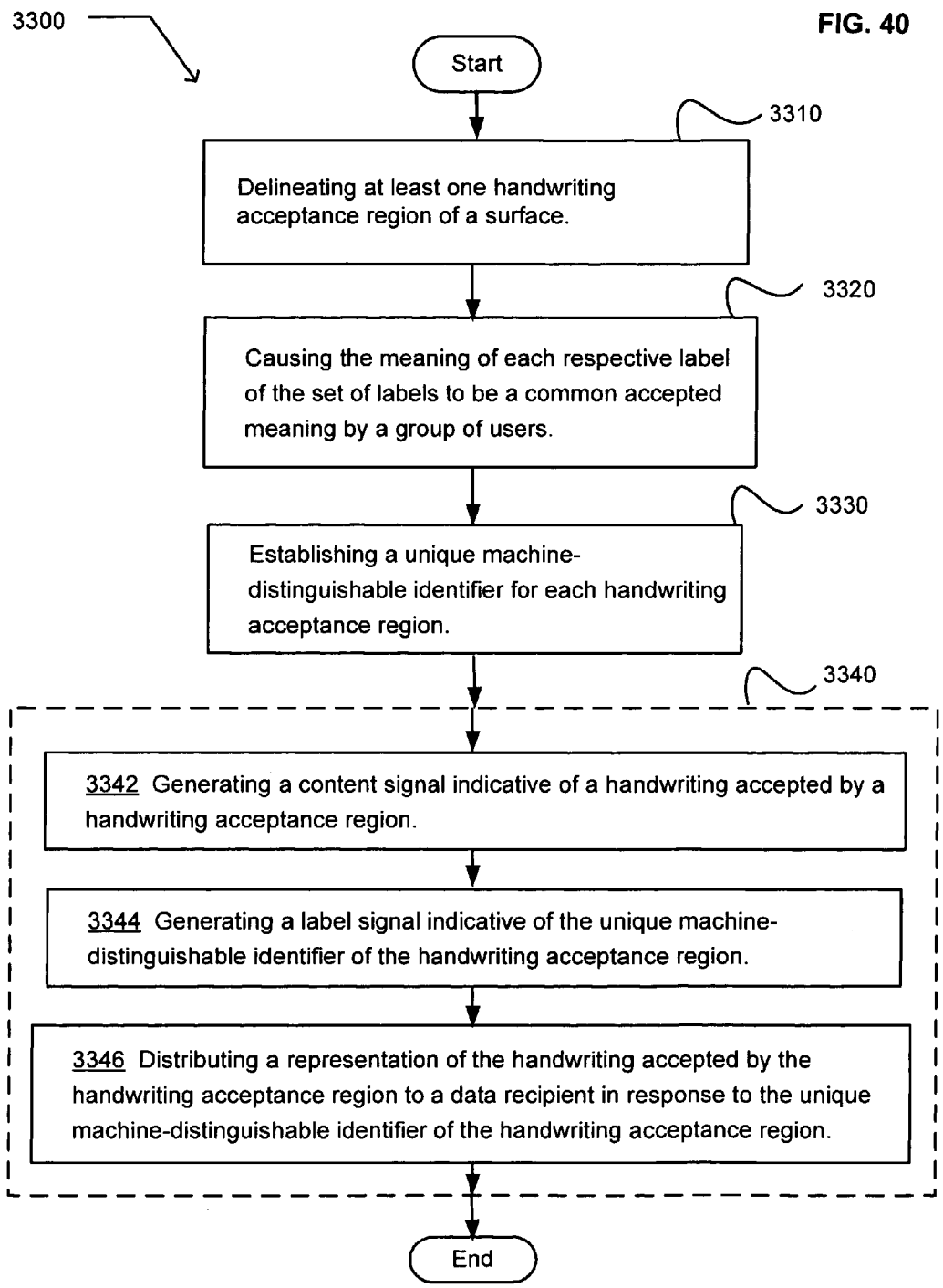
FIG. 40 illustrates an alternative embodiment of the exemplary operational flow of FIG. 39.

FIG. 40 illustrates an alternative embodiment of the exemplary operational flow 3300 of FIG. 39. The operation flow 3300 may include at least one additional operation, such as a dispensing operational flow 3340. The dispensing operational flow includes an operation 3342, an operation 3344, and an operation 3346. The operation 3342 generates a content signal indicative of a handwriting accepted by a handwriting acceptance region. The operation 3344 generates a label signal indicative of the unique machine-distinguishable identifier of the handwriting acceptance region. The operation 3346 distributes a representation of the handwriting accepted by the handwriting acceptance region to a data recipient in response to the unique machine-distinguishable identifier of the handwriting acceptance region.

Figure 41:
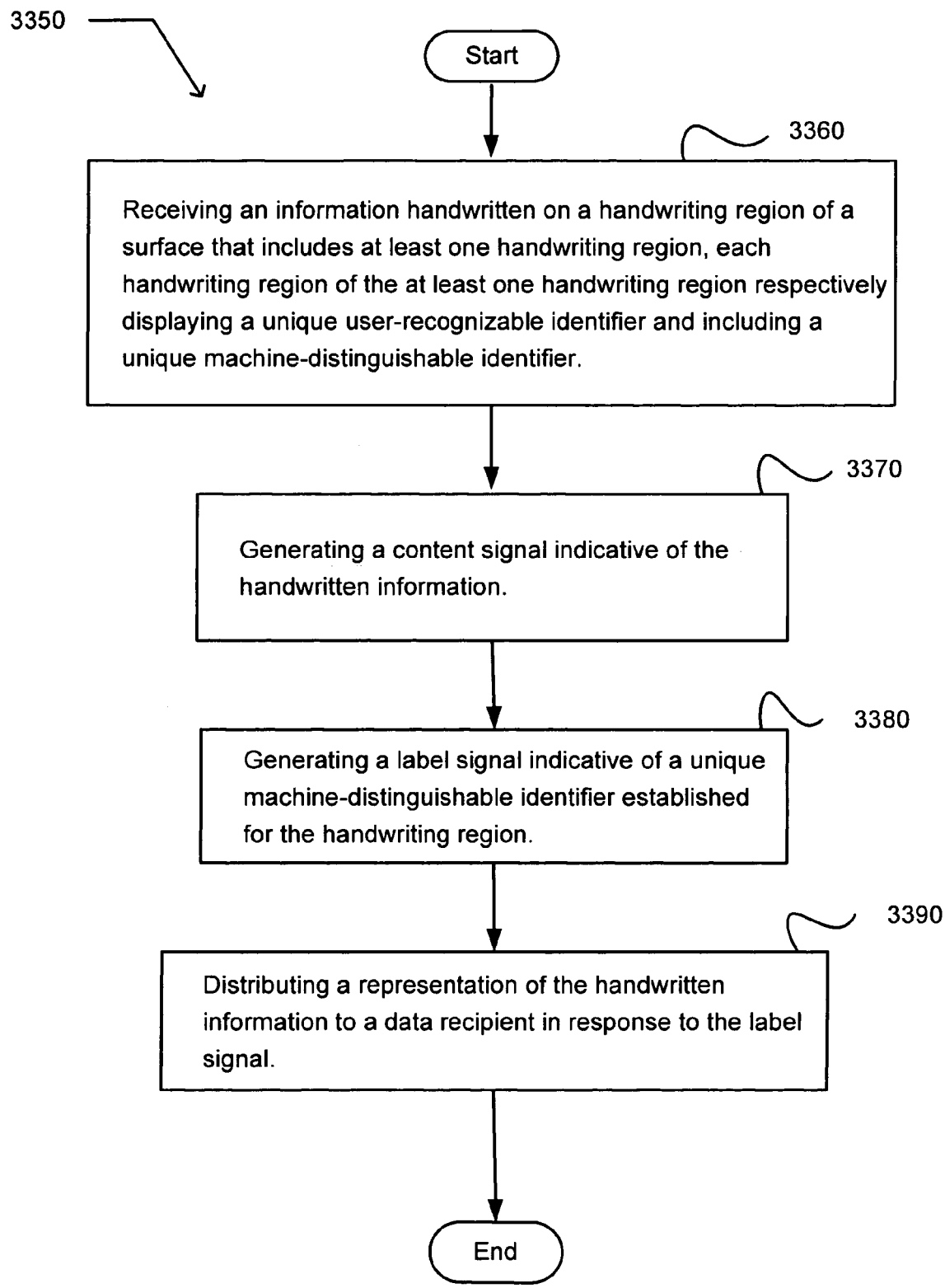
FIG. 41 illustrates an exemplary operational flow.

FIG. 41 illustrates an exemplary operational flow 3350. After a start operation, the operational flow moves to a reception operation 3360. The reception operation 3360 receives an information handwritten on a handwriting region of a surface that includes at least one handwriting region. Each handwriting region of the at least one handwriting region respectively displays a unique user-recognizable identifier and includes a unique machine-distinguishable identifier. In an embodiment, the machine-distinguishable identifier may be included by displaying the machine-distinguishable identifier. In another embodiment, the machine-distinguishable may be included by associating the machine-distinguishable identifier with the handwriting region, such as by a logical association in a computing device. A first signal producing operation 3370 generates a content signal indicative of the handwritten information. A second signal producing operation 3380 generates a label signal indicative of a unique machine-distinguishable identifier established for the handwriting region. A dispensing operation 3390 distributes a representation of the handwritten information to a data recipient in response to the label signal. The operational flow then proceeds to an end operation.

Figure 42:
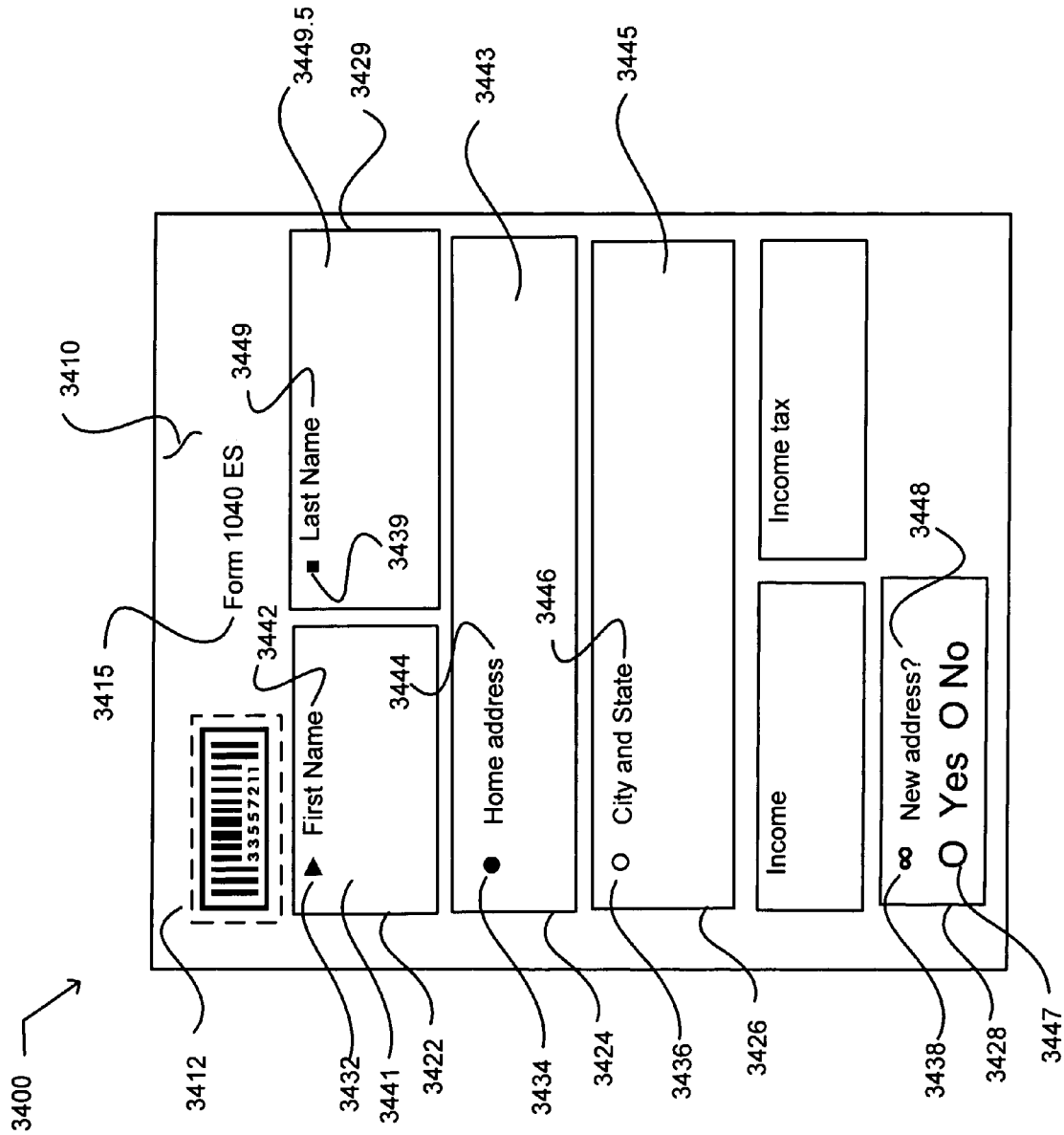
FIG. 42 illustrates a partial view of an article of manufacture in which embodiments may be implemented.

FIG. 42 illustrates a partial view of an article of manufacture 3400 in which embodiments may be implemented. The article of manufacture includes a display surface 3410 that includes a machine-distinguishable form identifier 3412 keyed and/or keyable to an electronic version of a form (not shown) and at least two fields. The at least two fields are illustrated as a first field 3422, a second field 3424, a third field 3426, a fourth field 3428, and a fifth field 3429. The electronic version of a form may be any data receptor or recipient, such as the data recipient 2212 described in conjunction with FIG. 31. Further, the electronic version of a form may include an instance of the form, for example, an instance of the form completed by an individual user. Each field of the at least two fields having a unique machine-distinguishable field identifier respectively keyed to a field of the electronic version of a form. The unique machine-distinguishable field identifier is illustrated as a machine-distinguishable field identifier "▶" 3432, a machine-distinguishable identifier "●" 3434, a machine-distinguishable identifier "○" 3436, a machine-distinguishable identifier "∞" 3438, and a machine-distinguishable identifier "■" 3439 respectively for the first field 3422, the second field 3424, the third field 3426, the fourth field 3428, and the fifth field 3429. The machine-distinguishable form identifier may include at least one of a machine-distinguishable color, a pattern, a shade, a tone, a letter, a word, a phrase, a number, an alphanumeric, a character, an icon, a tag, a geometric shape, a figure, a graphic, a glyph, a repeated pattern, a random pattern, an image, a region, and/or a legend. Each field of the at least two fields also includes a content area that accepts a hand-formed entry, and a unique user-understandable field identifier. The content area is illustrated as a content area 3441, a content area 3443, a content area 3445, a content area 3447, and a content area 3449.5 respectively for the first field 3422, the second field 3424, the third field 3426, the fourth field 3428, and the fifth field 3429.

The display surface 3410 that includes a machine-distinguishable form identifier keyed to an electronic version of a form and at least two fields may include a paper display surface that includes a machine-distinguishable form identifier keyed to an electronic version of a form and at least two fields. The display surface that includes a machine-distinguishable form identifier keyed to an electronic version of a form and at least two fields may include an electronically driven display surface that includes a machine-distinguishable form identifier keyed to an electronic version of a form and at least two fields. The unique user-understandable field identifier, such as the unique user-understandable field identifier 3432, may include a unique user-understandable field name descriptive of an anticipated user entry in the content area. The unique user-understandable field identifier may include at least one of a user understandable color, a pattern, a shade, a tone, a letter, a word, a phrase, a number, an alphanumeric, a character, an icon, a geometric shape, a figure, a graphic, a glyph, a repeated pattern, a random pattern, an image, a region, and/or a legend.

The content area, such as the content area 3441, may include a content area described by a coordinate system. In an embodiment, a coordinate system may include numbers that describe a position of the content area with reference to a set of axes. The content area may include a content area having a visible border. The content area may include a content area having a non-invisible border.

The display surface 3410 that includes a machine-distinguishable form identifier keyed to an electronic version of a form and at least two fields may include a display surface that includes a user-understandable form name, such as a user-understandable name "Form 1040 ES" 3415, a machine-distinguishable form identifier keyed to an electronic version of a form, and at least two fields. The user-understandable form name, such as may include at least one of a user understandable color, a pattern, a shade, a tone, a letter, a word, a phrase, a number, an alphanumeric, a character, an icon, a geometric shape, a figure, a graphic, a glyph, a repeated pattern, a random pattern, an image, a region, and/or a legend.

Figure 43:
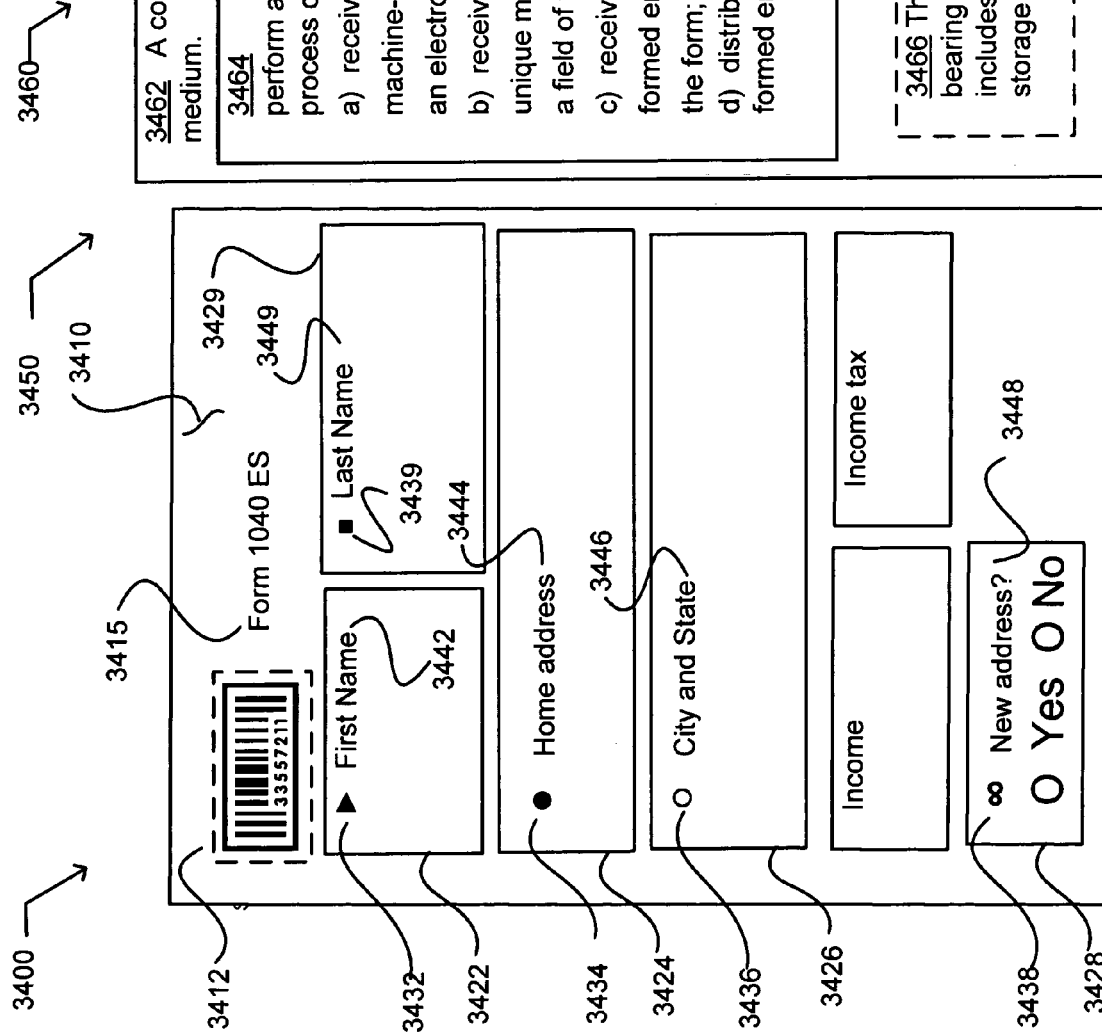
FIG. 43 illustrates a partial view of an exemplary system.

FIG. 43 illustrates a partial view of an exemplary system 3450. The system includes the article of manufacture 3400 described in conjunction with FIG. 42. The system also includes a computer program product 3460. The computer program product includes program instructions 3464 operable to perform a process in a computer system, and a computer-readable signal-bearing medium 3462 bearing the program instructions. The process includes receiving a document signal indicative of the machine-distinguishable form identifier keyed to an electronic version of a form, and receiving an element signal indicative of the unique machine-distinguishable field identifier of a field of the at least two fields. The process also includes receiving a mark signal indicative of a hand-formed entry in the content area of the field of the form. The process further includes distributing a representation of the hand-formed entry to the electronic version of a form.

The computer-readable signal-bearing medium 3462 may include a computer storage medium 3466, which may be carried by a computer-readable carrier (not shown). The computer-readable signal-bearing medium may include a communications medium 3468. In an alternative embodiment, the computer-program product 3460 may be implemented in hardware, software, and/or firmware.

Figure 44:
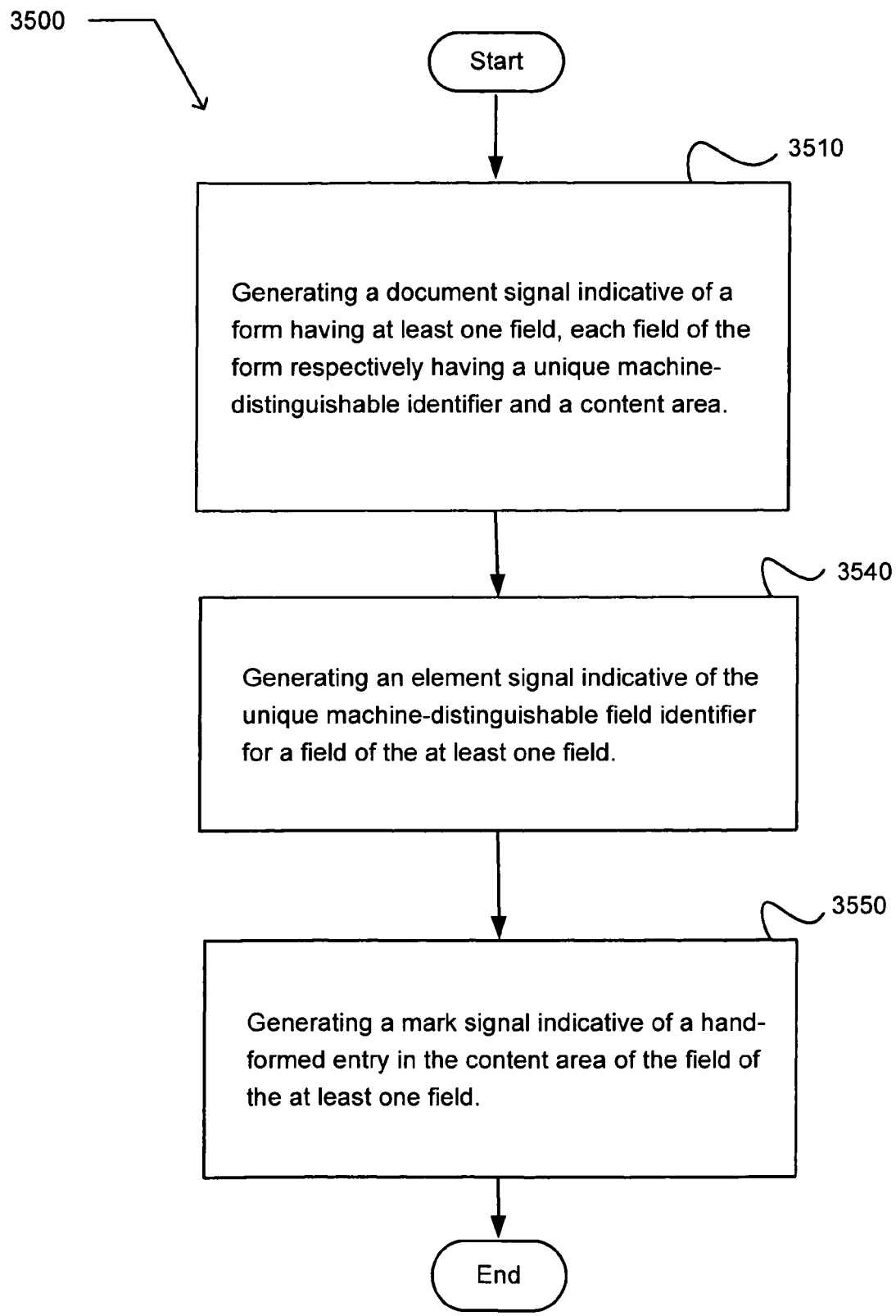
FIG. 44 illustrates an exemplary operational flow.

FIG. 44 illustrates an exemplary operational flow 3500. After a start operation, the operational flow moves to a form detection operation 3510. The form detection operation generates a document signal indicative of a form having at least one field. Each field of the form respectively has a unique machine-distinguishable identifier and a content area. A context operation 3540 generates an element signal indicative of the unique machine-distinguishable field identifier for a field of the at least one field. A content operation 3550 generates a mark signal indicative of a hand-formed entry in the content area of the field of the at least one field. The operational flow then moves to an end operation.

Figure 45:
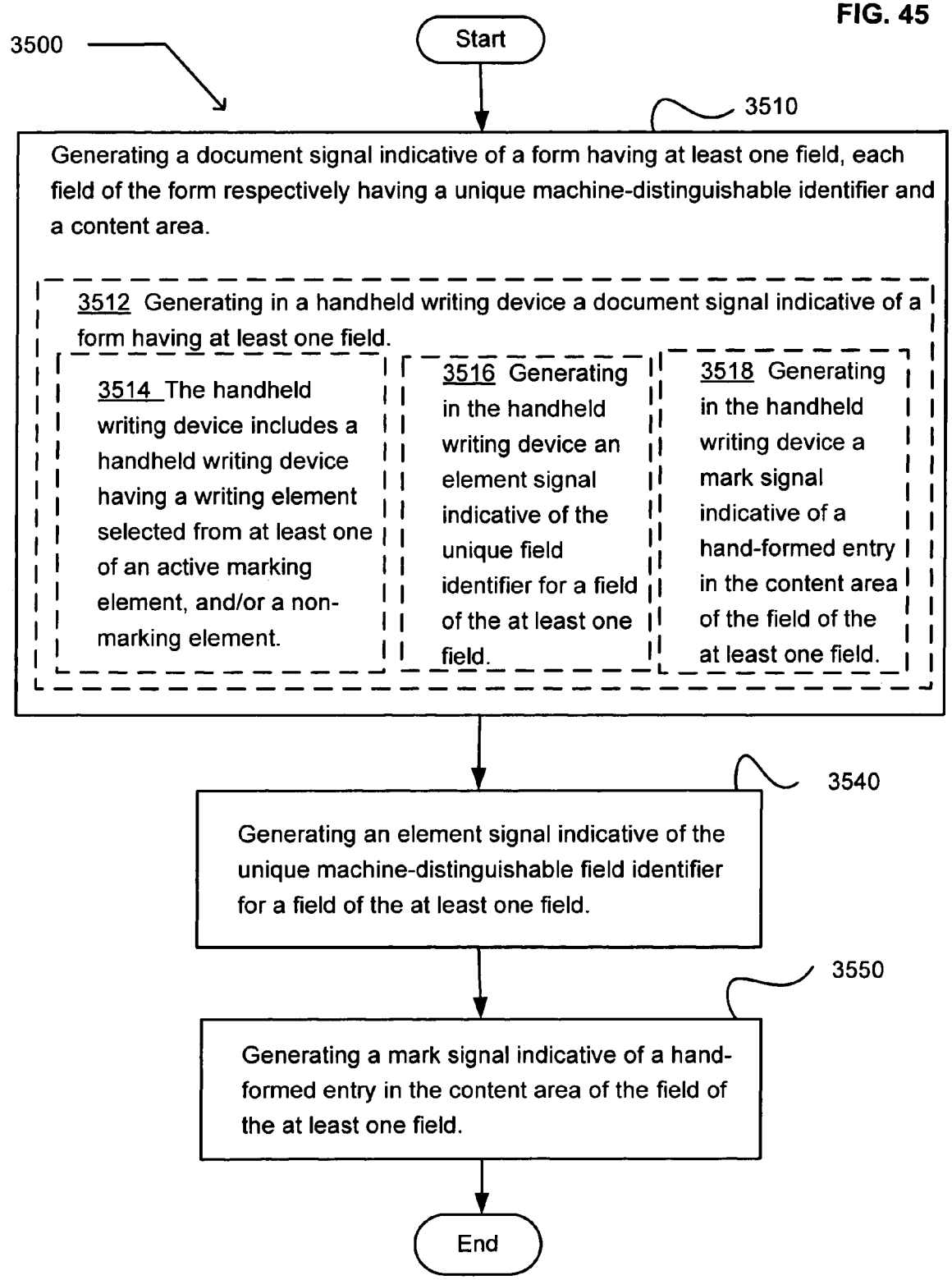
FIG. 45 illustrates an alternative embodiment of the exemplary operational flow of FIG. 44.

FIG. 45 illustrates an alternative embodiment of the exemplary operational flow 3500 of FIG. 44. The form detection operation 3510 may include at least one additional operation. An additional operation may include an operation 3512. The operation 3512 generates in a handheld writing device a document signal indicative of a form having at least one field. The operation 3512 may include at least one additional operation. An additional operation may include an operation 3514, an operation 3516, and/or an operation 3518. At the operation 3514, the handheld writing device includes a handheld writing device having a writing element selected from at least one of an active marking element, and/or a non-marking element. The operation 3516 generates in the handheld writing device an element signal indicative of the unique field identifier for a field of the at least one field. The operation 3518 generates in the handheld writing device a mark signal indicative of a hand-formed entry in the content area of the field of the at least one field.

Figure 46:
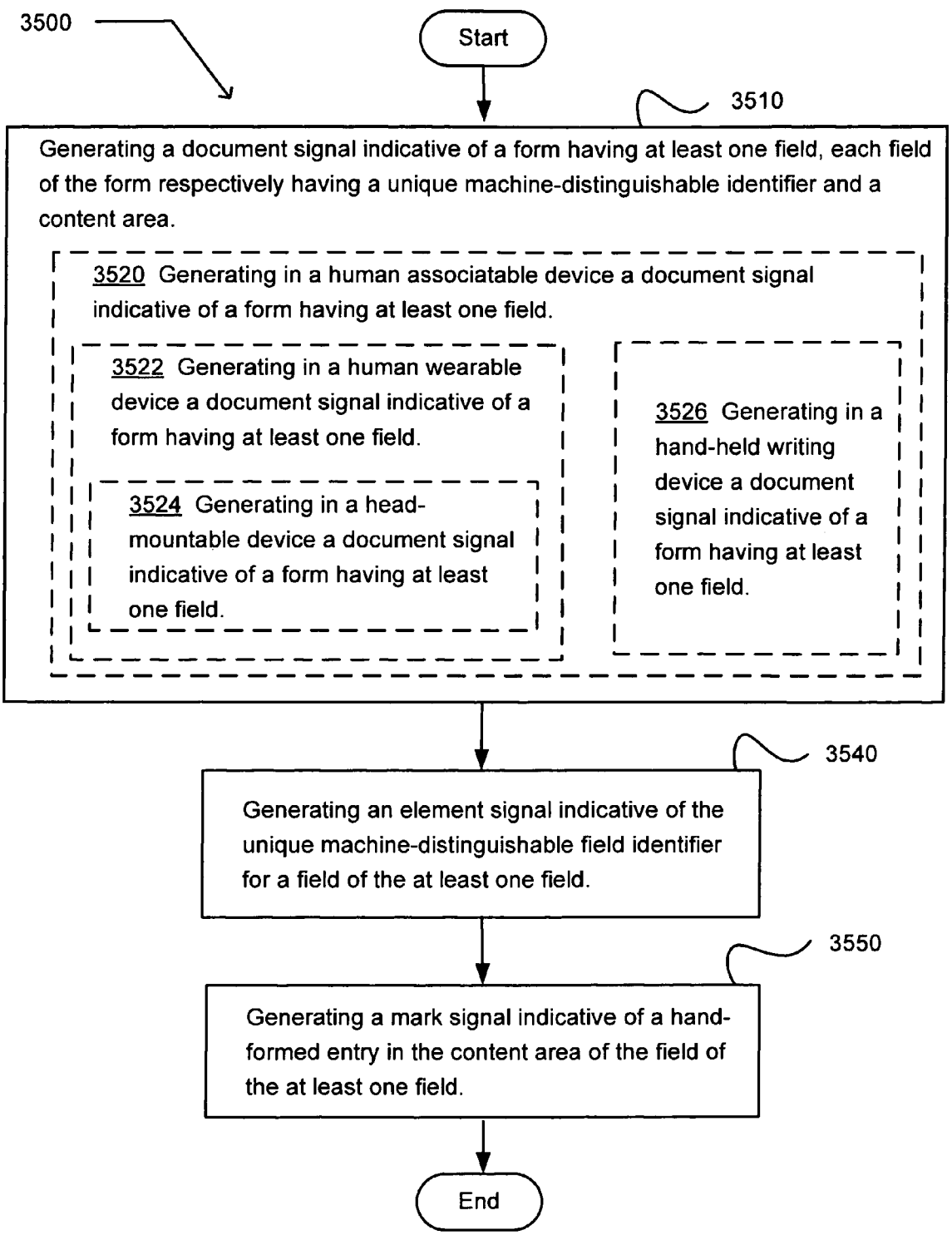
FIG. 46 illustrates another alternative embodiment of the exemplary operational flow of FIG. 44.

FIG. 46 illustrates another alternative embodiment of the exemplary operational flow 3500 of FIG. 44. The form detection operation 3510 may include at least one additional operation, such as an operation 3520. The operation 3520 generates in a human associatable device a document signal indicative of a form having at least one field. The operation 3520 may include at least one additional operation. An additional operation may include an operation 3522 and/or an operation 3526. The operation 3526 generates in a hand-held writing device a document signal indicative of a form having at least one field. The operation 3522 generates in a human wearable device a document signal indicative of a form having at least one field. The operation 3522 may include at least one additional operation, such as an operation 3524. The operation 3524 generates in a head-mountable device a document signal indicative of a form having at least one field.

Figure 47:
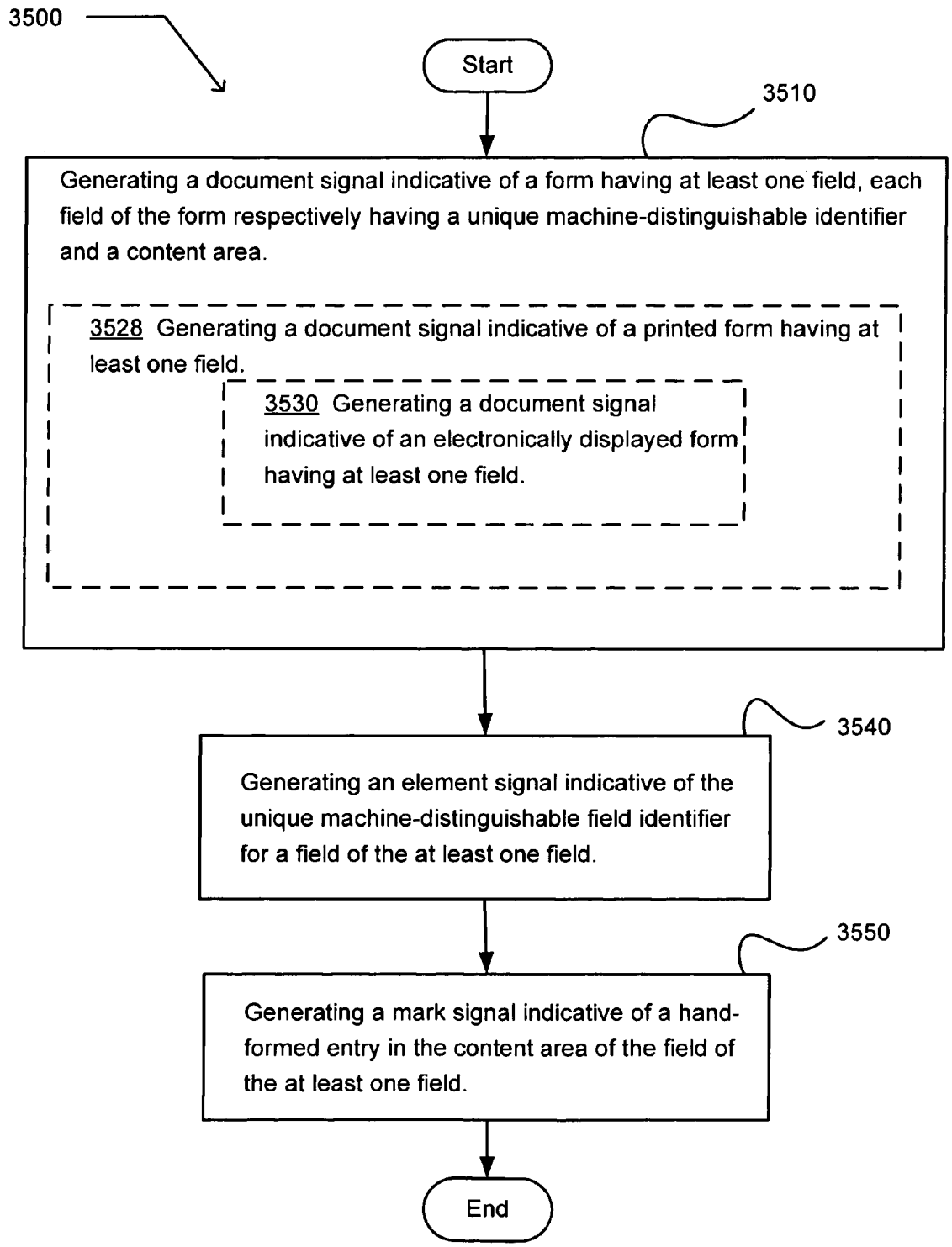
FIG. 47 illustrates a further alternative embodiment of the exemplary operational flow of FIG. 44

FIG. 47 illustrates a further alternative embodiment of the exemplary operational flow 3500 of FIG. 44. The form detection operation 3510 may include at least one additional operation, such as an operation 3528. The operation 3528 generates a document signal indicative of a printed form having at least one field. The operation 3528 may include at least one additional operation, such as an operation 3530. The operation 3530 generates a document signal indicative of an electronically displayed form having at least one field.

Figure 48:
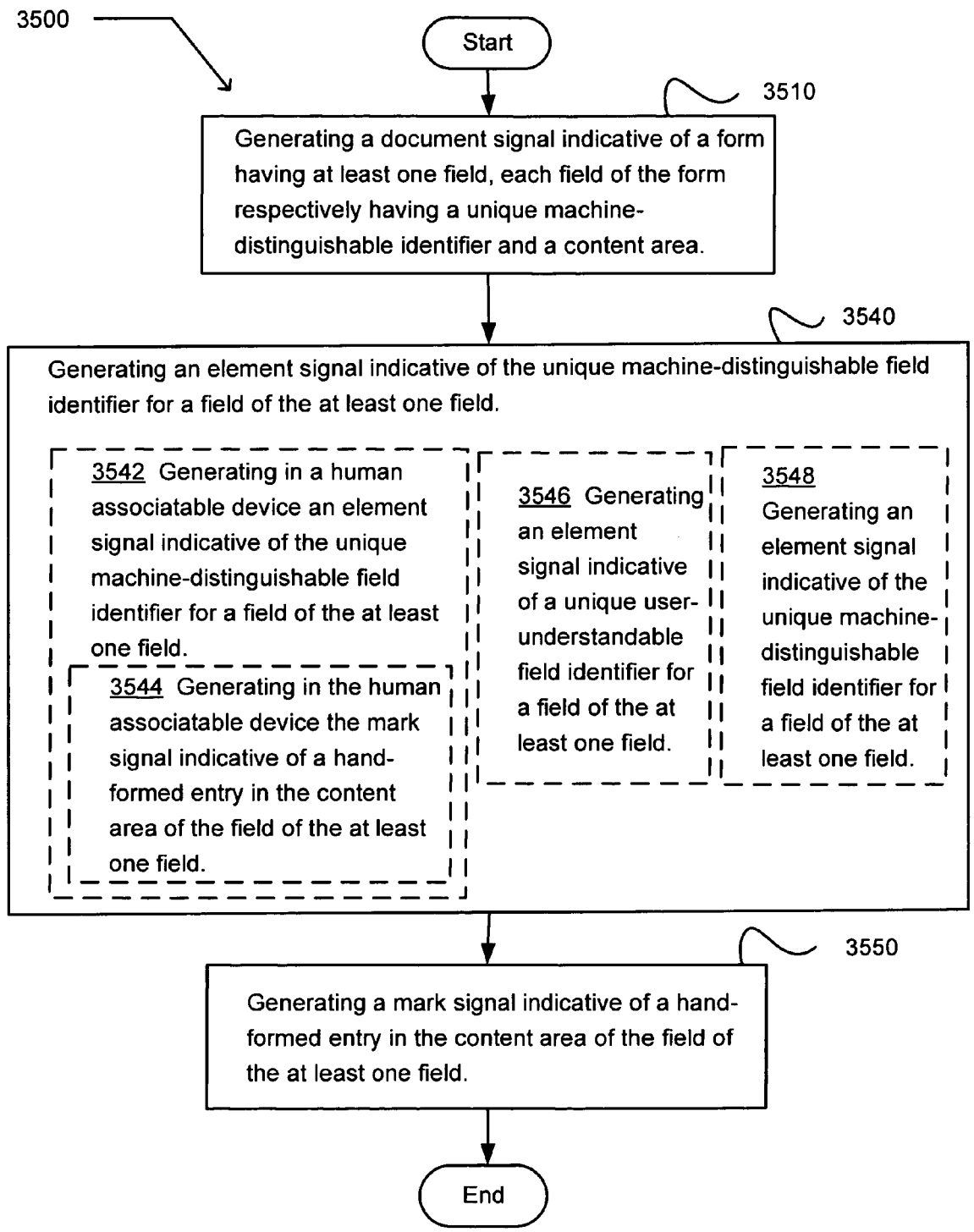
FIG. 48 illustrates an alternative embodiment of the exemplary operational flow of FIG. 44.

FIG. 48 illustrates an alternative embodiment of the exemplary operational flow 3500 of FIG. 44. The context operation 3540 may include at least one additional operation. An additional operation may include an operation 3542, an operation 3546, and/or an operation 3548. The operation 3542 generates in a human associatable device an element signal indicative of the unique machine-distinguishable field identifier for a field of the at least one field. The operation 3542 may include at least one additional operation, such as an operation 3544. The operation 3544 generates in the human associatable device the mark signal indicative of a hand-formed entry in the content area of the field of the at least one field. The operation 3546 generates an element signal indicative of a unique user-understandable field identifier for a field of the at least one field. The operation 3548 generates an element signal indicative of the unique machine-distinguishable field identifier for a field of the at least one field.

Figure 49:
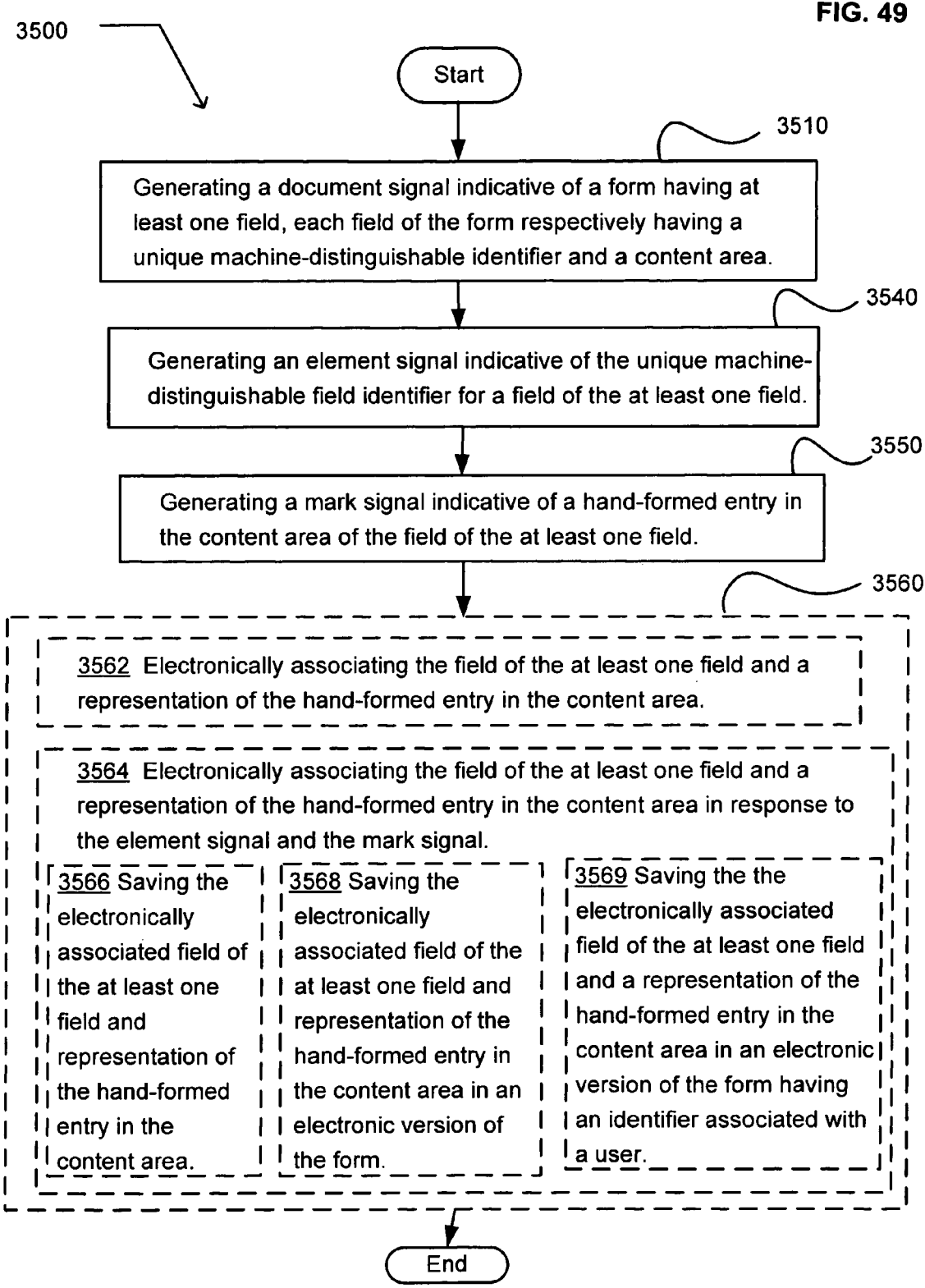
FIG. 49 illustrates an alternative embodiment of the exemplary operational flow of FIG. 44.

FIG. 49 illustrates an alternative embodiment of the exemplary operational flow 3500 of FIG. 44. The operational flow may include at least one additional operation 3560. The additional operation 3560 may include an operation 3562, and/or an operation 3564. The operation 3562 electronically associates the field of the at least one field and a representation of the hand-formed entry in the content area. The operation 3564 electronically associates the field of the at least one field and a representation of the hand-formed entry in the content area in response to the element signal and the mark signal. The operation 3564 may include at least one additional operation. An additional operation may include an operation 3566, an operation 3568, and/or an operation 3569. The operation 3566 saves the electronically associated field of the at least one field and representation of the hand-formed entry in the content area. The operation 3568 saves the electronically associated field of the at least one field and representation of the hand-formed entry in the content area in an electronic version of the form. The operation 3569 saves the electronically associated field of the at least one field and a representation of the hand-formed entry in the content area in an electronic version of the form having an identifier associated with a user.

Figure 50:
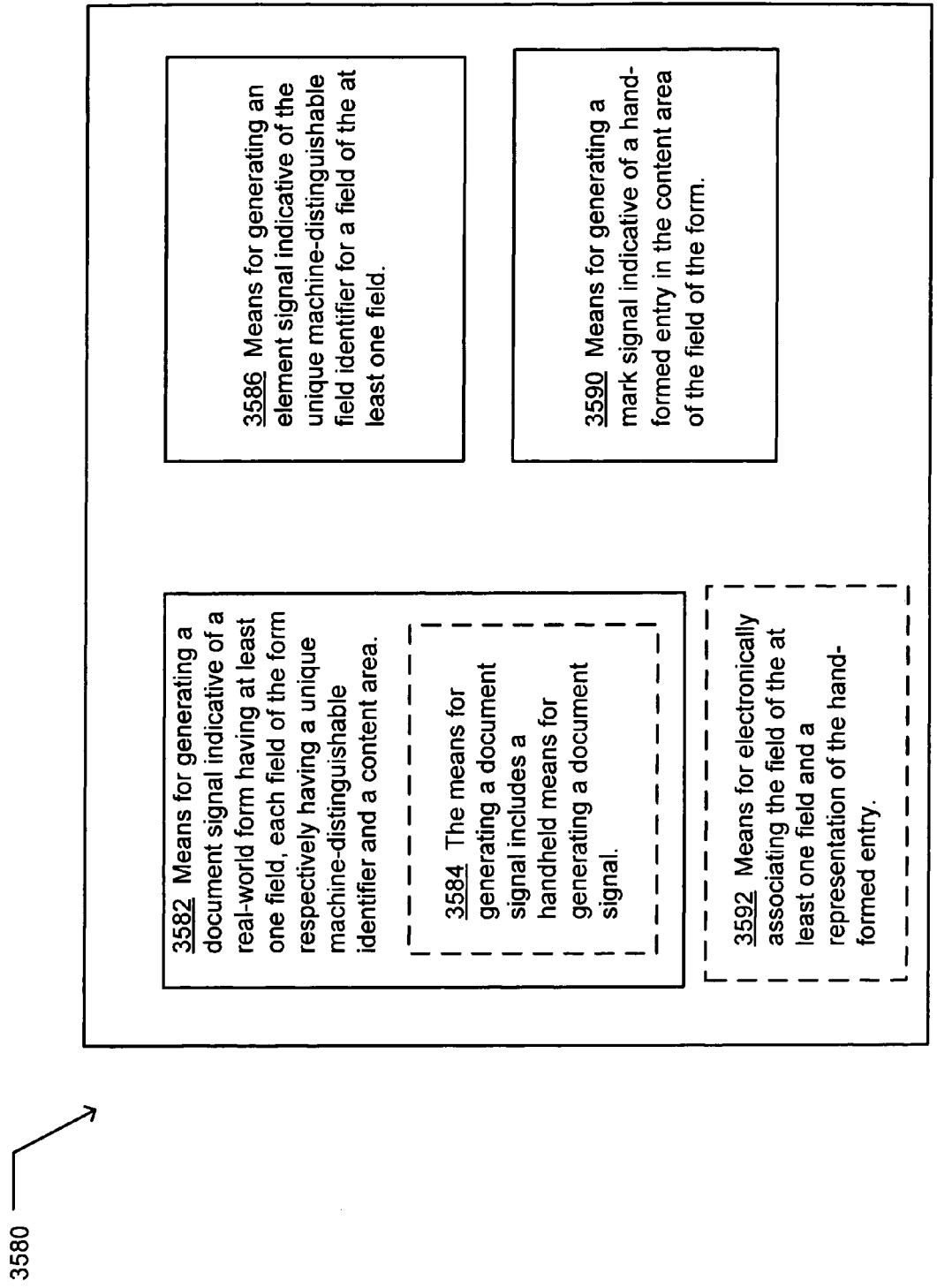
FIG. 50 illustrates a partial view of an exemplary device.

FIG. 50 illustrates a partial view of an exemplary device 3580. The device includes a means 3582 for generating a document signal indicative of a real-world form having at least one field, each field of the form respectively having a unique machine-distinguishable identifier and a content area. The device also includes a means 3586 for generating an element signal indicative of the unique machine-distinguishable field identifier for a field of the at least one field. The device includes a means 3590 for generating a mark signal indicative of a hand-formed entry in the content area of the field of the form. The device may include a means 3592 for electronically associating the field of the at least one field and a representation of the hand-formed entry. The means 3582 may include at least one additional means, such as a means 3584. The means 3584 includes a handheld means for generating the document signal.

Figure 51:
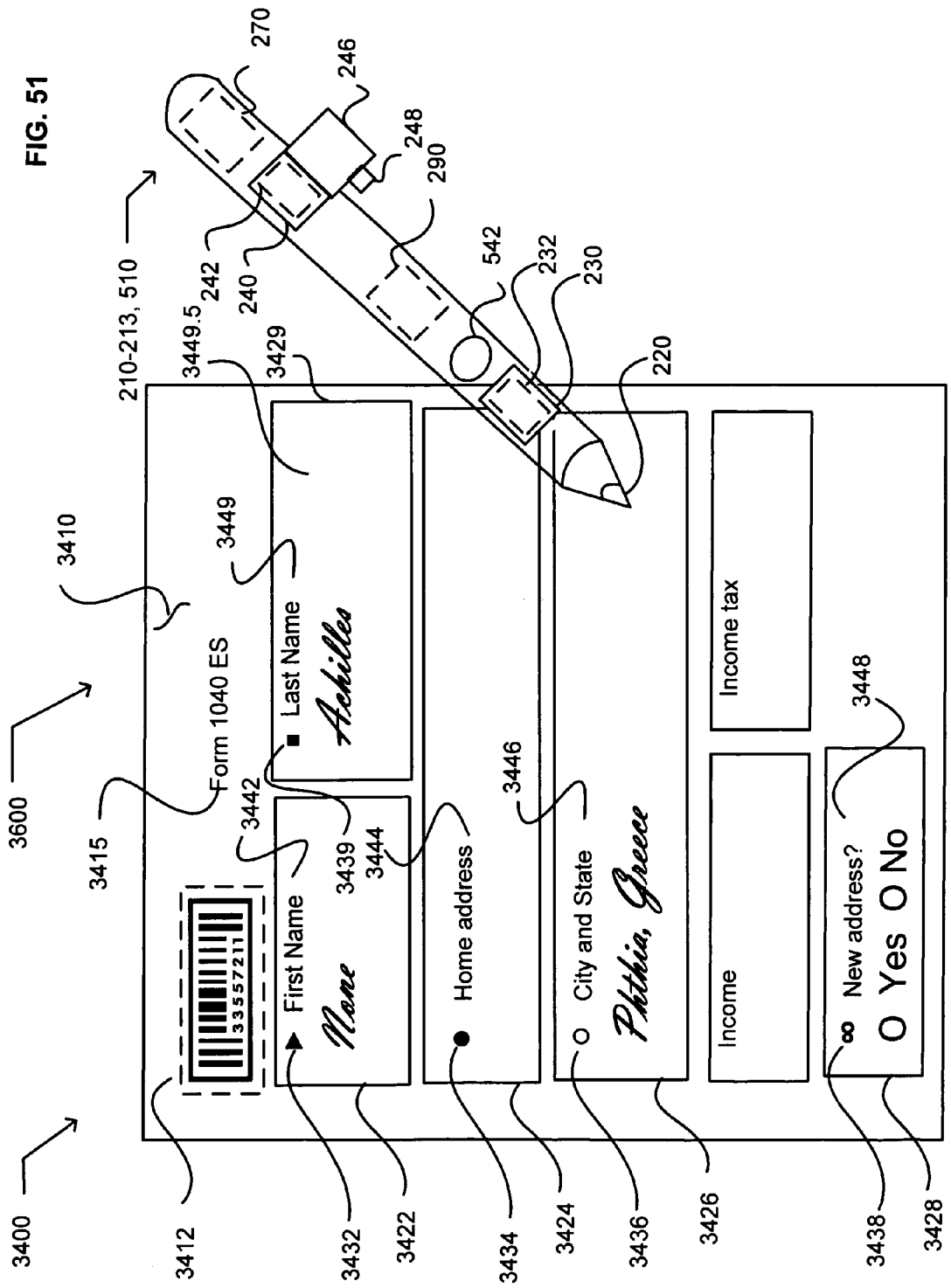
FIG. 51 illustrates a partial view of an exemplary environment in which embodiments may be implemented.

FIG. 51 illustrates a partial view of an exemplary environment 3600 in which embodiments may be implemented. The environment includes an article of manufacture having a display surface, illustrated as the article of manufacture 3400 described in conjunction with FIG. 42. The environment also includes an exemplary handheld marking device, illustrated in an embodiment as pen having some or all of the elements of any one or all of the exemplary handheld marking device 210 described in conjunction with FIG. 3, the exemplary electronic pen 211 described in conjunction with FIG. 4, the exemplary apparatus 212 described in conjunction with FIG. 5, the exemplary apparatus 213 described in conjunction with FIG. 6, and/or the exemplary handheld system 510 described in conjunction with FIG. 12. The exemplary handheld marking device includes a writing detector module operable to generate a signal indicative of a hand-formed mark by a writing element on a surface, and a tag detector module operable to generate a signal indicative of a machine-distinguishable tag associated with the hand-formed mark. In an embodiment, the writing detector module is illustrated as the writing detector module 230 of the exemplary handheld writing device 210. The tag detector module is further illustrated as the context detector module 240.

In an alternative embodiment (not shown), the environment 3600 may include a device that generates movement tracking data corresponding to movements of the handheld marking device and/or the article of manufacture. For example, Polhemus of Colchester, Vt., manufactures and markets several electromagnetic tracking apparatus that tracks objects in a space. Movement tracking data may be used in generating a content signal indicative of a hand-formed mark on a surface, and/or generating a label signal indicative of a machine-distinguishable tag associated with the hand-formed mark.

FIG. 51 illustrates an embodiment where the article of manufacture includes an income tax form "Form 1040 ES" 3415 printed on the paper display surface 3412. In an alternative embodiment, the income tax form "Form 1040 ES" 3415 may be displayed by an electronic display surface.

The income tax form "Form 1040 ES" includes the first field 3422, the second field 3424, the third field 3426, the fourth field 3428, and the fifth field 3429. The fields respectively include the machine-distinguishable field identifier "▶" 3432, the machine-distinguishable identifier "●" 3434, the machine-distinguishable identifier "○" 3436, the machine-distinguishable identifier "∞" 3438, and the machine-distinguishable identifier "■" 3439. Each machine-distinguishable field identifier is keyed to a corresponding field in an electronic version of the form "Form 1040 ES." Further, the fields respectively include the content area 3441, the content area 3443, the content area 3445, the content area 3447, and the content area 3449.5 as described in conjunction with FIG. 42. Additionally, the fields include a user-understandable field identifier "First Name" 3432, a user-understandable field identifier "Last Name" 3449, a user-understandable field identifier "Home address" 3444, a user-understandable field identifier "City and State" 3446, and a user-understandable field identifier "New address?" 3448. It is anticipatable that a user will handwrite information on a content area of the display surface corresponding to the user-understandable field identifier associated with content area when completing the income tax form. For example, as illustrated in FIG. 51, a user has entered their last name "Achilles" in the content area 3449.5 of the field 3429 in response to the user-understandable field identifier "Last Name" 3449.

In an embodiment, and as illustrated in FIG. 51, a user moves the writing element 220 of the handheld writing device 210 to form at least one instance of a hand-formed entry on a content area of the display surface 3410. FIG. 51 illustrates instances of hand-formed entries on the content areas 3442, 3446, and 3449.5. The exemplary handheld marking device captures an instance of a hand-formed entry in a content area and generates a mark signal indicative of the hand-formed entry using the writing detector module 230. The exemplary handheld marking device also captures the machine-distinguishable field identifier for a "written-to content area" using the writing detector module 230, and/or the context detector module 240, and generates an element signal indicative of the machine-distinguishable field identifier. The exemplary handheld marking device also captures the machine-distinguishable form identifier using the context detector module 240, and generates a document signal indicative of the machine-distinguishable form identifier. In an alternative embodiment where the display surface includes an electronically display surface driven by a computing device, the form may be known the computing device and the exemplary handheld marking device only captures and generates information related to the hand-formed entry and the machine-distinguishable field identifier.

A computer program product operating on a computing device, such as the computer program product 3460 described in conjunction with FIG. 43, performs a process that includes receiving the document signal indicative of the machine-distinguishable form identifier keyed to an electronic version of a form. The process also includes receiving an element signal indicative of the unique machine-distinguishable field identifier of a written-to-field. The process includes receiving a mark signal indicative of a hand-formed entry in the content area of the field of the form. Further, the process distributes a representation of the hand-formed entry to a data recipient, such as a file associated with the electronic version of a form. The process may create an instance of an electronic version of the "Form 1040 ES" 3415 corresponding to the last name of a user, such as "Achilles' Form 1040 ES."

Figure 52:
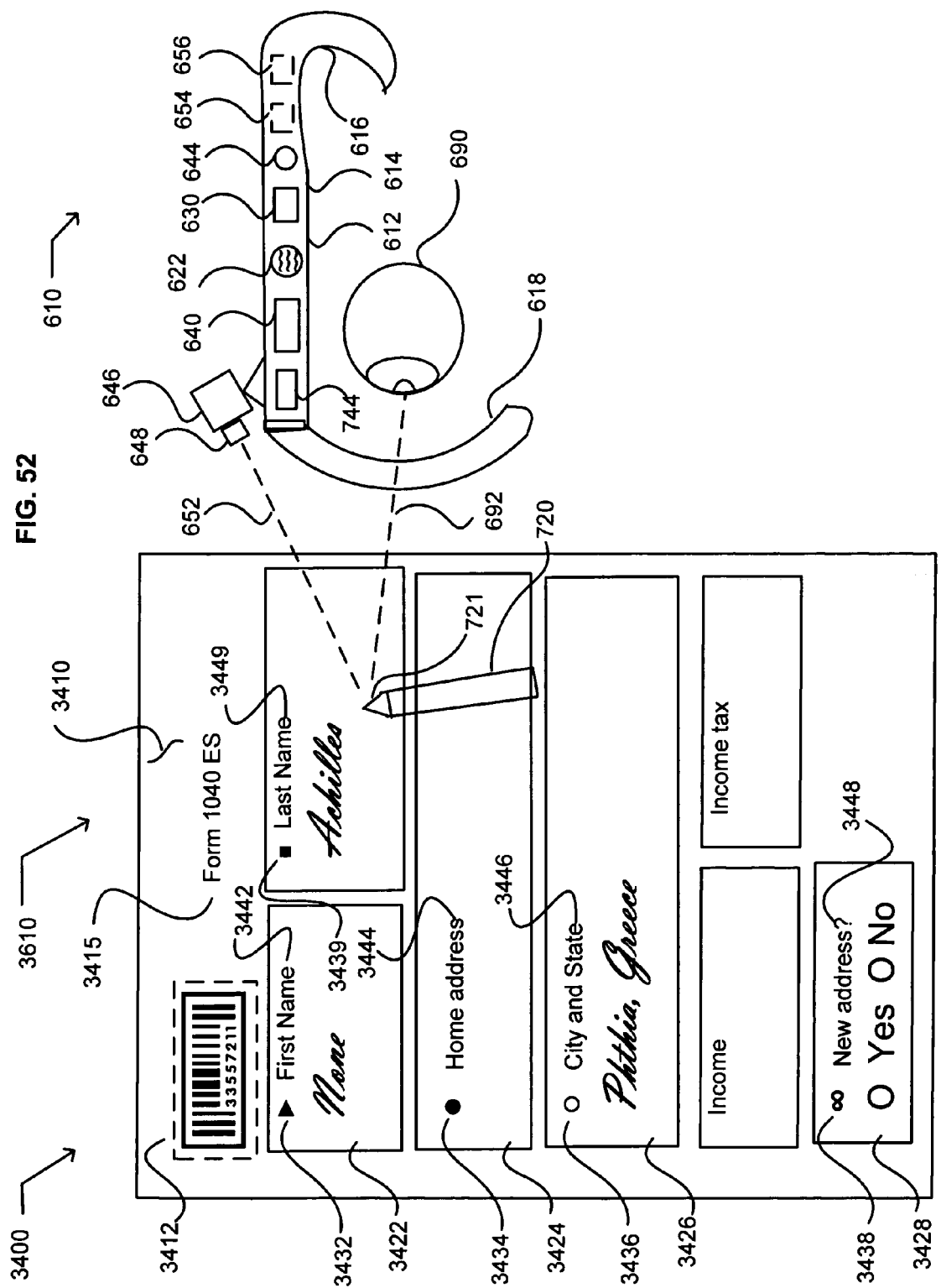
FIG. 52 illustrates a partial view of an exemplary environment in which embodiments may be implemented.

FIG. 52 illustrates a partial view of an exemplary environment 3610 in which embodiments may be implemented. The environment includes an article of manufacture having a display surface, illustrated as the article of manufacture 3400 described in conjunction with FIGS. 42 and 51. The environment also includes an exemplary human wearable annotation system, illustrated as the exemplary human wearable annotation system 610 described in conjunction with FIGS. 13-18, particularly with reference to the exemplary head mountable system 612 described in conjunction with FIG. 17. The exemplary environment also includes a handwriting instrument, illustrated as the pen 720 having the writing tip 721 described in conjunction with FIG. 17.

In an embodiment, and as illustrated in FIG. 52, a user moves the writing tip 721 of the pen 720 to form at least one instance of a hand-formed entry on a content area of the display surface 3410. The exemplary head mountable system 612 captures an instance of a hand-formed entry in a content area, such as the handwritten last name of Achilles, and generates a mark signal indicative of the hand-formed entry using the annotation environment capture device 640 of the head mountable system. The annotation environment capture device also captures the machine-distinguishable field identifier for a "written-to content area," such as the identifier 3439, and generates an element signal indicative of the machine-distinguishable field identifier. The annotation environment capture device also captures the machine-distinguishable form identifier 3412, and generates a document signal indicative of the machine-distinguishable form identifier. In an alternative embodiment where the display surface includes an electronically display surface driven by a computing device, the form may be known the computing device and the exemplary head mountable system only captures and generates information related to the hand-formed entry and the machine-distinguishable field identifier. A computer program product receives the signals and distributes a representation of the hand-formed entry to a data recipient, such as a file associated with the electronic version of a form, in a manner at least similar to the process of the computer program product described in conjunction with FIG. 51.

FIGS. 53A and 53B illustrate a partial view of an exemplary environment 3700 in which embodiments may be implemented. The environment includes an article of manufacture having a display surface, illustrated as an article of manufacture 3710 having a display surface 3720.

FIG. 53A illustrates an embodiment where the article of manufacture 3710 includes a real-world form disposed on the display surface 3720, and keyed to an electronic version of the form (not shown). In an embodiment, the real-world form may include a form printed on a material having a display surface, such as a plastic and/or paper surface. In another embodiment, the real-world form may include a form printed on a material having display surface and configured for removable or permanent attachment to another surface, such as an adhesive-backed paper material. In a further embodiment, the real-world form may be printed on the item. The display surface includes at least one field. An embodiment of the article of manufacture is illustrated as a paper material with an inspection form printed on the display surface having two display fields, a first display field 3722 and a second display field 3724. Each field of the at least one field respectively having a unique machine-distinguishable field identifier keyed to a field of the electronic version of a form, a content area that accepts a hand-formed entry, and a unique user-understandable field identifier. An embodiment is illustrated having a first machine-distinguishable field identifier "O" 3732, and a second machine-distinguishable field identifier "X" 3734 respectively associated with the first display field 3722 and the second display field 3724. The embodiment further includes a user-understandable field identifier "Pass" 3742 and a user-understandable field identifier "Fail" 3744. The embodiment also includes a first content area 3752 associated with the first display field and a second content area 3754 associated with the second display field.

FIG. 53B further illustrates the exemplary environment 3700 and an exemplary instance of the article of manufacture 3710 in use. FIG. 53B also includes an exemplary handheld marking device, illustrated in an embodiment as pen having some or all of the elements of any one or all of the exemplary handheld marking device 210 described in conjunction with FIG. 3, the exemplary electronic pen 211 described in conjunction with FIG. 4, the exemplary apparatus 212 described in conjunction with FIG. 5, the exemplary apparatus 213 described in conjunction with FIG. 6, and/or the exemplary handheld system 510 described in conjunction with FIG. 21.

In operation, a user, such as an inspector, may attach the article of manufacture 3710 to an instance of item being inspected, or to a packaging associated with the article being inspected. Upon determining an inspection status of the item, the inspector may move the writing element 220 of the handheld writing device 210 on either the content area 3752 or the content area 3754 of the display surface 3720 to form at least one instance of a hand-formed entry indicating the inspection status. FIG. 53B illustrates an instance where the item passed inspection, and an inspector named Joe has hand-formed their name and inspection-passed status in the content area 3752 by handwriting "OK-JOE" 3760.

The exemplary handheld marking device captures the hand-formed entry "OK-JOE" 3760 in the content area 3752 and generates a mark signal indicative of the hand-formed entry using the writing detector module 230. The exemplary handheld marking device also captures the machine-distinguishable field identifier 3732 using the writing detector module 230, and/or the context detector module 240, and generates an element signal indicative of the machine-distinguishable field identifier. In an alternative embodiment, the exemplary handheld marking device may also capture a serial number or other identifying number associated with the instance of the item and generate a signal indicative of the serial number or other identifying number. In another alternative embodiment, the exemplary handheld marking device may provide time and/or date information related to the hand-formed entry "OK-JOE." The article of manufacture 3710 may include an identifier (not illustrated), such as a form name. In a further embodiment, the exemplary handheld marking device may capture the identifier and generate a signal indicative thereof.

In an embodiment, a computer program product operating on a computing device may perform a process that electronically associates the inspection-passed status represented by the hand-formed entry "OK-JOE" 3760 in the content area 3752, and the serial number or other identifying number associated with the instance of the item. In another embodiment, the process saves the electronically associated inspection-passed status and the serial number or other identifying number associated with the instance of the item. The computer program product may include a computer program product similar to the computer program product 3460 described in conjunction with FIG. 43.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost versus efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended

What is claimed is:

1. A computer-implemented method comprising:
   generating, via an article of manufacture comprising a human associatable device, a document signal indicative of a form having at least one field, each field of the form respectively having a unique machine-distinguishable identifier and a content area;
   generating, via an article of manufacture comprising a human associatable device, an element signal indicative of the unique machine-distinguishable field identifier for a field of the at least one field; and
   generating, via an article of manufacture comprising a human associatable device, a mark signal indicative of a hand-formed entry in the content area of the field of the at least one field.

2. The method of claim 1, wherein the generating a document signal indicative of a form having at least one field includes generating in a handheld writing device a document signal indicative of a form having at least one field.

3. The method of claim 2, wherein the generating an element signal indicative of the unique field identifier for a field of the at least one field includes generating in the handheld writing device an element signal indicative of the unique field identifier for a field of the at least one field.

4. The method of claim 2, wherein the generating a mark signal indicative of a hand-formed entry in the content area of the field of the at least one field includes generating in the handheld writing device a mark signal indicative of a hand-formed entry in the content area of the field of the at least one field.

5. The method of claim 1, wherein the generating in a human associatable device a document signal indicative of a form having at least one field includes generating in a human wearable device a document signal indicative of a form having at least one field.

6. The method of claim 1 wherein the generating in a human associatable device a document signal indicative of a form having at least one field includes generating in a handheld writing device a document signal indicative of a form having at least one field.

7. The method of claim 1, wherein the generating a document signal indicative of a form having at least one field includes a generating a document signal indicative of a printed form having at least one field.

8. The method of claim 1, wherein the generating a document signal indicative of a form having at least one field includes a generating a document signal indicative of an electronically displayed form having at least one field.

9. The method of claim 1, wherein generating an element signal indicative of the unique machine-distinguishable field identifier for a field of the at least one field includes generating in a human associatable device an element signal indicative of the unique machine-distinguishable field identifier for a field of the at least one field.

10. The method of claim 1, wherein the generating an element signal indicative of the unique machine-distinguishable field identifier for a field of the at least one field includes generating an element signal indicative of a unique user-understandable field identifier for a field of the at least one field.

11. The method of claim 1, wherein the generating an element signal indicative of the unique field identifier for a field of the at least one field includes generating an element signal indicative of the unique machine-distinguishable field identifier for a field of the at least one field.

12. The method of claim 1, further comprising:
electronically associating the field of the at least one field and a representation of the hand-formed entry in the content area.

13. The method of claim 1, further comprising:
electronically associating the field of the at least one field and a representation of the hand-formed entry in the content area in response to the element signal and the mark signal.

14. The method of claim 13, further comprising:
saving the electronically associated field of the at least one field and representation of the hand-formed entry in the content area.

15. The method of claim 13, further comprising:
saving the electronically associated field of the at least one field and representation of the hand-formed entry in the content area in an electronic version of the form.

16. The method of claim 13, further comprising:
saving the electronically associated field of the at least one field and a representation of the hand-formed entry in the content area in an electronic version of the form having an identifier associated with a user.

* * * * *